United States Patent
Cui et al.

(10) Patent No.: US 12,456,236 B2
(45) Date of Patent: Oct. 28, 2025

(54) IMAGING SYSTEMS AND METHODS FOR EXTENDING TRUNCATED PROJECTION DATA

(71) Applicant: SHANGHAI UNITED IMAGING HEALTHCARE CO., LTD., Shanghai (CN)

(72) Inventors: Kai Cui, Shanghai (CN); Yong E, Shanghai (CN); Jing Yan, Shanghai (CN); Na Zhang, Shanghai (CN); Le Yang, Shanghai (CN); Hanyu Wang, Shanghai (CN); Juan Feng, Shanghai (CN); Haihua Zhou, Shanghai (CN); Xuefei Lu, Shanghai (CN); Guanji Leng, Shanghai (CN); Yang Hu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 496 days.

(21) Appl. No.: 17/456,554

(22) Filed: Nov. 24, 2021

(65) Prior Publication Data
US 2022/0084172 A1     Mar. 17, 2022

Related U.S. Application Data

(63) Continuation of application No. PCT/CN2020/091968, filed on May 24, 2020.

(30) Foreign Application Priority Data

May 24, 2019 (CN) .......................... 201910439116.8
Sep. 2, 2019 (CN) .......................... 201910824258.6
(Continued)

(51) Int. Cl.
G06T 11/00        (2006.01)

(52) U.S. Cl.
CPC ....... *G06T 11/005* (2013.01); *G06T 2211/432* (2013.01); *G06T 2211/441* (2023.08)

(58) Field of Classification Search
CPC ......... G06T 2211/432; G06T 2211/441; G06T 2211/40; G06T 11/005
See application file for complete search history.

(56) References Cited

U.S. PATENT DOCUMENTS

| 4,305,127 A | 12/1981 | Heuscher |
| 5,216,601 A | 6/1993 | Crawford et al. |
(Continued)

FOREIGN PATENT DOCUMENTS

| CN | 101510298 A | 8/2009 |
| CN | 103077547 A | 5/2013 |
(Continued)

OTHER PUBLICATIONS

Zhu, Wentao et al., Efficient High Resolution Regional Reconstruction Algorithm for PET Imaging, China Medical Equipment, 12(10): 18-22, 2015.
(Continued)

*Primary Examiner* — Geoffrey E Summers
(74) *Attorney, Agent, or Firm* — METIS IP LLC

(57) ABSTRACT

A method include obtaining original projection data of an object. The original projection data may be acquired by scanning the object using a radiation device from one or more projection views. The original projection data may include truncation projection data that is acquired from at least one of the one or more projection views. In each of the at least one of the one or more projection views a truncation region of the object may be located outside an FOV of the radiation device. The method may include obtaining a target S-shaped extrapolation function based on the original projection data. The method may include determining, based on (Continued)

the target S-shaped extrapolation function and the original projection data, extended projection data corresponding to the at least one truncation region. The method may include generating an image of the object based on the original projection data and the extended projection data.

13 Claims, 21 Drawing Sheets

(30) Foreign Application Priority Data

Sep. 2, 2019 (CN) .......................... 201910824827.7
Dec. 28, 2019 (CN) .......................... 201911384031.0

(56) References Cited

U.S. PATENT DOCUMENTS

| | | | |
|---|---|---|---|
| 5,818,898 A | 10/1998 | Tsukamoto et al. | |
| 6,307,909 B1 | 10/2001 | Flohr et al. | |
| 6,339,223 B1 | 1/2002 | Motomura et al. | |
| 2004/0066911 A1 | 4/2004 | Hsieh et al. | |
| 2004/0073584 A1 | 4/2004 | Hsieh et al. | |
| 2006/0222145 A1 | 10/2006 | Motomura et al. | |
| 2007/0116344 A1* | 5/2007 | Hsieh | A61B 6/032 382/131 |
| 2007/0195923 A1* | 8/2007 | Netsch | G06T 11/005 378/4 |
| 2008/0134258 A1 | 6/2008 | Goose et al. | |
| 2009/0034817 A1* | 2/2009 | Boese | G01N 23/046 378/4 |
| 2010/0208964 A1 | 8/2010 | Wiegert et al. | |
| 2011/0075798 A1* | 3/2011 | Boese | A61B 6/4441 378/20 |
| 2011/0121183 A1 | 5/2011 | Takenaka et al. | |
| 2011/0188723 A1 | 8/2011 | Bruder et al. | |
| 2012/0275673 A1 | 11/2012 | Star-Lack et al. | |
| 2013/0129172 A1 | 5/2013 | Boese et al. | |
| 2013/0294568 A1* | 11/2013 | Lee | A61B 6/025 378/4 |
| 2014/0211912 A1 | 7/2014 | Wang et al. | |
| 2016/0089096 A1 | 3/2016 | Lou et al. | |
| 2018/0098744 A1 | 4/2018 | Bauer | |
| 2019/0164317 A1 | 5/2019 | Tang et al. | |
| 2019/0197740 A1 | 6/2019 | Lu et al. | |

FOREIGN PATENT DOCUMENTS

| | | |
|---|---|---|
| CN | 104618664 A | 5/2015 |
| CN | 104751502 A | 7/2015 |
| CN | 105078492 A | 11/2015 |
| CN | 105781226 A | 7/2016 |
| CN | 106251378 A | 12/2016 |
| CN | 106901766 A | 6/2017 |
| CN | 107016672 A | 8/2017 |
| CN | 107133996 A | 9/2017 |
| CN | 107492132 A | 12/2017 |
| CN | 107607982 A | 1/2018 |
| CN | 108038840 A | 5/2018 |
| CN | 109345608 A | 2/2019 |
| CN | 109389654 A | 2/2019 |
| CN | 109408953 A | 3/2019 |
| CN | 109461192 A | 3/2019 |
| CN | 110189270 A | 8/2019 |
| CN | 110533738 A | 12/2019 |
| CN | 111000581 A | 4/2020 |
| EP | 2457503 A1 | 5/2012 |

OTHER PUBLICATIONS

Wang, Kejun, CT Image Reconstruction Algorithm Research of Local Region Tomography, China Excellent Master's Dissertation Full-text Database Information Technology Series, 2013, 69 pages.
Lauzier, P. T. et al., Time-resolved Cardiac Interventional Cone-beam CT Reconstruction From Fully Truncated Projections Using the Prior Image Constrained Compressed Sensing (PICCS) Algorithm, Physics in medicine and biology, 57(9): 2461-2476, 2012.
Tang, Guangjian et al., Artifacts, Modern Whole-body CT Diagnostics (Scroll), China Medical Science Press, 2013, 40 pages.
International Search Report in PCT/CN2020/091968 mailed on Aug. 26, 2020, 4 pages.
Written Opinion in PCT/CN2020/091968 mailed on Aug. 26, 2020, 6 pages.
First Office Action in Chinese Application No. 201910439116.8 mailed on Dec. 22, 2020, 14 pages.
First Office Action in Chinese Application No. 201911384031.0 mailed on Mar. 2, 2021, 17 pages.
Alexander A. Zamyatin et al., Extension of the Reconstruction Field-of-view Using Sinogram Decomposition, Proceedings of SPIE, 6142: 614220-1-614220-8, 2006.
Li, Shengda et al., Diagnostic Value of CT 3D Reconstruction Images for Malignant Intra-pulmonary Isolated Nodules, Guangdong Medical Journal, 2015, 11 pages.
K. Sourbelle et al., Reconstruction from Truncated Projections in CT Using Adaptive Detruncation, European Radiology, 15(5): 1008-1014, 2005.
J. Hsieh et al., A Novel Reconstruction Algorithm to Extend the CT Scan Field-of-view, Medical Physics, 31(9): 2385-2391, 2004.
Daniel Kolditz et al., Volume-of-interest (VOI) Imaging in C-arm Flat-detector CT for High Image Quality at Reduced Dose, Medical Physics, 37(6): 2719-2730, 2010.
B. Ohnesorge et al., Efficient Correction for CT Image Artifacts Caused by Objects Extending Outside the Scan Field of View, Medical Physics, 27(1): 39-46, 2000.

* cited by examiner

1200

- Obtaining reference data relating to a projection of an object, the reference data relating to non-truncated projection data of the object corresponding to a first projection view and being acquired using a radiation device — 1210

- Obtaining original projection data of an object, the original projection data being acquired by scanning the object using the radiation device from one or more second projection views — 1220

- Identifying truncation projection data of the original projection data — 1230

- Obtaining a target extrapolation function — 1240

- Determining, based on the target extrapolation function, the reference data, and the original projection data, extended projection data corresponding to the truncation projection data — 1250

- Generating a target image of the object based on the original projection data and the extended projection data — 1260

FIG. 12

IMAGING SYSTEMS AND METHODS FOR EXTENDING TRUNCATED PROJECTION DATA

CROSS-REFERENCE TO RELATED APPLICATIONS

This application is a continuation of International Application No. PCT/CN2020/091968, filed on May 24, 2020, which claims priority to Chinese Patent Application No. 201910439116.8 filed on May 24, 2019, Chinese Patent Application No. 201910824258.6 filed on Sep. 2, 2019, Chinese Patent Application No. 201910824827.7 filed on Sep. 2, 2019, and Chinese Patent Application No. 201911384031.0 filed on Dec. 28, 2019, the entire contents of each of which are incorporated herein by reference.

TECHNICAL FIELD

The present disclosure generally relates to medical technology, and more particularly, systems and methods for imaging in medical radiation.

BACKGROUND

In medical radiation imaging, such as computed tomography (CT) imaging or X-ray imaging, when an image of an object is generated by scanning the object using a radiation device, artifacts usually exist in the image, which reduces the image quality of the images. For example, the artifacts may be caused by a dark current of the detector of the radiation device. As another example, the artifacts may be caused by truncation of projection data of the object. It is desirable to provide imaging systems and/or methods to improve the image quality of resultant images.

SUMMARY

According to a first aspect of the present disclosure, an imaging system may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may obtain an image generated based on a radiation device including a detector. The radiation device may be configured to operate under a plurality of candidate frame frequencies. The one or more processors may identify, among the plurality of candidate frame frequencies, a target frame frequency used to generate the image. The one or more processors may obtain integral time information including a plurality of frequency groups and a plurality of candidate integral time values. Each of the plurality of frequency groups may correspond to one of the plurality of candidate integral time values and include one or more of the plurality of candidate frame frequencies. The one or more processors may determine a target integral time value based on the target frame frequency and the integral time information. The one or more processors may perform, based on the target integral time value, correction on the image.

In some embodiments, the integral time information may be provided by a process including: dividing the plurality of candidate frame frequencies into the plurality of frequency groups, each frequency group including one or more candidate frame frequencies; for each of the plurality of candidate frame frequencies, obtaining, based on the candidate frame frequency, a maximum integral time value; and for each of the plurality of frequency groups, determining the candidate integral time value based on the maximum integral time value corresponding to at least one of the one or more candidate frame frequencies of the frequency group.

In some embodiments, for each of the plurality of frequency groups, determining the candidate integral time value based on the maximum integral time value corresponding to at least one of the one or more candidate frame frequencies of the frequency group includes: designating the maximum integral time value corresponding to a maximum candidate frame frequency of the frequency group as the candidate integral time value of the frequency group.

In some embodiments, to perform, based on the target integral time value, correction on the image, the one or more processors may obtain a correction image based on the target integral time value. The one or more processors may perform the correction on the image by subtracting, from pixel values of pixels of the image, pixel values of corresponding pixels of the correction image.

In some embodiments, at least one of the plurality of frequency groups may include two or more of the plurality of candidate frame frequencies.

According to another aspect of the present disclosure, an imaging system may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may obtain reference data including a complete projection of an object. The reference data may be acquired using a radiation device. The one or more processors may obtain original projection data of the object. The original projection data may be acquired by scanning the object using the radiation device from one or more imaging projection views. The original projection data may include truncation projection data that is acquired from at least one of the one or more imaging projection views. In each of the at least one of the one or more imaging projection views a truncation region of the object may be located outside a field of view (FOV) of the radiation device. The one or more processors may determine, based on the reference data and the original projection data, extended projection data corresponding to the at least one truncation region. The one or more processors may generate a first image of the object based on the original projection data and the extended projection data.

In some embodiments, the reference data may include projection data acquired by scanning, from a non-truncated projection view, the object using the radiation device. In the non-truncated projection view, the object being within the FOV of the radiation device.

In some embodiments, the non-truncated projection view may be determined by a first process including: obtaining at least one second image of the object, the at least one second image being acquired by at least one image acquisition device; and determining the non-truncated projection view based on the at least one second image.

In some embodiments, the non-truncated projection view may be determined based on a machine learning model.

In some embodiments, to determine, based on the reference data and the original projection data, the extended projection data corresponding to the at least one truncation region, for partial projection data, in the original projection data, corresponding to one of the one or more imaging projection views, the one or more processors may compare a surface integral of the reference data and a surface integral of the partial projection data. In response to determining that the surface integral of the reference data is greater than the surface integral of the partial projection data, the one or more processors may determine that the partial projection data belongs to the truncation projection data. The one or more processors may determine, based on the reference data and the partial projection data, the extended projection data of the truncation region corresponding to the partial projection data.

In some embodiments, the reference data may be obtained by a second process including: obtaining at least two third images of the object, the at least two third images being acquired using the radiation device; and obtaining, based on the at least two third images, a combination image related to the projection of the object, the reference data including the combination image.

In some embodiments, the at least two third images may be obtained by scanning, using the radiation device, at least two portions of the object, the at least two portions of the object including a same region of the object.

In some embodiments, to determine, based on the reference data and the original projection data, the extended projection data corresponding to the at least one truncation region, the one or more processors may determine supplement information based on the combination image and the original projection data. The one or more processors may obtain a preliminary extrapolation function including one or more pending parameters. The one or more processors may determine an extrapolation width corresponding to the original projection data based on the supplement information, the preliminary extrapolation function, and the original projection data. The one or more processors may obtain the target extrapolation function by determining the one or more pending parameters based on the extrapolation width, the preliminary extrapolation function, and the original projection data. The one or more processors may determine the extended projection data corresponding to the at least one truncation region by performing, based on the extrapolation width, the supplement information, and the target extrapolation function, extrapolation on the original projection data.

According to yet another aspect of the present disclosure, an imaging system may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may obtain original projection data of an object. The original projection data may be acquired by scanning the object using a radiation device from one or more projection views. The original projection data may include truncation projection data that is acquired from at least one of the one or more projection views. In each of the at least one of the one or more projection views a truncation region of the object may be located outside a field of view (FOV) of the radiation device. The one or more processors may obtain a target S-shaped extrapolation function based on the original projection data. The one or more processors may determine, based on the target S-shaped extrapolation function and the original projection data, extended projection data corresponding to the at least one truncation region. The one or more processors may generate an image of the object based on the original projection data and the extended projection data.

In some embodiments, the target S-shaped extrapolation function may be a monotonic and bounded function f(x).

In some embodiments, a domain of definition of the target S-shaped extrapolation function f(x) may be x∈(−∞, +∞). When x→−∞, the target S-shaped extrapolation function f(x) may approach a first value. When x→+∞, the target S-shaped extrapolation function f(x) may approach a second value.

In some embodiments, when x→∞, a first-order derivative function f'(x) of the target S-shaped extrapolation function f(x) may approach 0. A maximum value of the first-order derivative function f'(x) may exist when x∈(−∞, +∞).

In some embodiments, the original projection data of the object may represent an intensity of radiation that is transmitted, from the radiation device, through the object and detected by a plurality of detector elements of the radiation device. The plurality of detector elements may be arranged in one or more detector rows and one or more detector columns.

In some embodiments, to obtain the target S-shaped extrapolation function based on the original projection data, for partial projection data, in the original projection data, corresponding to one of the one or more detector rows of the plurality of detector elements and one of the one or more projection views, the one or more processors may determine whether the partial projection data belongs to the truncation projection data. In response to determining that the partial projection data belongs to the truncation projection data, the one or more processors may determine an extrapolation width corresponding to the partial projection data based on a count of the one or more detector columns and a length of a filter kernel configured to generate the image of the object. The one or more processors may obtain a preliminary S-shaped extrapolation function including one or more pending parameters. The one or more processors may obtain the target S-shaped extrapolation function by determining, based on the extrapolation width and the partial projection data, the one or more pending parameters of the preliminary one or more pending parameters.

In some embodiments, the target S-shaped extrapolation function may be obtained based on the following equation:

$$\int_{-N_{ext}/2}^{N_{ext}/2} (Y(x) + |Y_{min}|)dx = \frac{\pi}{2}\left(\frac{p}{2\mu}\right)^2,$$

wherein $N_{ext}$ refers to the extrapolation width; Y(x) refers to the preliminary S-shaped extrapolation function; t refers to a variable of Y(x) and relates to the detector elements in the detector row; $Y_{min}$ refers to a minimum value of Y(x) when $$x \in \left(\frac{-N_{ext}}{2}, \frac{N_{ext}}{2}\right),$$

or a smaller value of the first value and the second value when x∈(−∞, +∞); p refers to a projection value of the partial projection data corresponding to a boundary detector element of the detector row; and µ refers to an attenuation coefficient of water.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 12 is a flowchart illustrating an exemplary imaging process according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 2:
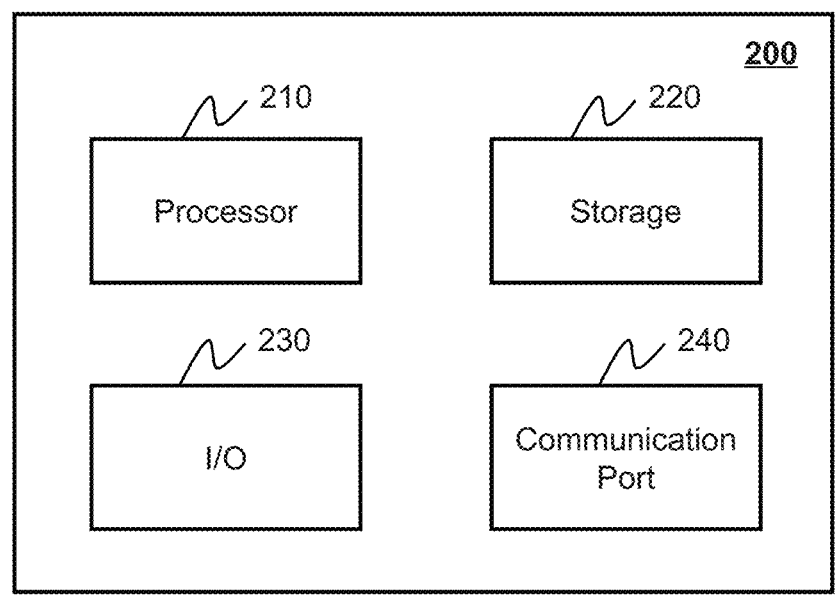
FIG. 2 is a schematic diagram illustrating hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

For illustration purposes, the following description is provided to help better understanding a process for exposure controlling. It is understood that this is not intended to limit the scope of the present disclosure. For persons having ordinary skills in the art, a certain amount of variations, changes and/or modifications may be deducted under the guidance of the present disclosure. Those variations, changes and/or modifications do not depart from the scope of the present disclosure.

Figure 1A:
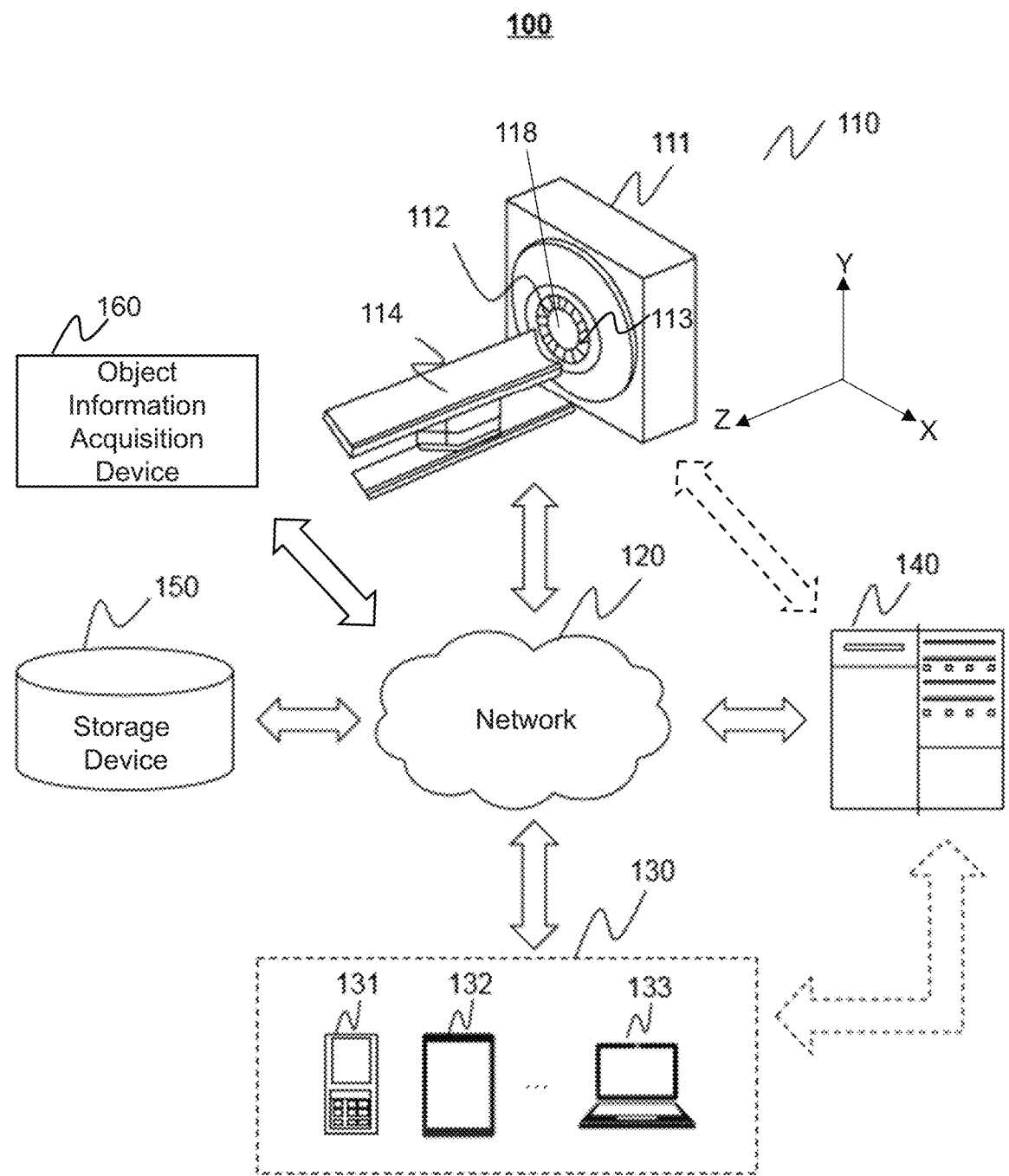
FIG. 1A is a schematic diagram illustrating an exemplary medical radiation system according to some embodiments of the present disclosure.

FIG. 1A is a schematic diagram illustrating an exemplary medical radiation system according to some embodiments of the present disclosure. In some embodiments, the medical radiation system 100 may be applied to any application scenario in which radiation rays are used for medical diagnosis, generating images, and/or providing a treatment, such as a computed tomography (CT) system, a digital radiography (DR) system, a multi-modality system (e.g., a computed tomography-positron emission tomography (CT-PET) system, a magnetic resonance-computed tomography (MR-CT) system), a radiotherapy system, or the like, or a combination thereof.

As illustrated in FIG. 1A, the medical radiation system 100 may include a radiation device 110, a network 120, one or more terminals 130, a processing device 140, and a storage device 150. In some embodiments, the medical radiation system 100 may further include an object information acquisition device 160. In some embodiments, the object information acquisition device 160 may be omitted in the medical radiation system 100. The components in the medical radiation system 100 may be connected in one or more of various ways. Merely by way of example, the radiation device 110 may be connected to the processing device 140 through the network 120. As another example, the radiation device 110 may be connected to the processing device 140 directly as indicated by the bi-directional arrow in dotted lines linking the radiation device 110 and the processing device 140. As a further example, the storage device 150 may be connected to the processing device 140 directly or through the network 120. As still a further example, the terminal 130 may be connected to the processing device 140 directly (as indicated by the bi-directional arrow in dotted lines linking the terminal 130 and the processing device 140) or through the network 120.

In some embodiments, the radiation device 110 may include an imaging device. The imaging device may include a computed tomography (CT) scanner, a digital radiography (DR) scanner, a C-arm scanner, a digital subtraction angiography (DSA) scanner, a dynamic spatial reconstructor (DSR) scanner, an X-ray microscopy scanner, a multi-modality scanner, or the like, or a combination thereof. Exemplary multi-modality scanners may include a computed tomography-positron emission tomography (CT-PET) scanner, a computed tomography-magnetic resonance imaging (CT-MRI) scanner, etc. In some embodiments, the CT scanner may include a CT device with a fan-beam or a cone beam computed tomography (CBCT) device.

In the present disclosure, the X axis, the Y axis, and the Z axis shown in FIG. 1A may form an orthogonal coordinate system. The X axis and the Z axis shown in FIG. 1A may be horizontal, and the Y axis may be vertical. As illustrated, the positive X direction along the X axis may be from the left side to the right side of the radiation device 110 seen from the direction facing the front of the radiation device 110; the positive Y direction along the Y axis shown in FIG. 1A may be from the lower part to the upper part of the radiation device 110; the positive Z direction along the Z axis shown in FIG. 1A may refer to a direction in which the object is moved out of the scanning channel 118 of the radiation device 110.

In some embodiments, the radiation device 110 may include a gantry 111, a radiation source 112, a detector 113, and a scanning table 114. In some embodiments, the detector 113 and the radiation source 112 may be connected to the gantry 111 and rotatable around the Z axis. The detector 113 may be in a position diametrically opposed to the radiation source 112. During rotation, the location of the detector 113 relative to the radiation source 112 may be constant or substantially constant. During scanning an object using the radiation device 110, the object may be placed on the scanning table 114 and moved into a scanning channel (e.g., a space between the detector 113 and the radiation source 112) of the radiation device 110, such as the scanning channel 118 in FIG. 1A.

The radiation source 112 may emit radiation rays to an object that is placed in the scanning channel 118. The radiation rays may include X-rays, y-rays, a-rays, ultraviolet, laser, neutron, proton, or the like, or a combination thereof. The detector 113 may receive the radiation rays passing through the object. In some embodiments, the detector 113 may include a scintillation detector (e.g., a cesium iodide detector) or a gas detector. In some embodiments, the detector 113 may include a detector matrix including a plurality of detector units (also referred to as detector elements) corresponding to a field of view (FOV) of the radiation device 110. The plurality of detector elements may be arranged in a channel direction (also referred to as a column direction or an axial direction) and a row direction, thereby forming one or more detector columns along the channel direction and one or more detector rows along the row direction.

Figure 1B:
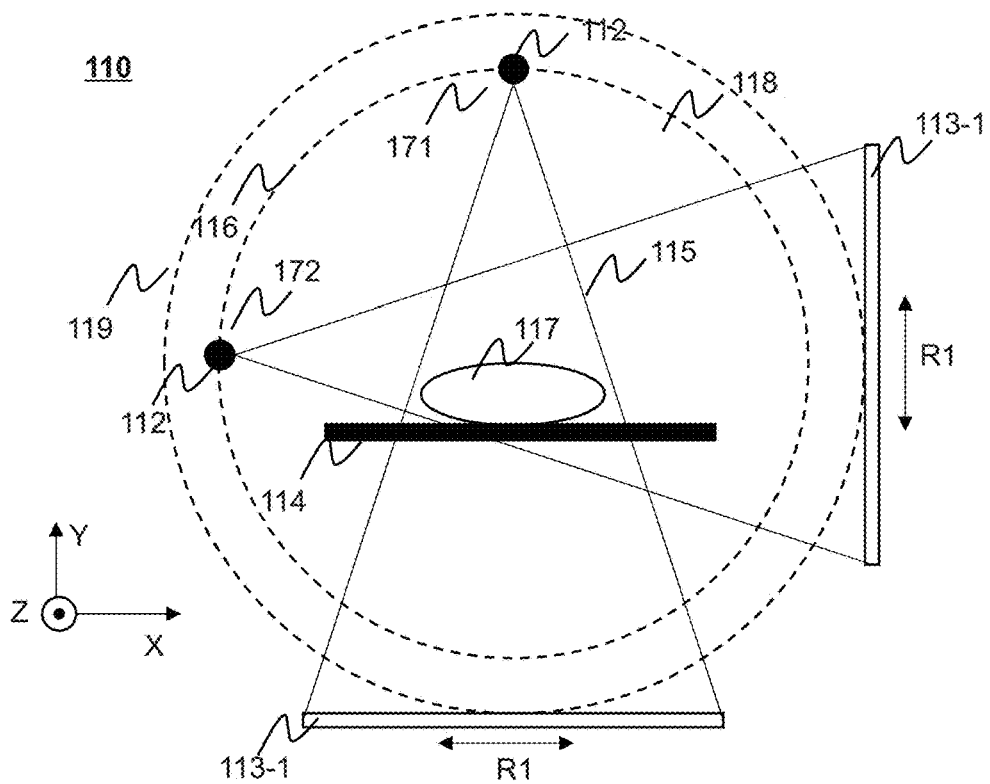
FIGS. 1B and 1C are schematic diagrams illustrating an exemplary radiation device according to some embodiments of the present disclosure.
Figure 1C:
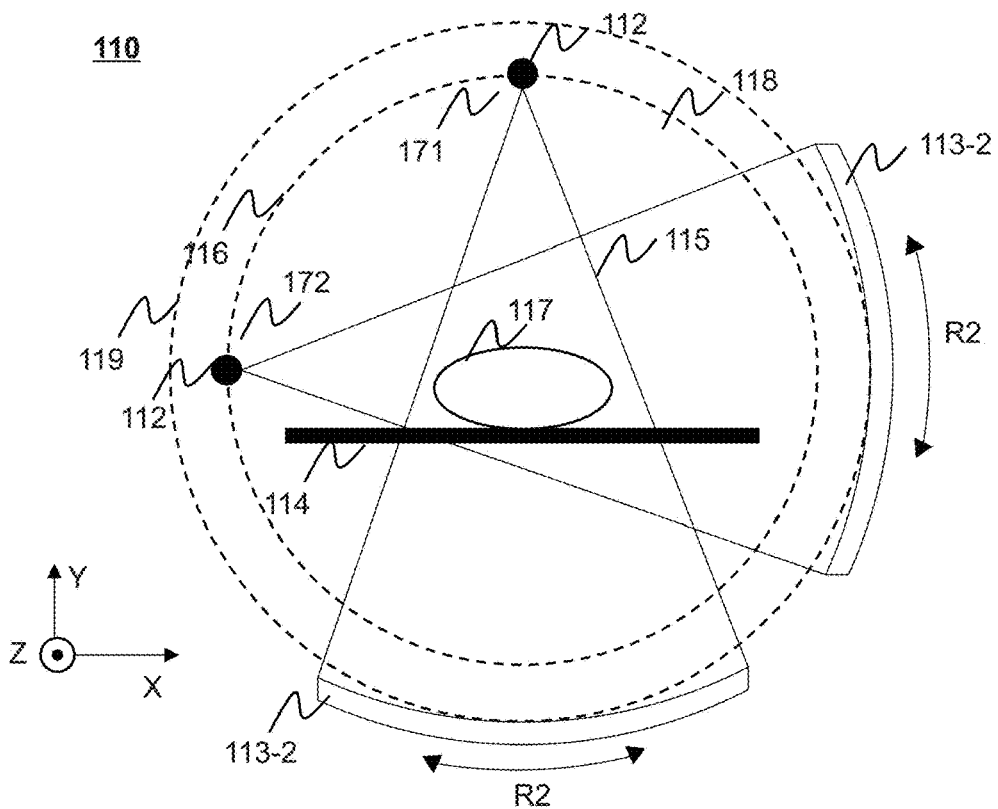

In some embodiments, the column direction may be along the Z axis in FIG. 1A. The row direction may relate to the column direction. Merely by way of example, FIGS. 1B and 1C are schematic diagrams illustrating the radiation device 110 according to some embodiments of the present disclosure. The radiation device 110 shown in FIGS. 1B and 1C is a view of the radiation device 110 seen from the direction facing the front of the radiation device 110 (e.g., along the negative Z direction in FIG. 1A). The X axis, the Y axis, and the Z axis in FIGS. 1B and 1C may correspond to those in FIG. 1A. In FIGS. 1B and 1C, the positive Z direction is represented as a direction that is vertical to the paper and points outward.

As shown in FIGS. 1B and 1C, the object 117 may be placed on the scanning table 114 and moved into the scanning channel 118 of the radiation device 110. The radiation source 112 and the detector 113 (e.g., the detector 113-1 or the detector 113-2 shown in FIGS. 1B and 1C) may rotate around the object 117 (e.g., around the Z axis) along the trajectory 116 and the trajectory 119, respectively. For example, the radiation source 112 may rotate, around the Z axis along the trajectory 116, from the location 171 to the location 172. In some embodiments, the trajectory 116 and the trajectory 119 may be the same or different. In some embodiments, the size (e.g., the radius) of the trajectory 116 may be greater or smaller (e.g., as shown in FIGS. 1B and 1C) than the size of the trajectory 119. The radiation source 112 may emit radiation rays (or referred to as radiation beams) 115 to the object 117. The detector (e.g., the detector 113-1 or the detector 113-2 shown in FIGS. 1B and 1C) may receive the radiation rays 115. In some embodiments, the detector 113 may be flat (e.g., the detector 113-1 shown in FIG. 1B) or curved (e.g., the detector 113-2 shown in FIG. 1C). For example, as shown in FIG. 1B, the flat detector 113-1 may include a plurality of detector elements arranged along the column direction (e.g., the Z axis) and the row direction R1 that is vertical to the column direction. As another example, as shown in FIG. 1C, the curved detector 113-2 may include a plurality of detector elements arranged along the column direction (e.g., the Z axis) and the curved row direction R2.

In some embodiments, the object may be biological or non-biological. Merely by way of example, the object may include a patient, a man-made object, etc. As another example, the object may include a specific portion, organ, and/or tissue of the patient. For example, the object may include head, brain, neck, body, shoulder, arm, thorax, cardiac, stomach, blood vessel, soft tissue, knee, feet, or the like, or any combination thereof. In the present disclosure, "subject" and "object" are used interchangeably.

In some embodiments, the object information acquisition device 160 may be configured to acquire object information related to the object. The object information may indicate a location of the object relative to the radiation source 112, the scanning table 114, and/or the detector 113. Details regarding the object information acquisition device 160 may be found elsewhere in the present disclosure (e.g., the description in connection with the operation 1311 of the process 1300-1 in FIG. 13A)

The network 120 may facilitate exchange of information and/or data. In some embodiments, one or more components of the medical radiation system 100 (e.g., the radiation device 110, the terminal 130, the processing device 140, the storage device 150, or the object information acquisition device 160) may send information and/or data to another component(s) in the medical radiation system 100 via the network 120. For example, the processing device 140 may obtain a user instruction from the terminal 130 via the network 120. As another example, the processing device 140 may obtain scan data (e.g., projection data) from the radiation device 110 via the network 120. As still another example, the processing device 140 may obtain object information of an object from the object information acquisition device 160 via the network 120. In some embodiments, the network 120 may be any type of wired or wireless network, or combination thereof. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points through which one or more components of the medical radiation system 100 may be connected to the network 120 to exchange data and/or information.

The terminal 130 include a mobile device 130-1, a tablet computer 130-2, a laptop computer 130-3, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, an accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, the terminal 130 may remotely operate the radiation device 110. In some embodiments, the terminal 130 may operate the radiation device 110 via a wireless connection. In some embodiments, the terminal 130 may receive information and/or instructions inputted by a user, and send the received information and/or instructions to the radiation device 110 or to the processing device 140 via the network 120. In some embodiments, the terminal 130 may receive data and/or information from the processing device 140. In some embodiments, the terminal 130 may be part of the processing device 140. In some embodiments, the terminal 130 may be omitted.

In some embodiments, the processing device 140 may process data obtained from the radiation device 110, the terminal 130, the storage device 150, or the object information acquisition device 160. For example, the processing device 140 may obtain original projection data of an object from the radiation device 110 and determine, based on the original projection data, extended projection data corresponding to one or more truncation regions of the object. The processing device 140 may generate an image of the object based on the original projection data and the extended projection data. As another example, the processing device 140 may obtain an image generated based on a target frame frequency. The processing device 140 may identify, based on the target frame frequency, a correction image configured to correct a dark current. The processing device 140 may correct the image based on the correction image. The processing device 140 may be a central processing unit (CPU), a digital signal processor (DSP), a system on a chip (SoC), a microcontroller unit (MCU), or the like, or any combination thereof.

In some embodiments, the processing device 140 may be a single server or a server group. The server group may be centralized or distributed. In some embodiments, the processing device 140 may be local or remote. For example, the processing device 140 may access information and/or data stored in the radiation device 110, the terminal 130, the object information acquisition device 160, and/or the storage device 150 via the network 120. As another example, the processing device 140 may be directly connected to the radiation device 110, the terminal 130, the object information acquisition device 160, and/or the storage device 150, to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented on a computing device 200 having one or more components illustrated in FIG. 2 in the present disclosure.

The storage device 150 may store data and/or instructions. In some embodiments, the storage device 150 may store data obtained from the terminal 130 and/or the processing device 140. For example, the storage device 150 may store one or more images obtained from the object information acquisition device 160. In some embodiments, the storage device 150 may store data and/or instructions that the processing device 140 may execute or use to perform exemplary methods described in the present disclosure. For example, the storage device 150 may store instructions that the processing device 140 may execute or use to determine extended projection data corresponding one or more truncation regions of an object. As another example, the storage device 150 may store instructions that the processing device 140 may execute or use to identify a correction image corresponding to a target frame frequency. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the medical radiation system 100 (e.g., the radiation device 110, the object information acquisition device 160, the terminal 130, the processing device 140). One or more components of the medical radiation system 100 may access the data or instructions stored in the storage device 150 via the network 120. In some embodiments, the storage device 150 may be directly connected to or communicate with one or more components of the medical radiation system 100 (e.g., the terminal 130, the processing device 140). In some embodiments, the storage device 150 may be part of the processing device 140.

FIG. 2 is a schematic diagram illustrating hardware and/or software components of an exemplary computing device according to some embodiments of the present disclosure. As illustrated in FIG. 2, the computing device 200 may include a processor 210, a storage 220, an input/output (I/O) 230, and a communication port 240. In some embodiments, the processing device 140 and/or the terminal 130 may be implemented on the computing device 200.

The processor 210 may execute computer instructions (program code) and, when executing the instructions, cause the processing device 140 to perform functions of the processing device 140 in accordance with techniques described herein. The computer instructions may include, for example, routines, programs, objects, components, signals, data structures, procedures, modules, and functions, which perform particular functions described herein. In some embodiments, the processor 210 may process data and/or images obtained from the radiation device 110, the terminal 130, the storage device 150, the object information acquisition device 160, and/or any other component of the medical radiation system 100. For example, the processing device 140 may obtain original projection data of an object from the radiation device 110 and determine, based on the original projection data, extended projection data corresponding to one or more truncation regions of the object. The processing device 140 may generate an image of the object based on the original projection data and the extended projection data. As another example, the processing device 140 may obtain an image generated based on a target frame frequency. The processing device 140 may identify, based on the target frame frequency, a correction image configured to correct a dark current. The processing device 140 may correct the image based on the correction image. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the radiation device 110, the terminal 130, the storage device 150, or any other component of the medical radiation system 100. In some embodiments, the storage 220 may include a mass storage device, removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage device 150 may store instructions that the processing device 140 may execute or use to determine extended projection data corresponding to one or more truncation regions of an object. As another example, the storage device 150 may store instructions that the processing device 140 may execute or use to identify a correction image corresponding to a target frame frequency.

The I/O 230 may input or output signals, data, and/or information. In some embodiments, the I/O 230 may enable user interaction with the processing device 140. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected to a network (e.g., the network 120) to facilitate data communications. The communication port 240 may establish connections between the processing device 140 and the radiation device 110, the terminal 130, or the storage device 150. The connection may be a wired connection, a wireless connection, or combination of both that enables data transmission and reception. The wired connection may include an electrical cable, an optical cable, a telephone wire, or the like, or any combination thereof. The wireless connection may include Bluetooth, Wi-Fi, WiMAX, WLAN, ZigBee, mobile network (e.g., 3G, 4G, 5G, etc.), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
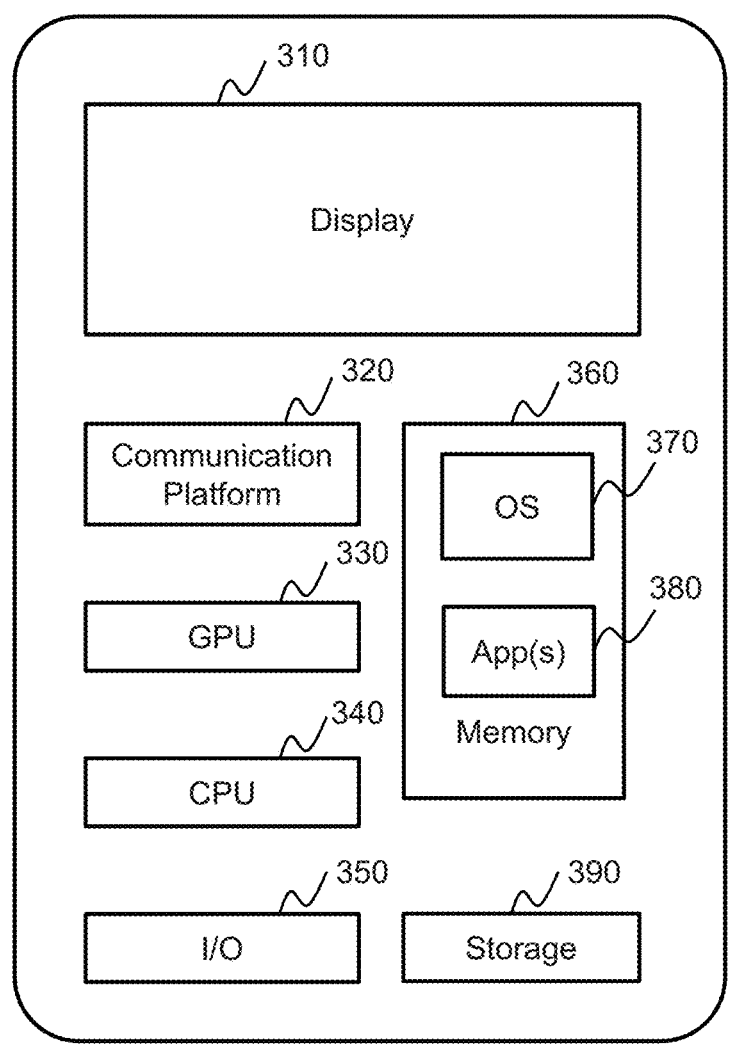
FIG. 3 is a schematic diagram illustrating hardware and/or software components of an exemplary mobile device according to some embodiments of the present disclosure.

FIG. 3 is a schematic diagram illustrating hardware and/or software components of a mobile device according to some embodiments of the present disclosure. In some embodiments, the processing device 140 and/or the terminal 130 may be implemented on the computing device 200. As illustrated in FIG. 3, the mobile device 300 may include a display 310, a communication platform 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the medical radiation system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to control exposure in medical radiation as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4:
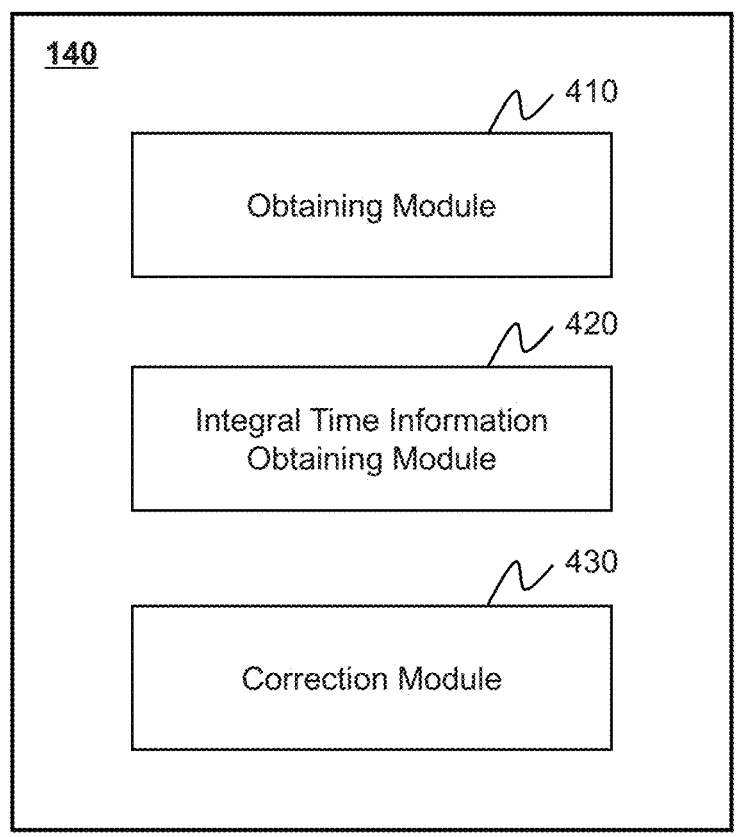
FIG. 4 is a block diagram illustrating an exemplary processing device according to some embodiments of the present disclosure.

FIG. 4 is a schematic diagram illustrating an exemplary processing device 140 according to some embodiments of the present disclosure. The processing device 140 may include an obtaining module 410, an integral time information obtaining module 420, and a correction module 430.

The obtaining module 410 may obtain an original image to be correct. The original image may be generated by scanning an object using a radiation device (e.g,. the radiation device 110 of the medical radiation system 100) including a detector (e.g., the detector 113). For example, the object may be placed on the scanning table 114 and moved into the scanning channel 118. The radiation source 112 may emit radiation rays to the object. The radiation rays may go through the object and be received by the detector 113. The detector 113 may generate imaging data of the object based on the received radiation rays. The imaging data may be transmitted from the radiation device 110 to the processing device 140 via the network 120. The processing device 140 may generate the original image of the object based on the imaging data. In some embodiments, the orignial image may be generated based on the description in FIGS. 7-22.

The obtaining module 410 may identify, among a plurality of candidate frame frequencies, a target frame frequency used to generate the original image. In some embodiments, the original image may be one of a series of images of the object. The series of images may include a representation of the object overtime including, e.g., a physiological motion (e.g., cardiac motion or breath motion) of the object. In some embodiments, the series of images may be generated in the target frame frequency.

In some embodiments, the radiation device 110 may be configured to operate under a plurality of candidate frame frequencies. When a series of images of an object needs to be generated, one of the plurality of candidate frame frequencies may be selected to be the target frame frequency used to generate the series of images. In some embodiments, the target frame frequency may be determined based on the characteristics of the object, and/or the treatment and/or the diagnosis of the object. In some embodiments, the target frame frequencies corresponding to different patients may be different. For example, the target frame frequency used to generate a series of images of the heart of a young patient may be higher than the target frame frequency used to generate a series of images of the heart of an old patient because the heart of the young patient may beat at a higher frequency than the old patient. In some embodiments, the target frame frequencies corresponding to different tissue of a same patient may be different. For example, the target frame frequency used to generate a series of images of the heart of a patient indicating cardiac motion of the patient may be higher than the target frame frequency used to generate a series of images of the lung of the patient indicating breath motion of the patient because the heart beats at a higher frequency than the lung. In some embodiments, the target frame frequencies corresponding to same tissue of a same patient may be different. For example, the target frame frequency used to generate a series of images of the heart of a patient used to diagnose the cardiac function may be higher than the target frame frequency used to generate a series of images of the heart of the patient used to diagnose the cardiac morphology because the diagnosis of the cardiac function may be more relevant to the cardiac motion than the diagnosis of the cardiac morphology.

In some embodiments, an exposure time of the detector 113 may refer to an operation time to receive radiation rays from the radiation source 112 and transform the received radiation rays into imaging data configured to generate an image. During an exposure time, a dark current may exist in the detector 113, which may affect image quality of an image as a result of the exposure time. The dark current may refer to output, which is not caused by the received radiation rays, of the detector 113. In some embodiments, the dark current may be caused by the leakage current of the thin film transistor of the detector 113. It may be necessary to perform correction on the original image to reduce or eliminate the effect of the dark current in the original image.

In some embodiments, the exposure times corresponding to different target frame frequencies may be different. For example, the higher the target frame frequency is, the shorter the expsoure time may be. Noise caused by the dark current in the orignial image may be different at different exposure times, and a parameter used to perform dark current correction on the original image may also be different. For example, the longer the exposure time corresponding to the original image is, the greater the noise of the dark current in the original image may be. In some embodiments, the parameter used to perform dark current correction on the original image may include a correction image obtained by integrating the dark current during an integral time value related to the exposure time of the original image. For example, it is assumed that the dark current is constant for a same detector. The longer the exposure time corresponding to the original image is, the longer the integral time value corresponding to a correction image used to perform dark current correction on the original image may be. Therefore, before performing dark current correction on the original image, a target integral time value needs to be determined based on the target frame frequency, thereby obtaining a correction image corresponding to the target integral time value.

The integral time information obtaining module 420 may obtain integral time information including a plurality of frequency groups and a plurality of candidate integral time values. Each of the plurality of frequency groups may correspond to one of the plurality of candidate integral time values and include one or more of the plurality of candidate frame frequencies. In some embodiments, at least one of the plurality of frequency groups may include two or more of the plurality of candidate frame frequencies.

In some embodiments, the integral time information may be generated, in advance, by the medical radiation system 100 (e.g., the processing device 140) or a device not included in the medical radiation system 100. In some embodiments, the processing device 140 may obtain the integral time information from a storage device (e.g., the storage device 150, the storage 220, or the storage 390, etc.) of the medical radiation system 100 or a device not included in the medical radiation system 100. Details related to obtaining the integral time information may be found elsewhere in the present disclosure (e.g., the description in connection with FIG. 6).

The correction module 430 may determine a target integral time value based on the target frame frequency and the integral time information. The correction module 430 may identify one of the plurality of frequency groups the target frame frequency belongs to. The correction module 430 may designate, as the target integral time value, the candidate integral time value of the frequency group the target frame frequency belongs to.

The correction module 430 may perform, based on the target integral time value, correction on the original image. In some embodiments, the processing device 140 may obtain a correction image based on the target integral time value. In some embodiments, after determining the target integral time value, the correction module 430 may generate the correction image by performing, in the range of the target integral time value, integration on the dark current of the detector 113. In some embodiments, a correction image corresponding to each of the plurality of candidate integral time values may be generated, in advance, by performing, in the range of the candidate integral time value, integration on the dark current of the detector 113. After determining the target integral time value, the correction module 430 may obtain, among the pre-generated correction images, a correction image corresponding to the target integral time value. In some embodiments, the correction module 430 may perform correction on the original image by subtracting, from pixel values of pixels of the original image, pixel values of corresponding pixels of the correction image. In some embodiments, the correction may be performed to reduce or eliminate noise, in the original image, caused by the dark current of the detector 113.

In some embodiments, the correction module 430 may determine a target integral time value of a series of images of an object based on operations 520-540 of the process 500. According to operation 550, the correction module 430 may perform, based on the target integral time value, dark current correction on one or more of the series of image.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 140 may further include a storage module (not shown in FIG. 4). The storage module may be configured to store data generated during any process performed by any component of in the processing device 140. As another example, each of components of the processing device 140 may include a storage device. Additionally or alternatively, the components of the processing device 140 may share a common storage device.

Figure 5:
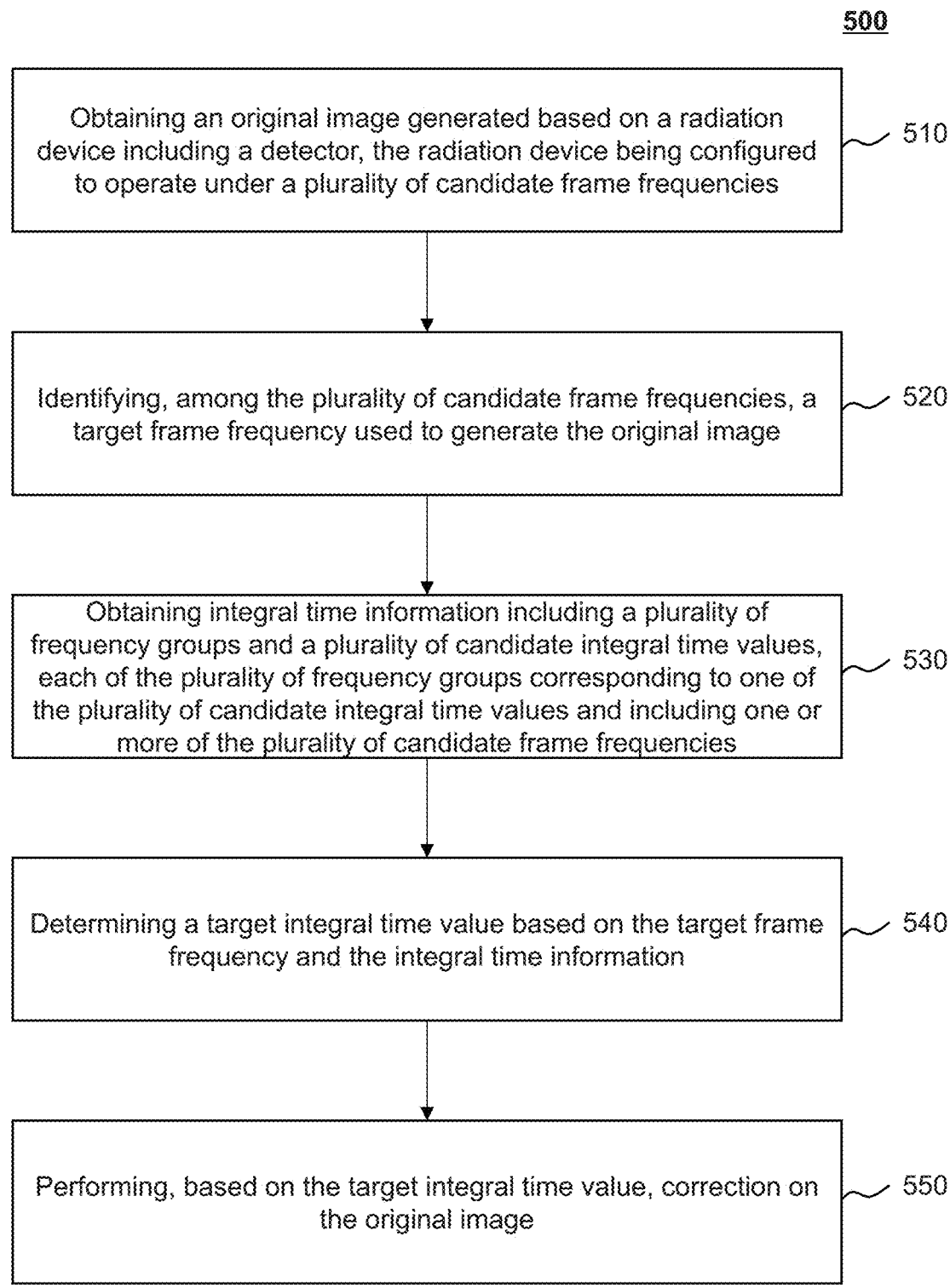
FIG. 5 is a flowchart illustrating an exemplary process for performing dark current correction on an image according to some embodiments of the present disclosure.

FIG. 5 is a flowchart illustrating an exemplary process for performing dark current correction on an image according to some embodiments of the present disclosure. In some embodiments, one or more operations of the process 500 illustrated in FIG. 5 may be implemented in the medical radiation system 100 illustrated in FIG. 1A. For example, the process 500 illustrated in FIG. 5 may be stored in a storage device (e.g., the storage device 150, and/or the storage 220) of the medical radiation system 100 in the form of instructions, and invoked and/or executed by the processing device 140 (e.g., the processor 210 of the computing device 200 as illustrated in FIG. 2, the CPU 340 of the mobile device 300 as illustrated in FIG. 3, or one or more modules of the processing device 140 illustrated in FIG. 4). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the processing device 140 (e.g, the obtaining module 410) may obtain an original image to be correct. The original image may be generated by scanning an object using a radiation device (e.g,. the radiation device 110 of the medical radiation system 100) including a detector (e.g., the detector 113). For example, the object may be placed on the scanning table 114 and moved into the scanning channel 118. The radiation source 112 may emit radiation rays to the object. The radiation rays may go through the object and be received by the detector 113. The detector 113 may generate imaging data of the object based on the received radiation rays. The imaging data may be transmitted from the radiation device 110 to the processing device 140 via the network 120. The processing device 140 may generate the original image of the object based on the imaging data. In some embodiments, the orignial image may be generated based on the description in FIGS. 7-22.

In 520, the processing device 140 (e.g, the obtaining module 410) may identify, among a plurality of candidate frame frequencies, a target frame frequency used to generate the original image. In some embodiments, the original image may be one of a series of images of the object. The series of images may include a representation of the object over time including, e.g., a physiological motion (e.g., cardiac motion or breath motion) of the object. In some embodiments, the series of images may be generated in the target frame frequency.

In some embodiments, the radiation device 110 may be configured to operate under a plurality of candidate frame frequencies. When a series of images of an object needs to be generated, one of the plurality of candidate frame frequencies may be selected to be the target frame frequency used to generate the series of images. In some embodiments, the target frame frequency may be determined based on the characteristics of the object, and/or the treatment and/or the diagnosis of the object. In some embodiments, the target frame frequencies corresponding to different patients may be different. For example, the target frame frequency used to generate a series of images of the heart of a young patient may be higher than the target frame frequency used to generate a series of images of the heart of an old patient because the heart of the young patient may beat at a higher frequency than the old patient. In some embodiments, the target frame frequencies corresponding to different tissue of a same patient may be different. For example, the target frame frequency used to generate a series of images of the heart of a patient indicating cardiac motion of the patient may be higher than the target frame frequency used to generate a series of images of the lung of the patient indicating breath motion of the patient because the heart beats at a higher frequency than the lung. In some embodiments, the target frame frequencies corresponding to same tissue of a same patient may be different. For example, the target frame frequency used to generate a series of images of the heart of a patient used to diagnose the cardiac function may be higher than the target frame frequency used to generate a series of images of the heart of the patient used to diagnose the cardiac morphology because the diagnosis of the cardiac function may be more relevant to the cardiac motion than the diagnosis of the cardiac morphology.

In some embodiments, an exposure time of the detector 113 may refer to an operation time to receive radiation rays from the radiation source 112 and transform the received radiation rays into imaging data configured to generate an image. During an exposure time, a dark current may exist in the detector 113, which may affect image quality of an image as a result of the exposure time. The dark current may refer to output, which is not caused by the received radiation rays, of the detector 113. In some embodiments, the dark current may be caused by the leakage current of the thin film transistor of the detector 113. It may be necessary to perform correction on the original image to reduce or eliminate the effect of the dark current in the original image.

In some embodiments, the exposure times corresponding to different target frame frequencies may be different. For example, the higher the target frame frequency is, the shorter the expsoure time may be. Noise caused by the dark current in the orignial image may be different at different exposure times, and a parameter used to perform dark current correction on the original image may also be different. For example, the longer the exposure time corresponding to the original image is, the greater the noise of the dark current in the original image may be. In some embodiments, the parameter used to perform dark current correction on the original image may include a correction image obtained by integrating the dark current during an integral time value related to the exposure time of the original image. For example, it is assumed that the dark current is constant for a same detector. The longer the exposure time corresponding to the original image is, the longer the integral time value corresponding to a correction image used to perform dark current correction on the original image may be. Therefore, before performing dark current correction on the original image, a target integral time value needs to be determined based on the target frame frequency, thereby obtaining a correction image corresponding to the target integral time value.

In 530, the processing device 140 (e.g., the integral time information obtaining module 420) may obtain integral time information including a plurality of frequency groups and a plurality of candidate integral time values. Each of the plurality of frequency groups may correspond to one of the plurality of candidate integral time values and include one or more of the plurality of candidate frame frequencies. In some embodiments, at least one of the plurality of frequency groups may include two or more of the plurality of candidate frame frequencies.

In some embodiments, the integral time information may be generated, in advance, by the medical radiation system 100 (e.g., the processing device 140) or a device not included in the medical radiation system 100. In some embodiments, the processing device 140 may obtain the integral time information from a storage device (e.g., the storage device 150, the storage 220, or the storage 390, etc.) of the medical radiation system 100 or a device not included in the medical radiation system 100. Details related to obtaining the integral time information may be found elsewhere in the present disclosure (e.g., the description in connection with FIG. 6).

In 540, the processing device 140 (e.g., the correction module 430) may determine a target integral time value based on the target frame frequency and the integral time information. The processing device 140 may identify one of the plurality of frequency groups the target frame frequency belongs to. The processing device 140 may designate, as the target integral time value, the candidate integral time value of the frequency group the target frame frequency belongs to.

In 550, the processing device 140 (e.g., the correction module 430) may perform, based on the target integral time value, correction on the original image. In some embodiments, the processing device 140 may obtain a correction image based on the target integral time value. In some embodiments, after determining the target integral time value, the processing device 140 may generate the correction image by performing, in the range of the target integral time value, integration on the dark current of the detector 113. In some embodiments, a correction image corresponding to each of the plurality of candidate integral time values may be generated, in advance, by performing, in the range of the candidate integral time value, integration on the dark current of the detector 113. After determining the target integral time value, the processing device 140 may obtain, among the pre-generated correction images, a correction image corresponding to the target integral time value. In some embodiments, the processing device 140 may perform correction on the original image by subtracting, from pixel values of pixels of the original image, pixel values of corresponding pixels of the correction image. In some embodiments, the correction may be performed to reduce or eliminate noise, in the original image, caused by the dark current of the detector 113.

In some embodiments, the processing device 140 may determine a target integral time value of a series of images of an object based on operations 520-540 of the process 500. According to operation 550, the processing device 140 may perform, based on the target integral time value, dark current correction on one or more of the series of image.

In some embodiments, a same correction image may be used as a correction parameter to perform dark current correction on images acquired by different frame frequencies. Compared to providing a correction image for each of the plurality of candidate frame frequencies, in the process 500, fewer correction images may be stored in the medical radiation system 100, and fewer correction images may be searched to find a correction image corresponding to the target frame frequency, which may reduce image correction time and simplify the searching logic of the processing device 140 to obtain a correction image corresponding to the target frame frequency, thereby improving the efficiency of image correction.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 6:
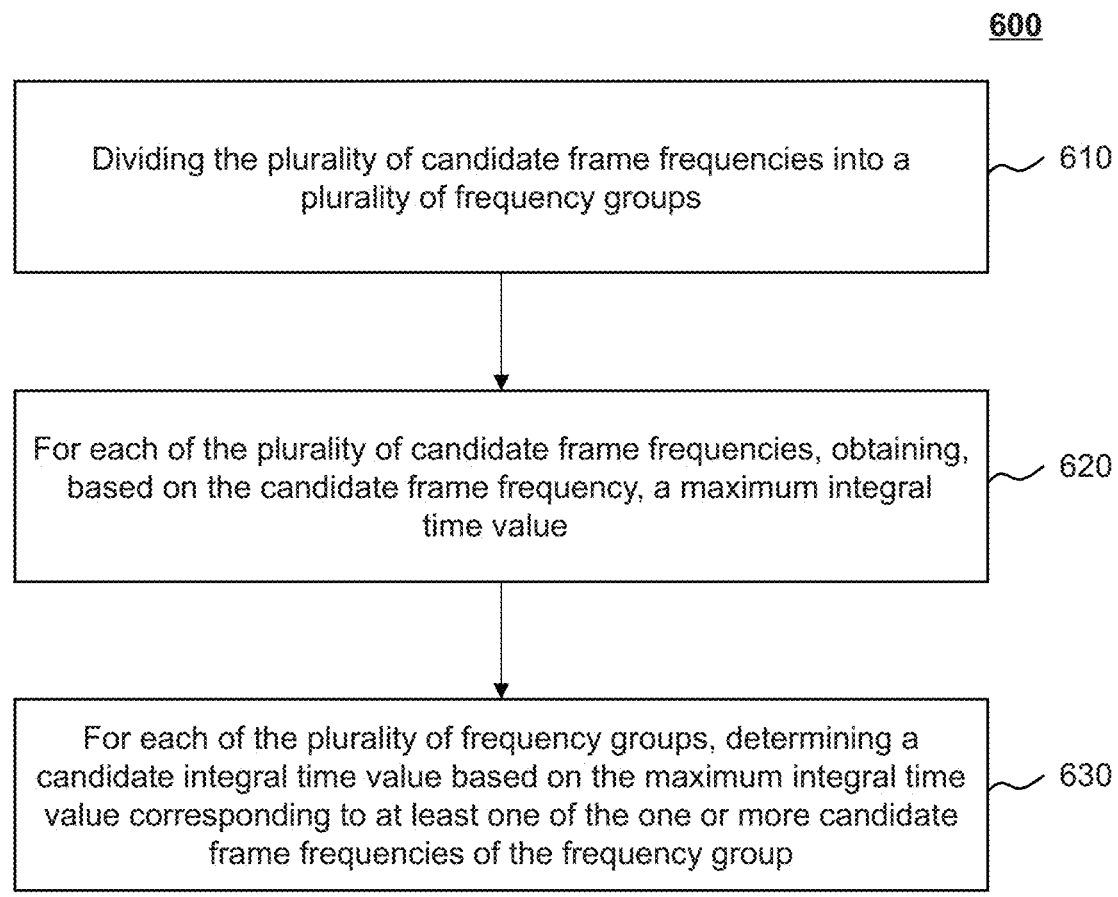
FIG. 6 is a flowchart illustrating an exemplary process for obtaining integral time information according to some embodiments of the present disclosure.

FIG. 6 is a flowchart illustrating an exemplary process for obtaining integral time information according to some embodiments of the present disclosure. In some embodiments, the medical radiation system 100 (e.g., the processing device 140) or a device not included in the medical radiation system 100 may generate, in advance, the integral time information based on the process 600.

In 610, the plurality of candidate frame frequencies may be divided into a plurality of frequency groups.

In some embodiments, the plurality of candidate frame frequencies may be divided into a first frequency group and a second frequency group. The first frequency group may include one of the plurality of candidate frame frequencies with a maximum frame frequency, and the second frequency group may include the rest of the plurality of candidate frame frequencies. For example, the plurality of candidate frame frequencies may include 1 f/s, 2 f/s, 4 f/s, 8 f/s, 10 f/s, 12.5 f/s, and 25 f/s. The first frequency group may include 25 f/s, and the second frequency group may include 1 f/s, 2 f/s, 4 f/s, 8 f/s, 10 f/s, and 12.5 f/s.

In some embodiments, the plurality of candidate frame frequencies may be ranked based on an order of values of the plurality of candidate frame frequencies. The plurality of candidate frame frequencies may be divided into the plurality of frequency groups based on the ranking and a count threshold greater than one. A count of the candidate frame frequencies in each of the plurality of frequency groups may be less than or equal to the count threshold. In some embodiments, the plurality of candidate frame frequencies may be ranked in an ascending order of the values of the plurality of candidate frame frequencies. In some embodiments, a count of the candidate frame frequencies in a last frequency group of the plurality of frequency groups, according to the ranking, may be less than or equal to the count threshold. A count of the candidate frame frequencies in each of the rest of the plurality of frequency groups may be equal to the count threshold. For example, the ranking result according to an ascending order of the values of the plurality of candidate frame frequencies may be represent as 1 f/s, 2 f/s, 4 f/s, 8 f/s, 10 f/s, 12.5 f/s, and 25 f/s. The plurality of candidate frame frequencies may be divided into a first frequency group including 1 f/s and 2 f/s, a second frequency group including 4 f/s and 8 f/s, a third frequency group including 10 f/s and 12.5 f/s, and a fourth frequency group including 25f/s. As another example, the plurality of candidate frame frequencies may be divided into a first frequency group including 1 f/s and 2 f/s, a second frequency group including 4 f/s, 8 f/s, 10 f/s, and 12.5 f/s, and a third frequency group including 25f/s.

In 620, for each of the plurality of candidate frame frequencies, a maximum integral time value may be obtained based on the candidate frame frequency. In some embodiments, the maximum integral time value corresponding to a candidate frame frequency may be equal to the reciprocal of the candidate frame frequency. For example, the plurality of candidate frame frequencies may include 1 frame/second (f/s), 2 f/s, 4 f/s, 8 f/s, 10 f/s, 12.5 f/s, and 25 f/s, and the corresponding maximum integral time values may be 1000 ms, 500 ms, 250 ms, 125 ms, 100 ms, 80 ms, and 40 ms, respectively.

In 630, for each of the plurality of frequency groups, the candidate integral time value may be determined based on the maximum integral time value corresponding to at least one of the one or more candidate frame frequencies of the frequency group. In some embodiments, the maximum integral time value corresponding to a maximum candidate frame frequency of the frequency group may be designated as the candidate integral time value of the frequency group.

For example, the pluality of candidate frame frequencies may include 1 f/s, 2 f/s, 4 f/s, 8 f/s, 10 f/s, 12.5 f/s, and 25 f/s, and the corresponding maximum integral time values may be 1000 ms, 500 ms, 250 ms, 125 ms, 100 ms, 80 ms, and 40 ms, respectively. The pluality of candidate frame frequencies may be divided into a first frequency group including 25 f/s, and a second frequency group including 1 f/s, 2 f/s, 4 f/s, 8 f/s, 10 f/s, and 12.5 f/s. The maximum integral time value 40 ms of 25 f/s may be designated as the candidate integral time value of the first refequency group. The maximum integral time value 80 ms of 12.5 f/s may be designated as the candidate integral time value of the second refequency group.

The shorter the time of emitting radiation rays (also referred to as a radiation time) to a patient is, the smaller the impact of the patient's motion on the resultant image may be, and the lower the radiation dose absorbed by the patient may be. Therefore, a radiation time used to generate an image may be short, e.g., usually shorter than 150 ms. When the frame frequency used to generate an image is 1 f/s, if the exposure time is 1000 ms, the radiation time may be set to be no more than 150 ms. Within the exposure time of 1000 ms, radiation rays may be present in less than 150 ms. Therefore, a correction image generated based on 80 ms may eliminate most of the noise caused by the dark current in images corresponding to 1 f/s, 2 f/s, 4 f/s, 8 f/s, and 10 f/s.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
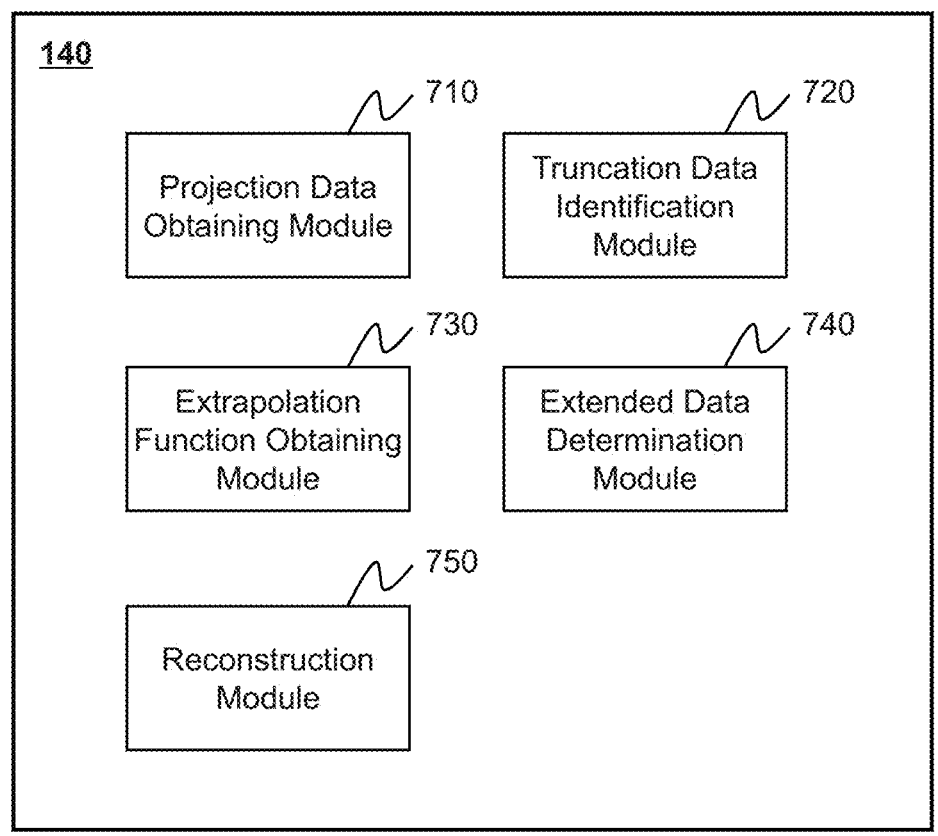
FIG. 7 is a block diagram illustrating an exemplary processing device according to some embodiments of the present disclosure.

FIG. 7 is a block diagram illustrating an exemplary processing device according to some embodiments of the present disclosure. In some embodiments, the processing device 140 may include a projection data obtaining module 710, a truncation data identification module 720, an extrapolation function obtaining module 730, an extended data determination module 740, and a reconstruction module 750.

The projection data obtaining module 710 may obtain original projection data of an object.

In some embodiments, the original projection data may be acquired by scanning the object using a radiation device (e.g., the radiation device 110 of the medical radiation system 100) from one or more imaging projection views. For example, the object may be placed on the scanning table 114 and moved into the scanning channel 118. The radiation source 112 may emit radiation rays to the object. The radiation rays may go through the object and be received by the detector 113. The original projection data of the object may be generated based on the radiation rays received by the detector 113. After the radiation rays go through the object, the intensity of the radiation rays may be attenuated by the object. In some embodiments, the original projection data may include a plurality of projection values each of which corresponding to a detector element of the detector 113 and one of the one or more imaging projection views. A projection value may indicate the intensity of the radiation rays detected by one of the plurality of detector elements of the detector matrix of the detector at one of the one or more imaging projection views.

In some embodiments, the radiation source 112 and/or the detector 113 may rotate around the object (e.g., around the Z axis in FIG. 1A). A projection view may indicate a location of the radiation source 112 and/or the detector 113 on the gantry 111 during the radiation.

In some embodiments, to image the object, the radiation source 112 may rotate around the object (e.g., around the Z axis in FIG. 1A) for at least 180°+θ. The radiation rays emitted from the radiation source 112 may form a radiation beam. θ refers to a fan angle of the radiation beam. During the rotation for the at least 180°+θ, the radiation source 112 may emit a radiation beam to the object from one or more imaging projection views (also referred to as imaging projection angles). In some embodiments, a projection view may refer to an angle between the ground or a line vertical to the ground, and the center line of the radiation beam at the projection view. Alternatively, an initial projection view may be preset. A projection view may refer to an angle between the center line of the radiation beam at the initial projection view and the center line of the radiation beam at the projection view. In some embodiments, the angles between any two neighboring imaging projection views of the one or more imaging projection views may be the same or different.

In some embodiments, before the object is scanned, one or more scanning parameters may be set. The radiation device 110 may scan the object from the one or more imaging projection views based on the one or more scanning parameters. In some embodiments, the one or more scanning parameters may include a fan angle of the radiation beam emitted from the radiation source 112, a source-to-detector distance (SDD) of the radiation device 110, a source-to-object distance (SOD) of the radiation device 110, a source-to-axis distance (SAD) of the radiation device 110, or the like, or any combination thereof. A field of view (FOV) of the radiation device 110 may be determined based on the one or more scanning parameters. In some embodiments, the FOV of the radiation device 110 may include a region covered by the radiation rays emitted from the radiation source 112.

In some embodiments, in each of at least one of the one or more imaging projection views (also referred to as a truncation projection view), there may be at least one truncation region of the object located outside the FOV of the radiation device 110. For example, at a truncation projection view, there may be at least one truncation region of the object, of which a projection exceeds at least one edge, along the row direction, of the detector matrix of the detector 113, which indicates that truncation occurs at the at least one edge of the detector 113 at the truncation projection view. A projection view in which the object is completely covered by the FOV of the radiation device 110 may be referred to as a non-truncated projection view. The original projection data acquired from a truncation projection view may be referred to as truncation projection data. The original projection data acquired from a non-truncated projection view may be referred to as non-truncated projection data.

Figure 9:
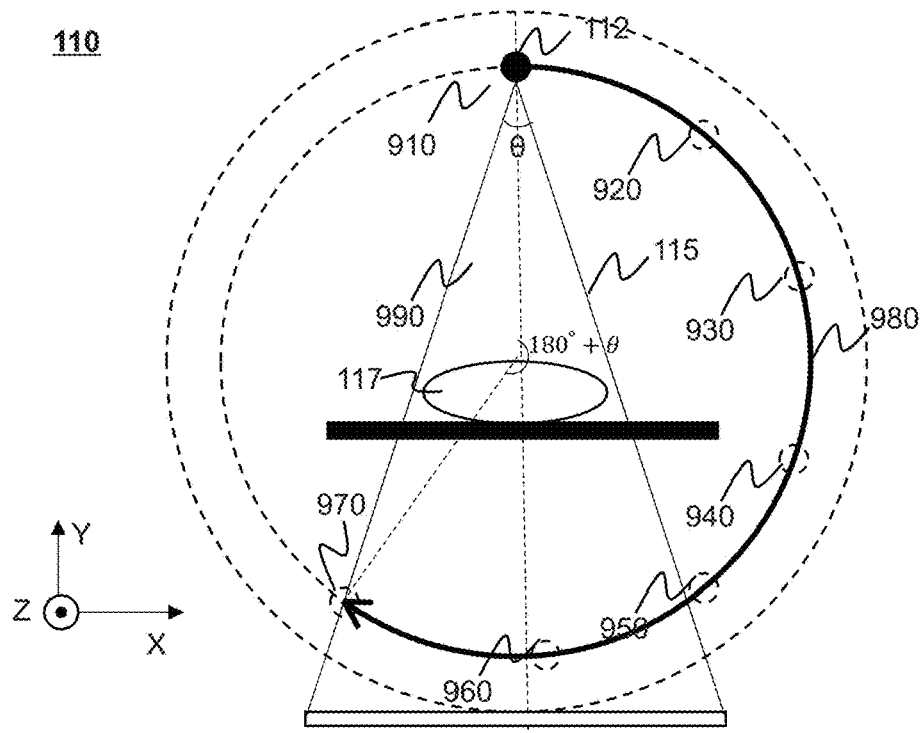
FIG. 9 is a schematic diagrams illustrating exemplary projection views in a radiation device according to some embodiments of the present disclosure.

For example, as shown in FIG. 9, when the radiation device 110 scans the object 117 from the projection view 910, the object 117 is completely covered by the radiation rays 115 (e.g., completely covered by the FOV 990). The projection view 910 may be referred to as a non-truncated projection view. The original projection data acquired from the projection view 910 may be referred to as non-truncated projection data.

Figure 11:
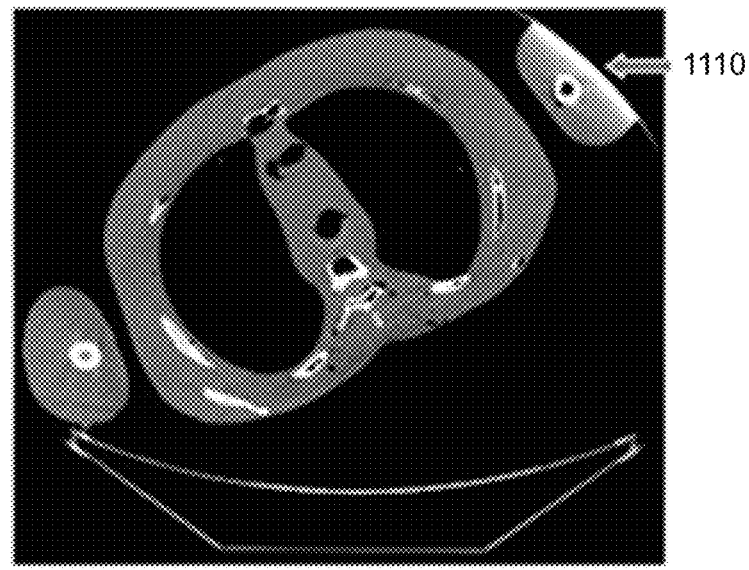
FIG. 11 is a schematic diagram illustrating an exemplary image including artifacts caused by truncation projection data according to some embodiments of the present disclosure.

In some embodiments, an image generated based on original projection data including truncation projection data may include artifacts at the edge of the image. For example, FIG. 11 is a schematic diagram illustrating an exemplary image including artifacts caused by truncation projection data according to some embodiments of the present disclosure. As shown in FIG. 11, the image 1100 may be generated based on original projection data including truncation projection data. The image 1100 may include artifacts 1110 at the edge of the image 1100.

In some embodiments, the processing device 140 may obtain the original projection data by scanning the object using the radiation device 110. In some embodiments, the processing device 140 may obtain, from a storage device (e.g., the storage device 150, the storage 220, etc.) of the medical radiation system 100, the original projection data that has been previously acquired by the radiation device 110.

The truncation data identification module 720 may identify truncation projection data of the original projection data.

In some embodiments, as used herein, the original projection data acquired from one of the one or more imaging projection views may be referred to as first partial projection data of the original projection data. In some embodiments, for each of the one or more imaging projection views, the truncation data identification module 720 may determine whether the corresponding first partial projection data belongs to truncation projection data. In response to determining that the first partial projection data belongs to truncation projection data, it may indicate that truncation occurs at the projection view.

In some embodiments, the truncation data identification module 720 may obtain reference data of the object. The reference data may include a complete projection of the object. Details regarding obtaining the reference data may be found elsewhere in the present disclosure (e.g., the description in connection with the operation 1210 of the process 1200 in FIG. 12, the process 1300-1 in FIG. 13A, and the process 1300-2 in FIG. 13B). For one of the one or more imaging projection views, the truncation data identification module 720 may determine, based on the reference data, whether the corresponding first projection data belongs to truncation projection data. Details regarding determining, based on the reference data, whether the first projection data belongs to truncation projection data may be found elsewhere in the present disclosure (e.g., the description in connection with the operation 1230 of the process 1200 in FIG. 12).

In some embodiments, as used herein, the original projection data acquired by one of the one or more detector rows of the detector matrix of the detector 113 and from one of the one or more imaging projection views may be referred to as second partial projection data of the original projection data. In some embodiments, as used herein, the two ends (e.g., edges 1740 and 1750 of the detector row 1700 shown in FIG. 17) of a detector row of the detector 113 along the row direction may be referred to as two row edges of the detector row. In some embodiments, for each row edge of each of the one or more detector rows and each of the one or more imaging projection views, the truncation data identification module 720 may determine whether the corresponding second partial projection data belongs to truncation projection data. In response to determining that the second partial projection data belongs to truncation projection data, it may indicate that truncation occurs at the row edge of the detector row at the imaging projection view. In this case, the row edge may be referred to as a truncated edge of the detector row at the imaging projection view.

Figure 13A:
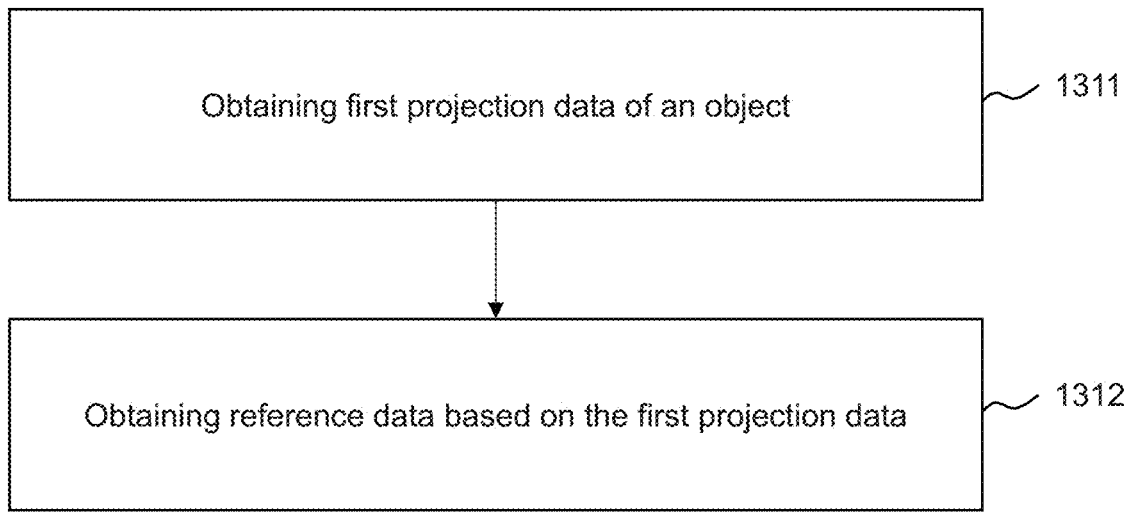
FIGS. 13A and 13B are flowcharts illustrating exemplary imaging processes according to some embodiments of the present disclosure.
Figure 13B:
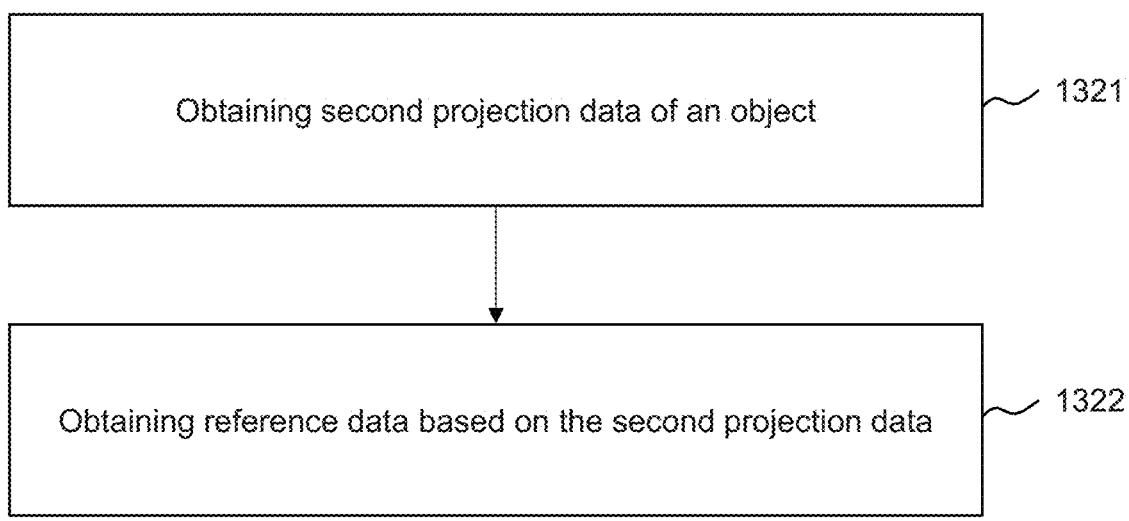
Figure 13C:
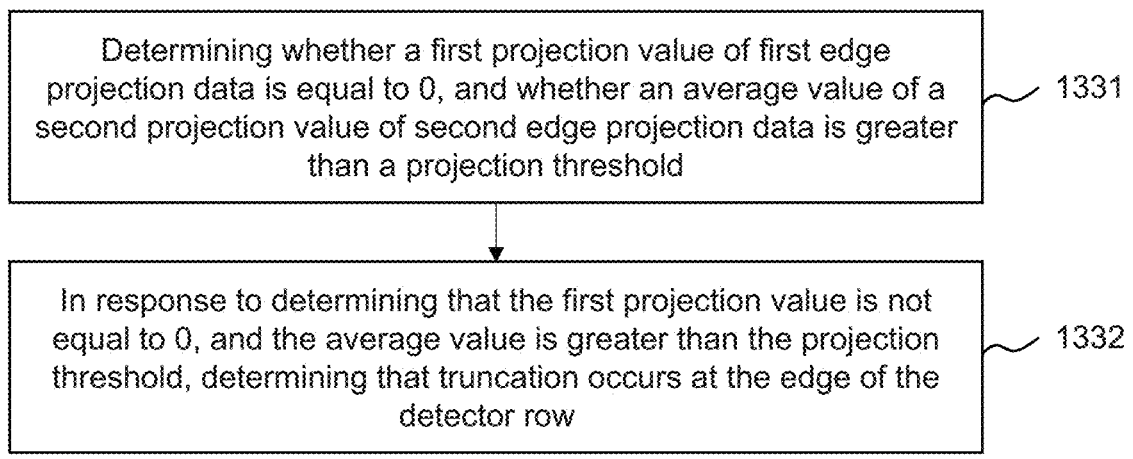
FIG. 13C is a flowchart illustrating an exemplary process for identifying truncation projection data according to some embodiments of the present disclosure.

In some embodiments, the truncation data identification module 720 may identify a truncated edge of a detector row based on the corresponding second partial projection data (details may be found elsewhere in the present disclosure, e.g., the description in connection with the process 1300-3 in FIG. 13C).

In some embodiments, in response to determining that truncation occurs at an imaging projection view or at a row edge of a detector row corresponding an imaging projection view, the processing device 140 may determine, based on operations 830-840, supplement projection view corresponding to the truncation. The supplement projection view corresponding to the truncation may indicate a projection of at least one truncation region of the object at the imaging projection view, or a projection of a truncation region of the object at the truncated edge in the imaging projection view.

The extrapolation function obtaining module 730 may obtain a target extrapolation function. In some embodiments, the target extrapolation function may include a linear function, a quadratic function, a logarithmic function, a sine function, a cosine function, an S-shaped function, a transformation thereof, or the like. In some embodiments, the target extrapolation function may include an extrapolation function used in an extrapolation algorithm, such as a mirror extrapolation algorithm or a linear extrapolation algorithm, etc.

In some embodiments, for each truncation projection view of the one or more imaging projection views, the extrapolation function obtaining module 730 may obtain a target extrapolation function. As least two of the one or more target extrapolation functions corresponding to the one or more truncation projection views may be the same or different. In some embodiments, for each truncated edge of the one or more detector rows at the one or more imaging projection views, the extrapolation function obtaining module 730 may obtain a target extrapolation function. The one or more target extrapolation functions corresponding to the one or more truncated edges may be the same or different.

In some embodiments, for a truncated edge, the extrapolation function obtaining module 730 may determine supplement information based on the reference data and the corresponding second partial projection data. The extrapolation function obtaining module 730 may obtain a target extrapolation function corresponding to the truncated edge based on the supplement information (details may be found elsewhere in the present disclosure, e.g., the description in connection with the process 1800 in FIG. 18).

Figure 19:
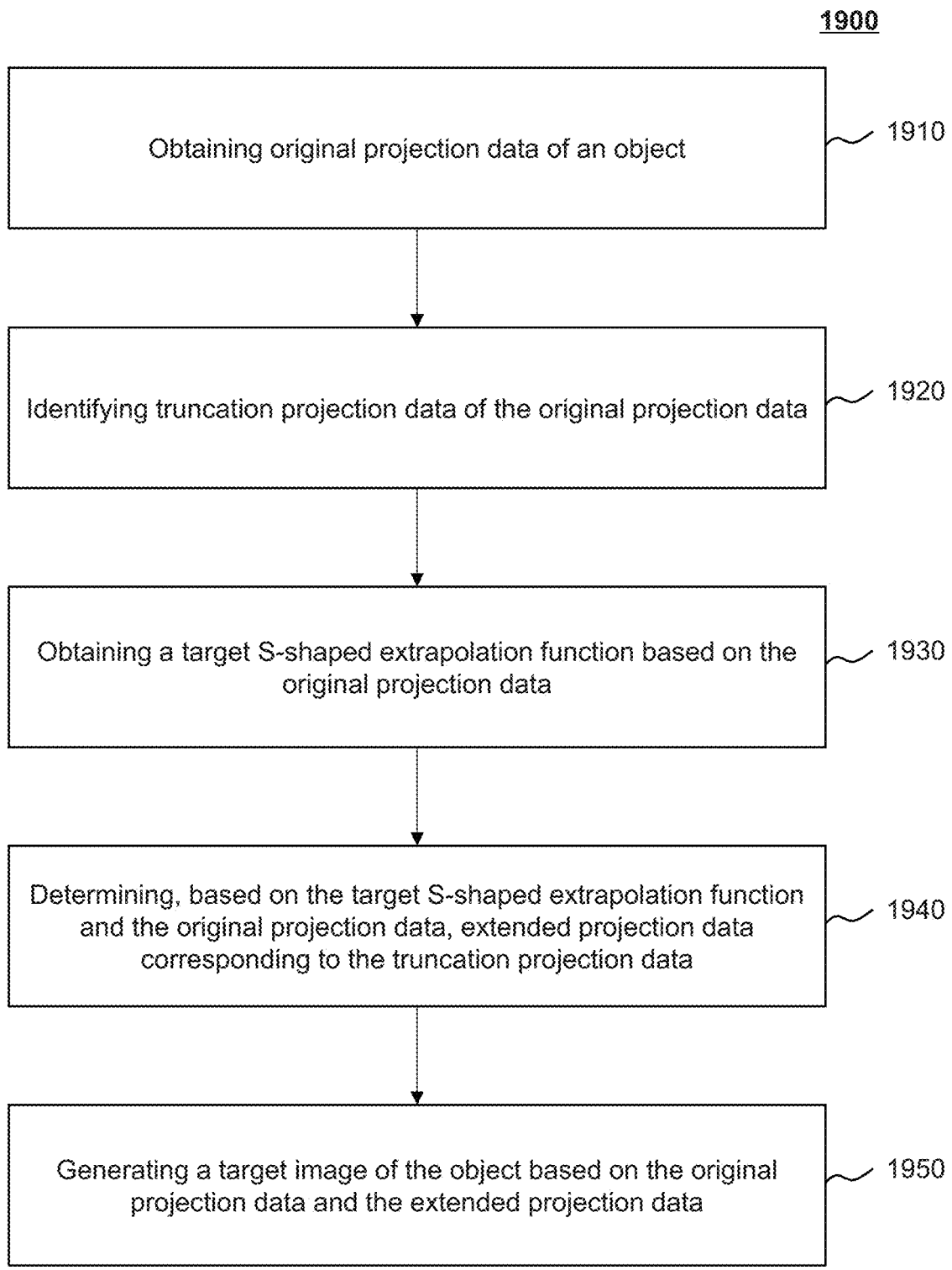
FIG. 19 is a flowchart illustrating an exemplary imaging process according to some embodiments of the present disclosure.

In some embodiments, for a truncated edge, the extrapolation function obtaining module 730 may obtain a target S-shaped extrapolation function corresponding to the truncated edge based on the corresponding second partial projection data (details may be found elsewhere in the present disclosure, e.g., the description in connection with the operation 1930 of the process 1900 in FIG. 19).

The extended data determination module 740 may determine, based on the target extrapolation function and the original projection data, extended projection data corresponding to the truncation projection data. In some embodiments, the extended projection data may correspond to the at least one truncation region of the object at the at least one truncation projection view of the one or more imaging projection views. In some embodiments, the extended projection data may correspond to a projection of the at least one truncation region of the object at the at least one truncation projection view of the one or more imaging projection views. In some embodiments, the extended data determination module 740 may determine an extrapolation width of the detector 113 based on the original projection data. The extended data determination module 740 may determine, based on the target extrapolation function, the extrapolation width, and the original projection data, the extended projection data corresponding to the truncation projection data. Details regarding determining the extended projection data may be found elsewhere in the present disclosure (e.g., the description in connection with the operation 1250 of the process 1200 in FIG. 12 and the operation 1940 of the process 1900 in FIG. 19).

In some embodiments, the extended data determination module 740 may update the extended projection data based on the reference data to make a surface integral of a combination of the extended projection data and the original projection data closer to a surface integral of the reference data (details may be found elsewhere in the present disclosure, e.g., the description in connection with the operation 1250 of the process 1200 in FIG. 12).

The reconstruction module 750 may generate a target image of the object based on the original projection data and the extended projection data. In some embodiments, the reconstruction module 750 may generate the target image of the object by performing two-dimensional (2D) or three-dimensional (3D) reconstruction on the original projection data and the extended projection data. In some embodiments, the reconstruction module 750 may generate the target image of the object by reconstructing the original projection data and the extended projection data using, for example, a back-projection algorithm (e.g., a filtered back-projection (FBP) algorithm), an iterative reconstruction algorithm (e.g., an algebraic reconstruction technique (ART) algorithm and a total variation minimization regularization algorithm), a Fourier-transform based algorithm (e.g., a direct Fourier algorithm), a statistical algorithm (e.g., a maximum-likelihood expectation-maximization algorithm), a Feldkamp-Davis-Kress (FDK) algorithm, or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 140 may further include a storage module (not shown in FIG. 7). The storage module may be configured to store data generated during any process performed by any component in the processing device 140. As another example, each of components of the processing device 140 may include a storage device. Additionally or alternatively, the components of the processing device 140 may share a common storage device.

Figure 8:
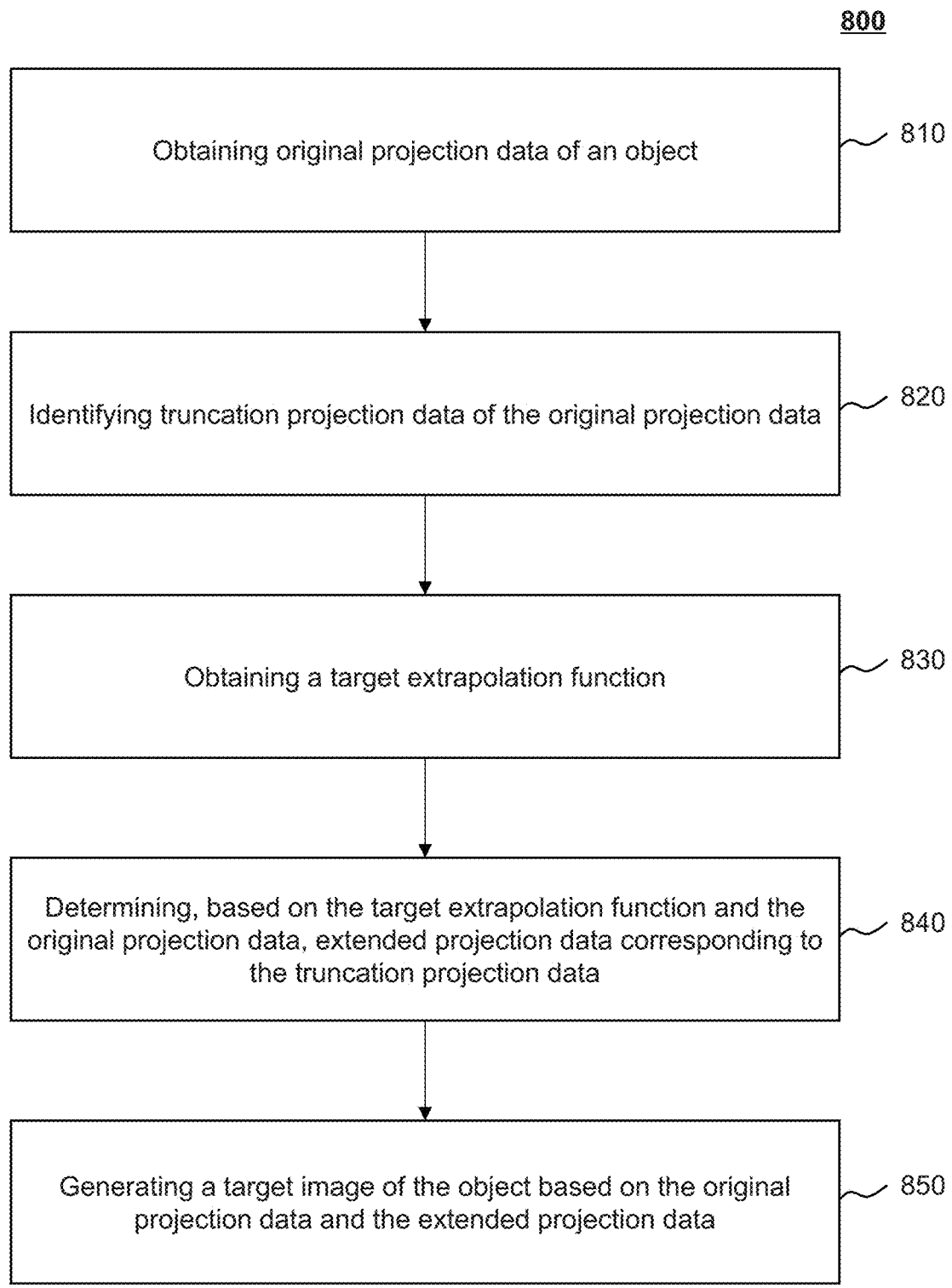
FIG. 8 is a flowchart illustrating an exemplary imaging process according to some embodiments of the present disclosure.

FIG. 8 is a flowchart illustrating an exemplary imaging process according to some embodiments of the present disclosure. In some embodiments, one or more operations of the process 800 illustrated in FIG. 8 may be implemented in the medical radiation system 100 illustrated in FIG. 1A. For example, the process 800 illustrated in FIG. 8 may be stored in a storage device (e.g., the storage device 150, and/or the storage 220) of the medical radiation system 100 in the form of instructions, and invoked and/or executed by the processing device 140 (e.g., the processor 210 of the computing device 200 as illustrated in FIG. 2, the CPU 340 of the mobile device 300 as illustrated in FIG. 3, or one or more modules of the processing device 140 illustrated in FIG. 7). The operations of the illustrated process presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting.

In 810, the processing device 140 (e.g., the projection data obtaining module 710) may obtain original projection data of an object.

In some embodiments, the original projection data may be acquired by scanning the object using a radiation device (e.g,. the radiation device 110 of the medical radiation system 100) from one or more imaging projection views. For example, the object may be placed on the scanning table 114 and moved into the scanning channel 118. The radiation source 112 may emit radiation rays to the object. The radiation rays may go through the object and be received by the detector 113. The original projection data of the object may be generated based on the radiation rays received by the detector 113. After the radiation rays go through the object, the intensity of the radiation rays may be attenuated by the object. In some embodiments, the original projection data may include a plurality of projection values each of which corresponding to a detector element of the detector 113 and one of the one or more imaging projection views. A projection value may indicate the intensity of the radiation rays detected by one of the plurality of detector elements of the detector matrix of the detector at one of the one or more imaging projection views.

In some embodiments, the radiation source 112 and/or the detector 113 may rotate around the object (e.g., around the Z axis in FIG. 1A). A projection view may indicate a location of the radiation source 112 and/or the detector 113 on the gantry 111 during the radiation.

In some embodiments, to image the object, the radiation source 112 may rotate around the object (e.g., around the Z axis in FIG. 1A) for at least 180°+θ. The radiation rays emitted from the radiation source 112 may form a radiation beam. θ refers to a fan angle of the radiation beam. During the rotation for the at least 180°+θ, the radiation source 112 may emit a radiation beam to the object from one or more imaging projection views (also referred to as imaging projection angles). In some embodiments, a projection view may refer to an angle between the ground or a line vertical to the ground, and the center line of the radiation beam at the projection view. Alternatively, an initial projection view may be preset. A projection view may refer to an angle between the center line of the radiation beam at the initial projection view and the center line of the radiation beam at the projection view. In some embodiments, the angles between any two neighboring imaging projection views of the one or more imaging projection views may be the same or different.

For example, FIG. 9 is a schematic diagrams illustrating exemplary projection views in the radiation device 110 according to some embodiments of the present disclosure. The radiation device 110 shown in FIG. 9 is a view of the radiation device 110 seen from the direction facing the front of the radiation device 110 (e.g., along the negative Z direction in FIG. 1A). The X axis, the Y axis, and the Z axis in FIG. 9 may correspond to those in FIGS. 1A-1C. As shown in FIG. 9, the radiation source 112 may rotate around the object 117 for 180°+θ, e.g., along the trajectory 980 (e.g., the are 980 represented as a solid line in FIG. 9) from the projection view 910 to the projection view 970. θ refers to a fan angle of the radiation beam 115. During the rotation for 180°+θ, the radiation source 112 may emit the radiation beam 115 to the object 117 at projection views 910-970. For example, the projection view 910 may be preset as an initial projection view. The projection view 910 may be represented as 0°. The projection view 970 may be represented as 180°+θ.

In some embodiments, before the object is scanned, one or more scanning parameters may be set. The radiation device 110 may scan the object from the one or more imaging projection views based on the one or more scanning parameters. In some embodiments, the one or more scanning parameters may include a fan angle of the radiation beam emitted from the radiation source 112, a source-to-detector distance (SDD) of the radiation device 110, a source-to-object distance (SOD) of the radiation device 110, a source-to-axis distance (SAD) of the radiation device 110, or the like, or any combination thereof. A field of view (FOV) of the radiation device 110 may be determined based on the one or more scanning parameters. In some embodiments, the FOV of the radiation device 110 may include a region covered by the radiation rays emitted from the radiation source 112.

In some embodiments, in each of at least one of the one or more imaging projection views (also referred to as a truncation projection view), there may be at least one truncation region of the object located outside the FOV of the radiation device 110. For example, at a truncation projection view, there may be at least one truncation region of the object, of which a projection exceeds at least one edge, along the row direction, of the detector matrix of the detector 113, which indicates that truncation occurs at the at least one edge of the detector 113 at the truncation projection view. A projection view in which the object is completely covered by the FOV of the radiation device 110 may be referred to as a non-truncated projection view. The original projection data acquired from a truncation projection view may be referred to as truncation projection data. The original projection data acquired from a non-truncated projection view may be referred to as non-truncated projection data.

For example, as shown in FIG. 9, when the radiation device 110 scans the object 117 from the projection view 910, the object 117 is completely covered by the radiation rays 115 (e.g., completely covered by the FOV 990). The projection view 910 may be referred to as a non-truncated projection view. The original projection data acquired from the projection view 910 may be referred to as non-truncated projection data.

Figure 10A:
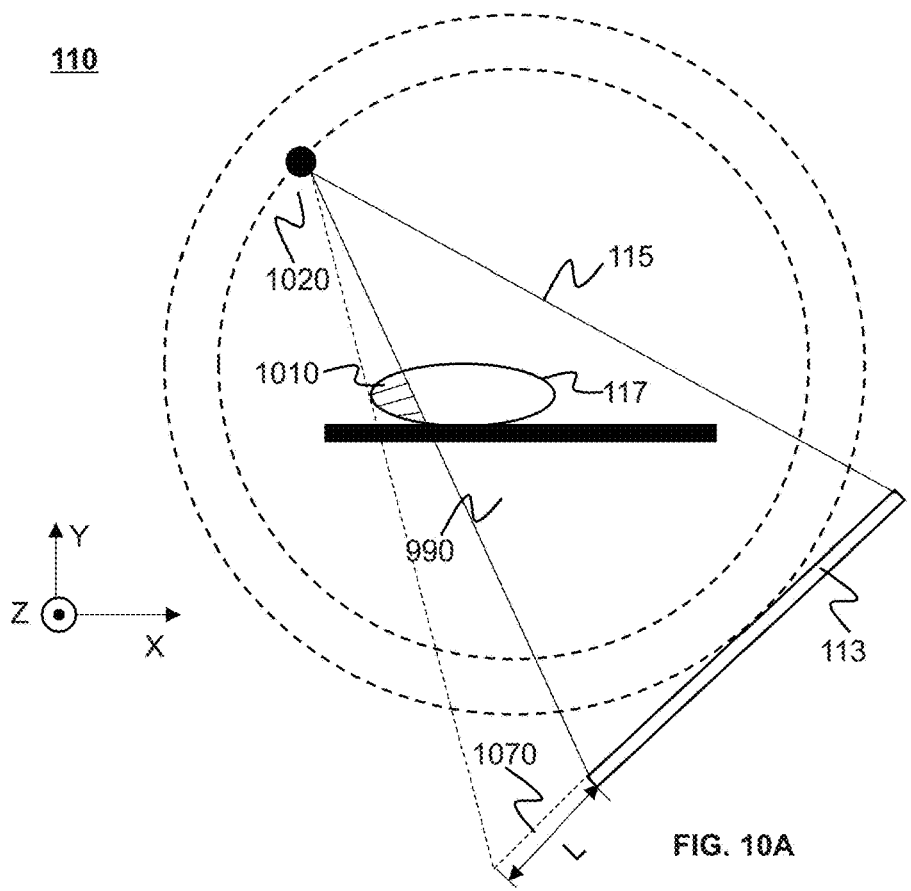
FIG. 10A is a schematic diagram illustrating an exemplary truncation region of an object according to some embodiments of the present disclosure.

As another example, FIG. 10A is a schematic diagram illustrating an exemplary truncation region of an object according to some embodiments of the present disclosure. The radiation device 110 shown in FIG. 10A is a view of the radiation device 110 seen from the direction facing the front of the radiation device 110 (e.g., along the negative Z direction in FIG. 1A). The X axis, the Y axis, and the Z axis in FIG. 10A may correspond to those in FIGS. 1A-1C. As shown in FIG. 10A, when the radiation device 110 scans the object 117 from the projection view 1020, a portion (e.g., the shadow region 1010) of the object 117 is located outside the radiation rays 115 (e.g., the FOV 990). The region 1010 may be referred to as a truncation region of the object 117 at the projection view 1020. At the projection view 1020, the projection 1070 of the truncation region 1010 exceeds the left edge of the detector matrix of the detector 113. The projection view 1020 may be referred to as a non-truncated projection view. The original projection data acquired from the projection view 1020 may be referred to as non-truncated projection data.

Figure 10B:
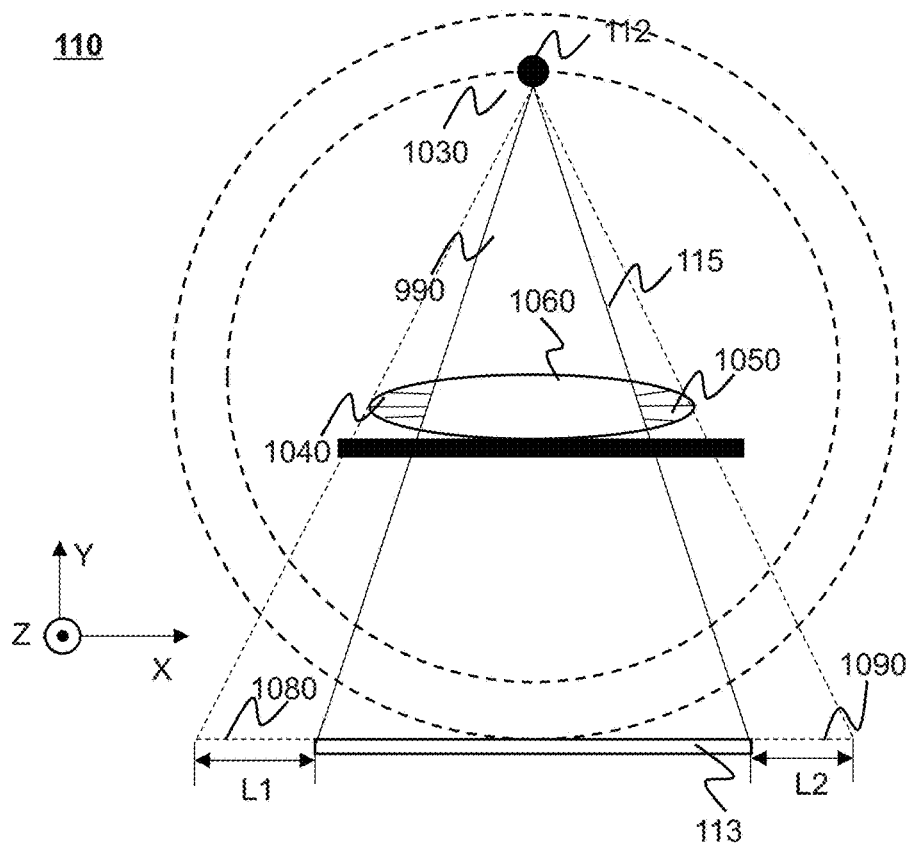
FIG. 10B is a schematic diagram illustrating two exemplary truncation regions of an object according to some embodiments of the present disclosure.

As still another example, FIG. 10B is a schematic diagram illustrating two exemplary truncation regions of an object according to some embodiments of the present disclosure. The radiation device 110 shown in FIG. 10B is a view of the radiation device 110 seen from the direction facing the front of the radiation device 110 (e.g., along the negative Z direction in FIG. 1A). The X axis, the Y axis, and the Z axis in FIG. 10B may correspond to those in FIGS. 1A-1C. As shown in FIG. 10B, when the radiation device 110 scans an object (e.g., the object 1060) from the projection view 1030, a portion (e.g., the shadow regions 1040 and 1050) of the object 1060 is located outside the radiation rays 115 (e.g., the FOV 990). The regions 1040 and 1050 may be referred to as truncation regions of the object 1060 at the projection view 1030. The projection view 1030 may be referred to as a non-truncated projection view. At the projection view 1030, the projection 1080 of the truncation region 1040 exceeds the left edge of the detector matrix of the detector 113, and the projection 1090 of the truncation region 1050 exceeds the right edge of the detector matrix of the detector 113. The original projection data acquired from the projection view 1030 may be referred to as non-truncated projection data of the object 1060.

In some embodiments, an image generated based on original projection data including truncation projection data may include artifacts at the edge of the image. For example, FIG. 11 is a schematic diagram illustrating an exemplary image including artifacts caused by truncation projection data according to some embodiments of the present disclosure. As shown in FIG. 11, the image 1100 may be generated based on original projection data including truncation projection data. The image 1100 may include artifacts 1110 at the edge of the image 1100.

In some embodiments, the processing device 140 may obtain the original projection data by scanning the object using the radiation device 110. In some embodiments, the processing device 140 may obtain, from a storage device (e.g., the storage device 150, the storage 220, etc.) of the medical radiation system 100, the original projection data that has been previously acquired by the radiation device 110.

In 820, the processing device 140 (e.g., the truncation data identification module 720) may identify truncation projection data of the original projection data.

In some embodiments, as used herein, the original projection data acquired from one of the one or more imaging projection views may be referred to as first partial projection data of the original projection data. In some embodiments, for each of the one or more imaging projection views, the processing device 140 may determine whether the corresponding first partial projection data belongs to truncation projection data. In response to determining that the first partial projection data belongs to truncation projection data, it may indicate that truncation occurs at the projection view.

In some embodiments, the processing device 140 may obtain reference data of the object. The reference data may include a complete projection of the object. Details regarding obtaining the reference data may be found elsewhere in the present disclosure (e.g., the description in connection with the operation 1210 of the process 1200 in FIG. 12, the process 1300-1 in FIG. 13A, and the process 1300-2 in FIG. 13B). For one of the one or more imaging projection views, the processing device 140 may determine, based on the reference data, whether the corresponding first projection data belongs to truncation projection data. Details regarding determining, based on the reference data, whether the first projection data belongs to truncation projection data may be found elsewhere in the present disclosure (e.g., the description in connection with the operation 1230 of the process 1200 in FIG. 12).

In some embodiments, as used herein, the original projection data acquired by one of the one or more detector rows of the detector matrix of the detector 113 and from one of the one or more imaging projection views may be referred to as second partial projection data of the original projection data. In some embodiments, as used herein, the two ends (e.g., edges 1740 and 1750 of the detector row 1700 shown in FIG. 17) of a detector row of the detector 113 along the row direction may be referred to as two row edges of the detector row. In some embodiments, for each row edge of each of the one or more detector rows and each of the one or more imaging projection views, the processing device 140 may determine whether the corresponding second partial projection data belongs to truncation projection data. In response to determining that the second partial projection data belongs to truncation projection data, it may indicate that truncation occurs at the row edge of the detector row at the imaging projection view. In this case, the row edge may be referred to as a truncated edge of the detector row at the imaging projection view.

In some embodiments, the processing device 140 may identify a truncated edge of a detector row based on the corresponding second partial projection data (details may be found elsewhere in the present disclosure, e.g., the description in connection with the process 1300-3 in FIG. 13C).

In some embodiments, in response to determining that truncation occurs at an imaging projection view or at a row edge of a detector row corresponding an imaging projection view, the processing device 140 may determine, based on operations 830-840, supplement projection view corresponding to the truncation. The supplement projection view corresponding to the truncation may indicate a projection of at least one truncation region of the object at the imaging projection view, or a projection of a truncation region of the object at the truncated edge in the imaging projection view.

In 830, the processing device 140 (e.g., the extrapolation function obtaining module 730) may obtain a target extrapolation function. In some embodiments, the target extrapolation function may include a linear function, a quadratic function, a logarithmic function, a sine function, a cosine function, an S-shaped function, a transformation thereof, or the like. In some embodiments, the target extrapolation function may include an extrapolation function used in an extrapolation algorithm, such as a mirror extrapolation algorithm or a linear extrapolation algorithm, etc.

In some embodiments, for each truncation projection view of the one or more imaging projection views, the processing device 140 may obtain a target extrapolation function. As least two of the one or more target extrapolation functions corresponding to the one or more truncation projection views may be the same or different. In some embodiments, for each truncated edge of the one or more detector rows at the one or more imaging projection views, the processing device 140 may obtain a target extrapolation function. The one or more target extrapolation functions corresponding to the one or more truncated edges may be the same or different.

In some embodiments, for a truncated edge, the processing device 140 may determine supplement information based on the reference data and the corresponding second partial projection data. The processing device 140 may obtain a target extrapolation function corresponding to the truncated edge based on the supplement information (details may be found elsewhere in the present disclosure, e.g., the description in connection with the process 1800 in FIG. 18).

In some embodiments, for a truncated edge, the processing device 140 may obtain a target S-shaped extrapolation function corresponding to the truncated edge based on the corresponding second partial projection data (details may be found elsewhere in the present disclosure, e.g., the description in connection with the operation 1930 of the process 1900 in FIG. 19).

In 840, the processing device 140 (e.g., the extended data determination module 740) may determine, based on the target extrapolation function and the original projection data, extended projection data corresponding to the truncation projection data. In some embodiments, the extended projection data may correspond to the at least one truncation region of the object at the at least one truncation projection view of the one or more imaging projection views. In some embodiments, the extended projection data may correspond to a projection of the at least one truncation region of the object at the at least one truncation projection view of the one or more imaging projection views. In some embodiments, the processing device 140 may determine an extrapolation width of the detector 113 based on the original projection data. The processing device 140 may determine, based on the target extrapolation function, the extrapolation width, and the original projection data, the extended projection data corresponding to the truncation projection data.

Details regarding determining the extended projection data may be found elsewhere in the present disclosure (e.g., the description in connection with the operation 1250 of the process 1200 in FIG. 12 and the operation 1940 of the process 1900 in FIG. 19).

In some embodiments, the processing device 140 may update the extended projection data based on the reference data to make a surface integral of a combination of the extended projection data and the original projection data closer to a surface integral of the reference data (details may be found elsewhere in the present disclosure, e.g., the description in connection with the operation 1250 of the process 1200 in FIG. 12).

In 850, the processing device 140 (e.g., the reconstruction module 750) may generate a target image of the object based on the original projection data and the extended projection data. In some embodiments, the processing device 140 may generate the target image of the object by performing two-dimensional (2D) or three-dimensional (3D) reconstruction on the original projection data and the extended projection data. In some embodiments, the processing device 140 may generate the target image of the object by reconstructing the original projection data and the extended projection data using, for example, a back-projection algorithm (e.g., a filtered back-projection (FBP) algorithm), an iterative reconstruction algorithm (e.g., an algebraic reconstruction technique (ART) algorithm and a total variation minimization regularization algorithm), a Fourier-transform based algorithm (e.g., a direct Fourier algorithm), a statistical algorithm (e.g., a maximum-likelihood expectation-maximization algorithm), a Feldkamp-Davis-Kress (FDK) algorithm, or the like, or any combination thereof.

In some embodiments, after the radiation device 110 acquires first partial projection data from one of the one or more imaging projection views, the first partial projection data may be transmitted to the processing device 140 to be processed based on operations 820-850, so that the operation for reconstructing projection data corresponding to a projection view may be parallel to the operation for acquiring projection data corresponding to other projection views, thereby improving the speed of generating an image of the object.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 12 is a flowchart illustrating an exemplary imaging process according to some embodiments of the present disclosure. In some embodiments, one or more operations of the process 1200 illustrated in FIG. 12 may be implemented in the medical radiation system 100 illustrated in FIG. 1A. For example, the process 1200 illustrated in FIG. 12 may be stored in a storage device (e.g., the storage device 150, and/or the storage 220) of the medical radiation system 100 in the form of instructions, and invoked and/or executed by the processing device 140 (e.g., the processor 210 of the computing device 200 as illustrated in FIG. 2, the CPU 340 of the mobile device 300 as illustrated in FIG. 3, or one or more modules of the processing device 140 illustrated in FIG. 7). The operations of the illustrated process presented below are intended to be illustrative. In some embodiments, the process 1200 may be accomplished with one or more additional operations not described, and/or without one or more of the operations discussed. Additionally, the order in which the operations of the process 1200 as illustrated in FIG. 12 and described below is not intended to be limiting. In some embodiments, the process 1200 may be an embodiment of the process 800.

In 1210, the processing device 140 (e.g., the projection data obtaining module 710) may obtain reference data including a complete projection of an object on the detector 113. In some embodiments, the reference data may be acquired using a radiation device (e.g., the radiation device 110).

In some embodiments, the reference data may include first projection data acquired by scanning, from a non-truncated projection view (e.g., the projection view 910 in FIG. 9), the object using the radiation device 110. In the non-truncated projection view, the object may be within the FOV of the radiation device 110. In some embodiments, the first projection data may be non-truncated projection data corresponding to the non-truncated projection view. In some embodiments, the reference data may include a reference image generated based on the first projection data. In some embodiments, the reference image may include a plurality of rows of pixels. Each of the plurality of rows of pixels may correspond to one of the one or more detector rows of the detector 113.

In some embodiments, the reference data may include second projection data. The second projection data may be acquired by scanning, using the radiation device 110 located at two or more scanning locations, different portions of the object from a same projection view. In some embodiments, the second projection data may be acquired by scanning, using the radiation device 110, different portions of the object from two or more projection views. In some embodiments, the different portions of the object may include a same region of the object.

In some embodiments, the processing device 140 may obtain at least two preliminary images of the object based on the second projection data. The processing device 140 may obtain a combination image based on the at least two preliminary images. The combination image may be deemed as the reference data. In some embodiments, the combination image may include a plurality of rows of pixels. Each of the plurality of rows of pixels may correspond to one of the one or more detector rows of the detector 113.

Details regarding obtaining the reference data may be found elsewhere in the present disclosure (e.g., the description in connection with the process 1300-1 in FIG. 13A and the process 1300-2 in FIG. 13B).

In 1220, the processing device 140 (e.g., the projection data obtaining module 710) may obtain original projection data of the object. The original projection data may be acquired by scanning the object using the radiation device 110 from one or more imaging projection views.

Figure 16A:
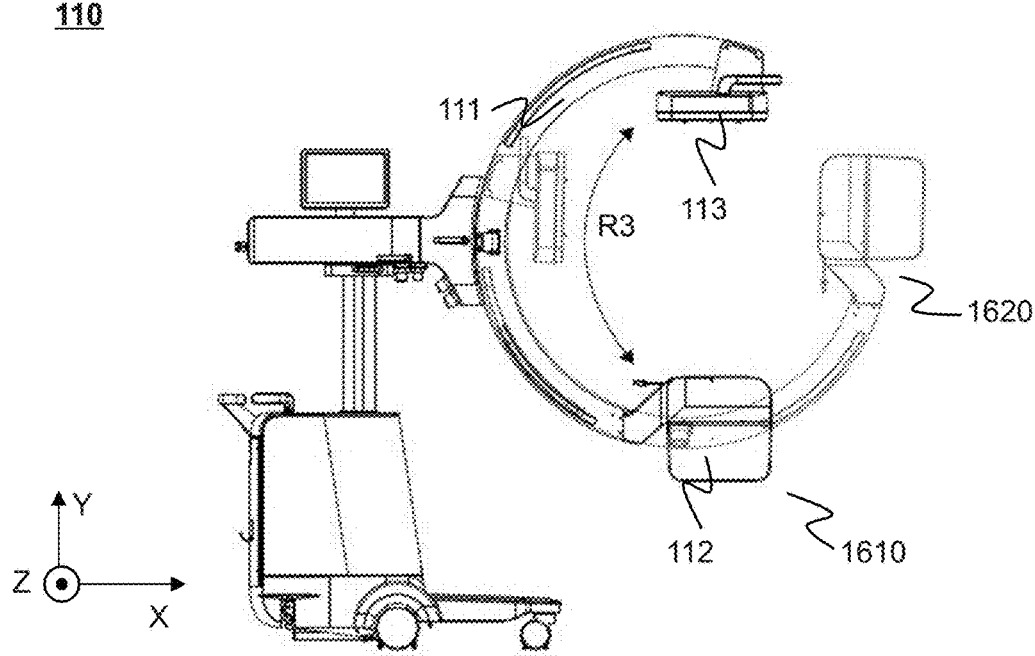
FIGS. 16A-16B are schematic diagrams illustrating an exemplary radiation device according to some embodiments of the present disclosure.

For example, as illustrated in FIG. 16A, the radiation source 112 and the detector 113 may rotate around the Z axis along the direction R3. The radiation source 112 may rotate clockwise from the projection view 1610 (e.g., a location of the gantry 111, the radiation source 112, and the detector 113 represented as black solid lines in FIG. 16A, and a location of the radiation source 112 and the detector 113 represented as solid lines in FIG. 16B) to the projection view 1620 (e.g., a location of the gantry 111, the radiation source 112, and the detector 113 represented as gray solid lines in FIG. 16A, and a location of the radiation source 112 and the detector 113 represented as dashed lines in FIG. 16B). During the rotation, the radiation device 110 may scan the object from the one or more imaging projection views to acquire the original projection data.

Details regarding the original projection data may be found elsewhere in the present disclosure (e.g., the description in connection with the operation 810 of the process in FIG. 8).

In 1230, the processing device 140 (e.g., the truncation data identification module 720) may identify truncation projection data of the original projection data.

In some embodiments, for one of the one or more imaging projection views, the processing device 140 may compare a surface integral of the reference data and a surface integral of the corresponding first partial projection data. In some embodiments, the surface integral of projection data including a complete projection of the object may be greater than the surface integral of projection data only including a projection of a portion of the object. In response to determining that the surface integral of the reference data is greater than the surface integral of the first partial projection data, the processing device 140 may determine that the first partial projection data belongs to the truncation projection data, indicating that truncation occurs at the imaging projection view.

In some embodiments, for one row edge of one of the one or more detector rows at one of the one or more imaging projection views, the processing device 140 may determine, based on the corresponding second partial projection data, whether truncation occurs at the row edge of the detector row at the projection view (details may be found elsewhere in the present disclosure, e.g., the description in connection with the process 1300-3 in FIG. 13C).

In some embodiments, for one of the one or more imaging projection views, the processing device 140 may determine, based on the reference data, whether truncation occurs in the imaging projection view. In response to determining that truncation occurs in the imaging projection view, for each edge of each of the one or more detector rows in the imaging projection view, the processing device 140 may determine whether truncation occurs at the edge of the detector row.

In 1240, the processing device 140 (e.g., the extrapolation function obtaining module 730) may obtain a target extrapolation function. In some embodiments, for each truncation projection view of the one or more imaging projection views, the processing device 140 may obtain a corresponding target extrapolation function. The one or more target extrapolation functions corresponding to the one or more truncation projection views may be the same or different. In some embodiments, for each truncated edge of the one or more detector rows at the one or more imaging projection views, the processing device 140 may obtain a corresponding target extrapolation function. The one or more target extrapolation functions corresponding to the one or more truncated edges may be the same or different.

In some embodiments, for a truncated edge, the processing device 140 may determine supplement information based on the reference data and the corresponding second partial projection data. The processing device 140 may obtain a target extrapolation function corresponding to the truncated edge based on the supplement information (details may be found elsewhere in the present disclosure, e.g., the description in connection with the process 1800 in FIG. 18).

In some embodiments, for a truncated edge, the processing device 140 may obtain a target S-shaped extrapolation function corresponding to the truncated edge based on the corresponding second partial projection data (details may be found elsewhere in the present disclosure, e.g., the description in connection with the operation 1930 of the process 1900 in FIG. 19).

In 1250, the processing device 140 (e.g., the extended data determination module 740) may determine, based on the target extrapolation function, the reference data, and the original projection data, extended projection data corresponding to the truncation projection data.

In some embodiments, for a truncation projection view of the one or more imaging projection views, the processing device 140 may determine, based on the corresponding first partial projection data and an extrapolation algorithm corresponding to the corresponding target extrapolation function, the extended projection data corresponding to at least one truncation region of the object at the truncation projection view.

In some embodiments, the processing device 140 may determine an extrapolation weight based on the reference data, the first partial projection data, and the extended projection data corresponding to the first partial projection data. For example, the extrapolation weight may be represented as Equation (1) below:

$$W=(S1-S2)/P \qquad (1),$$

wherein W refers to the extrapolation weight; S1 refers to the surface integral of the reference data; S2 refers to the surface integral of the first partial projection data; and P refers to the surface integral of the extended projection data corresponding to the first partial projection data.

In some embodiments, the processing device 140 may update, based on the extrapolation weight and the target extrapolation function, the extended projection data corresponding to the first partial projection data, until a difference between W and 1 is less than a weight threshold.

In some embodiments, the processing device 140 may obtain a extrapolation width corresponding to a truncated edge. The processing device 140 may determine extended projection data corresponding to a truncation region at the truncated edge by inputting the extrapolation width into the target extrapolation function corresponding to the truncated edge.

In some embodiments, an extrapolation width corresponding to a truncated edge refers to a length that is needed to extend from the truncated edge along the row direction, so that a projection, at the corresponding imaging projection view, of a truncation region corresponding to the truncated edge is able to be covered by the extrapolation width. In some embodiments, an extrapolation width corresponding to a truncated edge refers to a count of detector elements that is needed to be added to the truncated edge along the row direction so that in the corresponding imaging projection view a projection of a truncation region corresponding to the truncated edge is able to be covered by the at least one added detector element.

For example, as shown in FIG. 10A, L refers to the extrapolation width corresponding to the left edge of a detector row of the detector 113. As another example, as shown in FIG. 10B, Li refers to the extrapolation width corresponding to the left edge of a detector row of the detector 113, L2 refers to the extrapolation width corresponding to the right edge of the detector row of the detector 113.

In 1260, the processing device 140 (e.g., the reconstruction module 750) may generate a target image of the object based on the original projection data, the reference data, and the extended projection data.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 13A is a flowchart illustrating an exemplary process for obtaining reference data according to some embodiments of the present disclosure. In some embodiments, one or more operations of the process 1300-1 illustrated in FIG. 13A may be implemented in the medical radiation system 100 illustrated in FIG. 1A. For example, the process 1300-1 illustrated in FIG. 13A may be stored in a storage device (e.g., the storage device 150, and/or the storage 220) of the medical radiation system 100 in the form of instructions, and invoked and/or executed by the processing device 140 (e.g., the processor 210 of the computing device 200 as illustrated in FIG. 2, the CPU 340 of the mobile device 300 as illustrated in FIG. 3, or one or more modules of the processing device 140 illustrated in FIG. 7). The operations of the illustrated process presented below are intended to be illustrative. In some embodiments, the process 1300-1 may be accomplished with one or more additional operations not described, and/or without one or more of the operations discussed. Additionally, the order in which the operations of the process 1300-1 as illustrated in FIG. 13A and described below is not intended to be limiting. In some embodiments, the operation 1210 of the process 1200 may be performed based on the process 1300-1.

In 1311, the processing device 140 (e.g., the projection data obtaining module 710) may obtain first projection data of an object. In some embodiments, the first projection data may include non-truncated projection data of the object corresponding to a non-truncated projection view and be acquired using a radiation device (e.g., the radiation device 110). In some embodiments, the first projection data may be acquired by scanning, from a non-truncated projection view (e.g., the projection view 910 in FIG. 9), the object using the radiation device 110. In the non-truncated projection view, the object may be within the FOV of the radiation device 110.

In some embodiments, a user (e.g., a doctor, an engineer, or a technician) of the medical radiation system 100 may determine the non-truncated projection view according to empirical visual inspection and/or clinical experience.

In some embodiments, the medical radiation system 100 may include an object information acquisition device 160 configured to acquire object information related to the object. The object information may indicate a location of the object relative to the radiation source 112, the scanning table 114, and/or the detector 113. The processing device 140 may determine the first projection data based on the object information.

In some embodiments, the object information acquisition device 160 may include one or more image acquisition devices configured to acquire image information of the object. The image acquisition device may include a visible light camera, an infrared camera, or the like. In some embodiments, the image acquisition device may be integrated in the radiation device 110 (e.g., the gantry 111). In some embodiments, the image information of the object may include one or more infrared images, one or more visible light images, or the like, or any combination thereof.

In some embodiments, the object information acquisition device 160 may include one or more location acquisition devices configured to acquire location information of the object. The location acquisition device may include one or more sensors (e.g., a laser-ranging sensor, an infrared sensor, a pressure sensor, etc.) with a positioning function. In some embodiments, the location acquisition device may be integrated in the radiation device 110 (e.g., the gantry 111 and/or the scanning table 114).

In some embodiments, the image acquisition device and/or the location acquisition device may be placed outside the medical radiation system 100 and communicate with the medical radiation system 100 via, e.g., the network 120. For example, the image acquisition device may be placed on the wall of the room accommodating the radiation device 110.

In some embodiments, one or more image acquisition devices may be respectively positioned on the gantry 111 at one or more imaging projection views, such as 0 degrees, 90 degrees, 180 degrees, and 270 degrees. In some embodiments, the one or more image acquisition devices may be fixed on the gantry 111 and not rotate with the radiation source 112. The one or more image acquisition devices may be set so that when the detector 113 rotates to the opposite side of each of the one or more image acquisition devices, the FOV of the image acquisition device may be consistent with the FOV of the radiation device 110. When the detector 113 rotates to the opposite side of one of the one or more image acquisition devices (e.g., the radiation source 112 and the detector 113 are located at the projection view corresponding to the image acquisition device), the image acquisition device may capture an image. The image may be transmitted to the processing device 140. The processing device 140 may determine, based on, for example, an image identification algorithm and/or a machine learning model, whether the image includes all of the object. In response to determining that the image includes all of the object, which may indicates that the object may be within the FOV of the radiation device 110 at the projection view, the processing device 140 may determine the projection view as the non-truncated projection view.

In some embodiments, an image acquisition device may be disposed on the gantry, and rotate with the radiation source 112 and the detector 113. Before the object is scanned, the processing device 140 may cause the radiation device 110 to rotate once without emitting radiation rays, so that the image acquisition device may take images corresponding to a plurality of candidate projection views during the rotation. The images may be transmitted to the processing device 140. The processing device 140 may identify, based on the images, one or more of the plurality of candidate projection views, in which the object is within the FOV of the radiation device 110. In some embodiments, the processing device 140 may select, as the non-truncated projection view, one of the one or more of the plurality of candidate projection views. In some embodiments, the processing device 140 may display the one or more of the plurality of candidate projection views to allow the user to select the non-truncated projection view from the one or more of the plurality of candidate projection views.

In some embodiments, the processing device 140 may determine a non-truncated projection view using a machine learning model. For example, a plurality of candidate projection views and/or the object information may be input into the machine learning model, and the machine learning model may output the non-truncated projection view based on the plurality of candidate projection views and/or the object information.

In 1312, the processing device 140 (e.g., the projection data obtaining module 710) may obtain the reference data based on the first projection data. In some embodiments, the processing device 140 may determine the first projection data as the reference data. In some embodiments, the processing device 140 may generate a reference image by reconstructing the first projection data. The reference image may be determined as the reference data. In some embodiments, the reference image may include a plurality of rows of pixels. Each of the plurality of rows of pixels may correspond to one of the one or more detector rows of the detector matrix of the detector 113.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 13B is a flowchart illustrating an exemplary process for obtaining reference data according to some embodiments of the present disclosure. In some embodiments, one or more operations of the process 1300-2 illustrated in FIG. 13B may be implemented in the medical radiation system 100 illustrated in FIG. 1A. For example, the process 1300-2 illustrated in FIG. 13B may be stored in a storage device (e.g., the storage device 150, and/or the storage 220) of the medical radiation system 100 in the form of instructions, and invoked and/or executed by the processing device 140 (e.g., the processor 210 of the computing device 200 as illustrated in FIG. 2, the CPU 340 of the mobile device 300 as illustrated in FIG. 3, or one or more modules of the processing device 140 illustrated in FIG. 7). The operations of the illustrated process presented below are intended to be illustrative. In some embodiments, the process 1300-2 may be accomplished with one or more additional operations not described, and/or without one or more of the operations discussed. Additionally, the order in which the operations of the process 1300-2 as illustrated in FIG. 13B and described below is not intended to be limiting. In some embodiments, the process 1300-2 may be an embodiment of the process 1200.

In 1321, the processing device 140 (e.g., the projection data obtaining module 710) may obtain second projection data of an object. In some embodiments, the second projection data may include a complete projection of the object and be acquired using a radiation device (e.g., the radiation device 110).

In some embodiments, the second projection data may be obtained by scanning, using the radiation device 110 located at different scanning locations, different portions of the object from a same projection view. In some embodiments, the different portions of the object may include a same region of the object.

Figure 14:
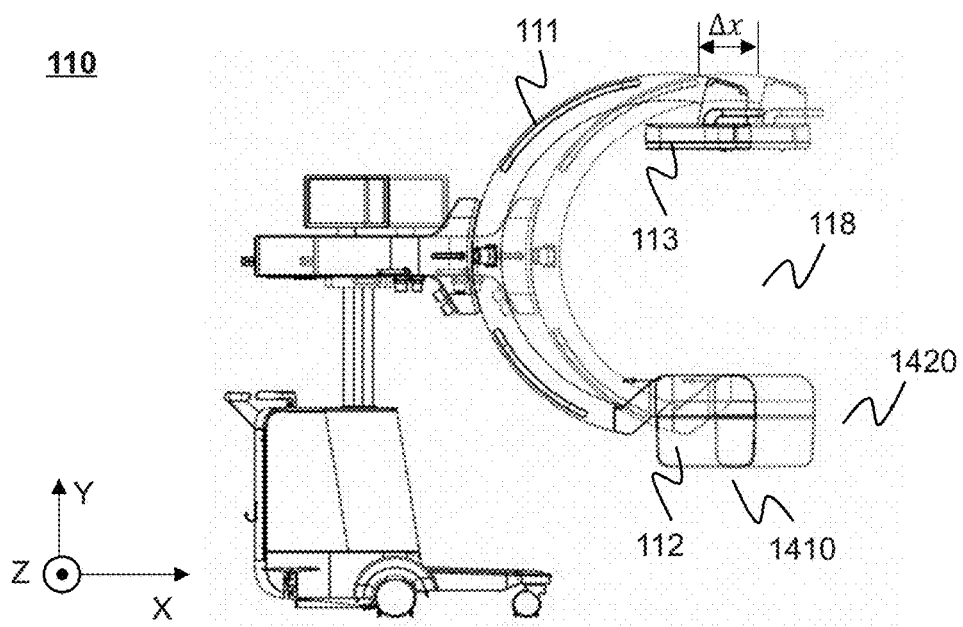
FIGS. 14-15 are schematic diagrams illustrating an exemplary radiation device according to some embodiments of the present disclosure.
Figure 15:
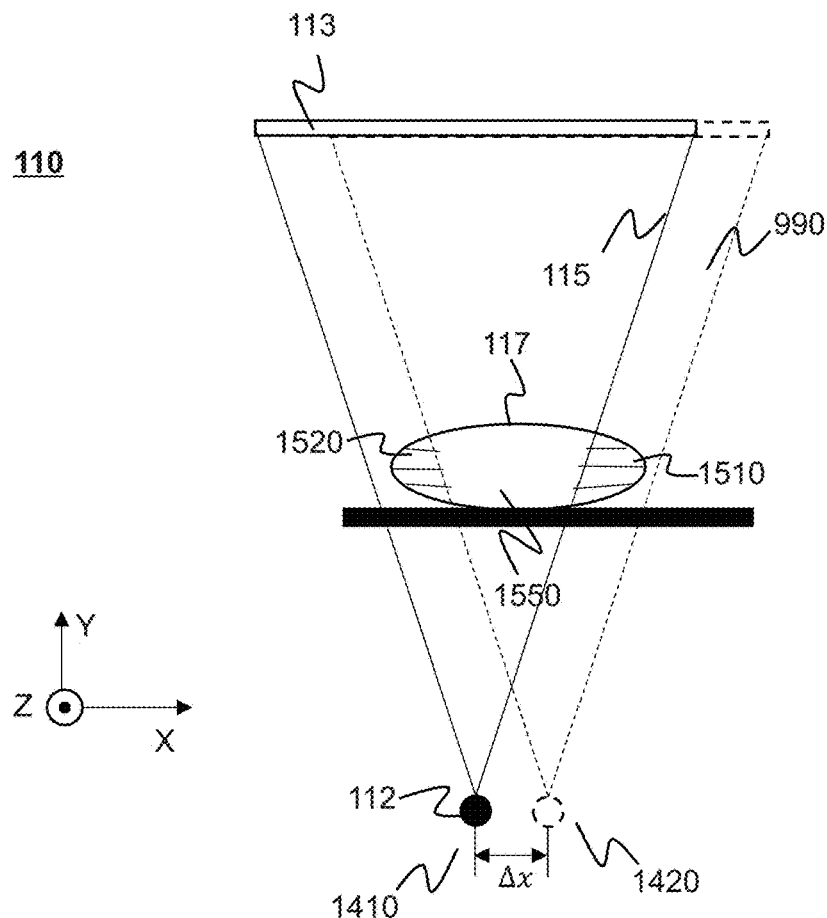

For example, FIGS. 14 and 15 are schematic diagrams illustrating an exemplary radiation device according to some embodiments of the present disclosure. The radiation device 110 shown in FIGS. 14 and 15 is a view of the radiation device 110 seen from the direction facing the front of the radiation device 110 (e.g., along the negative Z direction in FIG. 1A). The X axis, the Y axis, and the Z axis in FIGS. 14 and 15 may correspond to those in FIG. 1A. The radiation device 110 illustrated in FIG. 14 is a C-arm device.

In some embodiments, the radiation device 110 may acquire the second projection data by scanning the object 117 from the first projection view. For example, as shown in FIGS. 14 and 15, the first projection view may be a projection view at which the center line of the radiation rays 115 is vertical to the ground.

The radiation device 110 may scan a first portion of the object 117 with the radiation device 110 located at the scanning location 1410 (e.g., a location of the gantry 111, the radiation source 112, and the detector 113 represented as black solid lines in FIG. 14, and a location of the radiation source 112 and the detector 113 represented as solid lines in FIG. 15). At the scanning location 1410, the shadow region 1510 of the object 117 is located outside the FOV 990 of the radiation device 110.

The radiation device 110 may scan a second portion of the object 117 with the radiation device 110 located at the scanning location 1420 (e.g., a location of the gantry 111, the radiation source 112, and the detector 113 represented as gray solid lines in FIG. 14, and a location of the radiation source 112 and the detector 113 represented as dashed lines in FIG. 15). At the scanning location 1420, the shadow region 1520 of the object 117 is located outside the FOV 990 of the radiation device 110.

The radiation device 110 may be translated, along the row direction of the detector 113, from the scanning location 1410 to the scanning location 1420, or from the scanning location 1420 to the scanning location 1420. For example, if the first projection view is a projection view at which the center line of the radiation rays 115 is vertical to the ground as shown in FIGS. 14 and 15, the radiation device 110 may be translated along the X axis to obtain the second projection data of the object 117. For example, the radiation device 110 may first scan the first portion of the object 117 from the first projection view with the radiation device 110 located at the scanning location 1410. Then the radiation device 110 may be located at the scanning location 1420 by moving, from the scanning location 1410, the radiation device 110 along the X axis for Ax. The radiation device 110 may scan the second portion of the object 117 from the first projection view at the scanning location 1420, thereby obtaining the second projection data of the object 117. The first portion and the second portion of the object 117 may include a same region 1550 (e.g., the blank region 1550 of the object 117) of the object 117.

In some embodiments, the second projection data may include first data acquired at the scanning location 1410 and second data acquired at the scanning location 1420. The projection of the region 1510 may not be included in the first data. The projection of the region 1520 may not be included in the second data. However, a combination (e.g., the second projection data) of the first data and the second data may include a complete projection of the object 117.

In some embodiments, the second projection data may be obtained by scanning, using the radiation device 110, different portions of the object from different projection views.

Figure 16B:
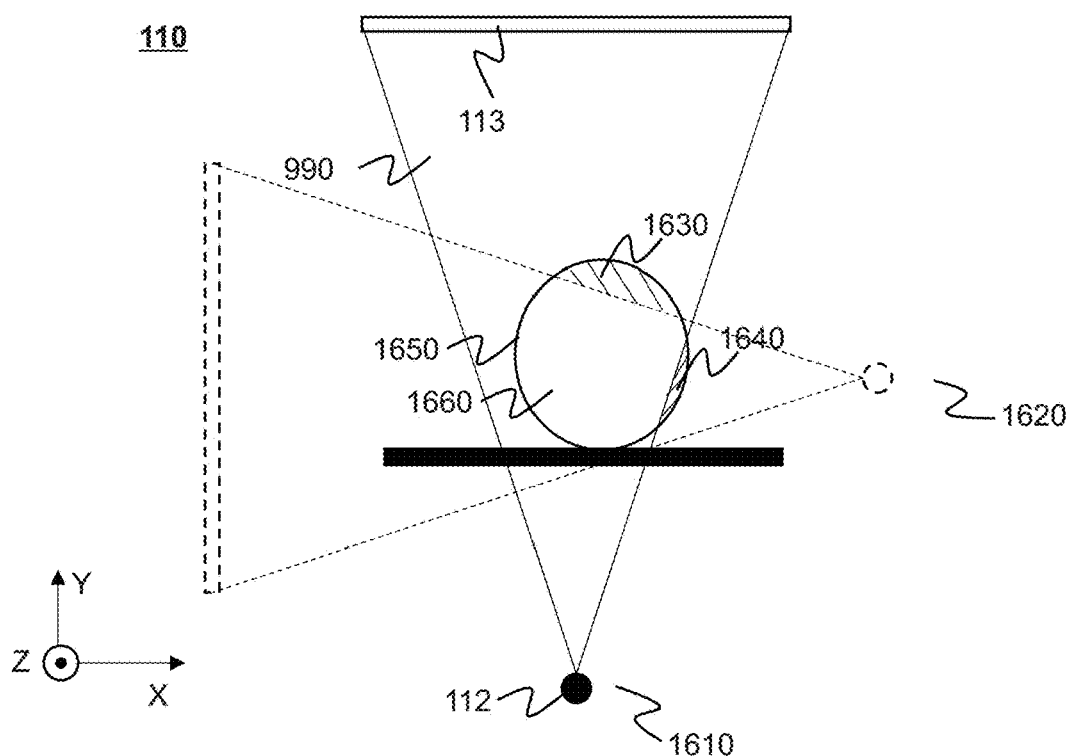

For example, FIGS. 16A-16B are schematic diagrams illustrating an exemplary radiation device according to some embodiments of the present disclosure. The radiation device 110 shown in FIGS. 16A-16B is a view of the radiation device 110 seen from the direction facing the front of the radiation device 110 (e.g., along the negative Z direction in FIG. 1A). The X axis, the Y axis, and the Z axis in FIGS. 16A-16B may correspond to those in FIG. 1A. The radiation device 110 illustrated in FIG. 16A is a C-arm device.

In some embodiments, the radiation device 110 may acquire the second projection data by scanning different portions of an object (e.g., the object 1650 in FIG. 16B) from the projection views 1610-1620, respectively.

The radiation device 110 may scan a first portion of the object 1650 from the projection view 1610 (e.g., a location of the gantry 111, the radiation source 112, and the detector 113 represented as black solid lines in FIG. 16A, and a location of the radiation source 112 and the detector 113 represented as solid lines in FIG. 16B). At the projection view 1610, the shadow region 1640 of the object 1650 is located outside the FOV 990 of the radiation device 110.

The radiation device 110 may scan a second portion of the object 1650 from the projection view 1620 (e.g., a location of the gantry 111, the radiation source 112, and the detector 113 represented as gray lines in FIG. 16A, and a location of the radiation source 112 and the detector 113 represented as dashed lines in FIG. 16B). At the projection view 1620, the shadow region 1630 of the object 1650 is located outside the FOV 990 of the radiation device 110. The first portion and the second portion of the object 1650 may include a same region 1660 (e.g., the blank region 1660 of the object 1650) of the object 1650.

In some embodiments, the second projection data may include first data acquired at the projection view 1610 and second data acquired at the projection view 1620. The projection of the region 1640 may not be included in the first data. The projection of the region 1630 may not be included in the second data. However, a combination (e.g., the second projection data) of the first data and the second data may include a complete projection of the object 1650.

In 1322, the processing device 140 (e.g., the projection data obtaining module 710) may obtain reference data based on the second projection data. In some embodiments, the processing device 140 may determine the second projection data as the reference data. In some embodiments, the processing device 140 may generate at least two preliminary images of the object by reconstructing the second projection data. The processing device 140 may generate, based on the at least two preliminary images, a combination image of the object. In some embodiments, the processing device 140 may determine the combination image as the reference data. In some embodiments, the combination image may include a plurality of rows of pixels. Each of the plurality of rows of pixels may correspond to one of the one or more detector rows of the detector matrix of the detector 113.

In some embodiments, the processing device 140 may extract feature points from the at least two preliminary images. The processing device 140 may match, based on the scanning locations and/or at least one projection view used to acquire the second projection data, the feature points of the at least two preliminary images. The processing device 140 may generate the combination image by performing image registration and image fusion on the at least two preliminary images based on the matched feature points.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 13C is a flowchart illustrating an exemplary process for identifying truncation projection data according to some embodiments of the present disclosure. In some embodiments, one or more operations of the process 1300-3 illustrated in FIG. 13C may be implemented in the medical radiation system 100 illustrated in FIG. 1A. For example, the process 1300-3 illustrated in FIG. 13C may be stored in a storage device (e.g., the storage device 150, and/or the storage 220) of the medical radiation system 100 in the form of instructions, and invoked and/or executed by the processing device 140 (e.g., the processor 210 of the computing device 200 as illustrated in FIG. 2, the CPU 340 of the mobile device 300 as illustrated in FIG. 3, or one or more modules of the processing device 140 illustrated in FIG. 7). The operations of the illustrated process presented below are intended to be illustrative. In some embodiments, the process 1300-3 may be accomplished with one or more additional operations not described, and/or without one or more of the operations discussed. Additionally, the order in which the operations of the process 1300-3 as illustrated in FIG. 13C and described below is not intended to be limiting. In some embodiments, the operation 1230 of the process 1200 in FIG. 12 may be performed based on the process 1300-3.

In some embodiments, for one row edge of one of the one or more of detector rows of the detector matrix of the detector 113 at one of the one or more imaging projection views, the processing device 140 may determine whether truncation occurs at the row edge of the detector row at the imaging projection view by performing the process 1300-3.

In 1331, the processing device 140 (e.g., the truncation data identification module 720) may determine whether each of at least one first projection value of first edge projection data is equal to 0, and whether an average value of at least one second projection value of second edge projection data is greater than a projection threshold. In some embodiments, the first edge projection data may be included in the corresponding second partial projection data and correspond to a first count (e.g., 1, 2, 3, etc.) of edge detector elements (also referred to as boundary detector elements) of the detector row. In some embodiments, the second edge projection data may be included in the corresponding second partial projection data and correspond to a second count (e.g., 1, 2, 3, 4, 5, 10, 15, etc.) of edge detector elements of the detector row. In some embodiments, an edge detector element may be located within a certain distance away from the row edge of the detector row.

Figure 17:
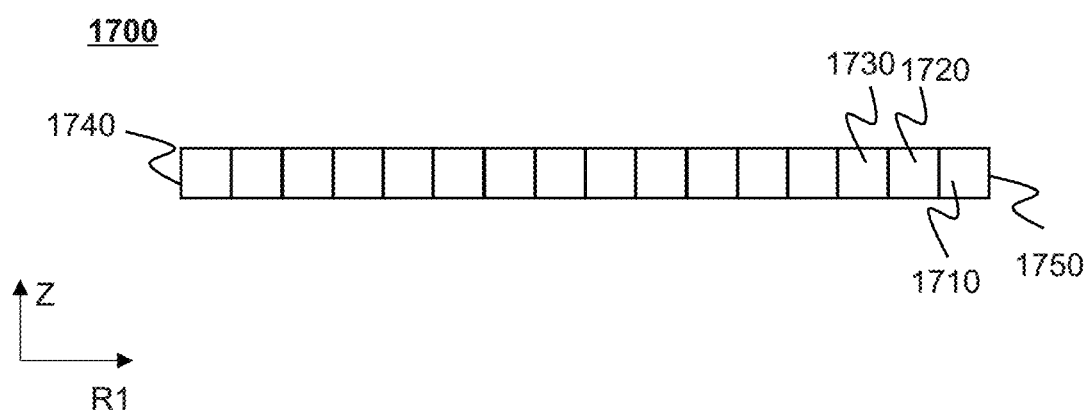
FIG. 17 is a schematic diagram illustrating an exemplary detector row of a detector according to some embodiments of the present disclosure.

For example, FIG. 17 is a schematic diagram illustrating an exemplary detector row 1700 of the detector 113 according to some embodiments of the present disclosure. The Z axis may correspond to the Z axis in FIG. 1B. The R axis in FIG. 17 may correspond to the R1 direction in FIG. 1B. The detector row 1700 may include a plurality of detector elements (e.g., 16 detector elements as shown in FIG. 17). If the processing device 140 determines whether truncation occurs at the right edge of the detector row 1700 at an imaging projection view according to the process 1300-3, the first edge projection data may correspond to the detector element 1710 located at the right edge of the detector row 1700. The second edge projection data may correspond to the detector elements 1710-1730. The processing device 140 may determine whether a first projection value corresponding to the detector element 1710 is equal to 0, and whether an average value of second projection values corresponding to the detector elements 1710-1730 is greater than a projection threshold.

In 1332, in response to determining that not all of the at least one first projection value is equal to 0, and the average value is greater than the projection threshold, the processing device 140 (e.g., the truncation data identification module 720) may determine that truncation occurs at the row edge of the detector row.

In some embodiments, the processing device 140 may determine a weighted average $\overline{Proj}$ based on the second projection values of the second edge projection data corresponding to m edge detector elements of the detector row 1 of the detector matrix of the detector 113 using Equation (2) below:

$$\overline{Proj} = \frac{\sum_{j=1}^{m}(P(i,j)*(m-j+1))}{\sum_{j=1}^{m}(m-j+1)}, \tag{2}$$

wherein m may range from 5 to 15, for example, m=10; and P(i,j) denotes the projection value corresponding to the detector element (i,j) of the detector matrix. In some embodiments, the projection threshold may be represented as G. Taking the radiation rays passing through a water model as an example (because the human body may be approximated as water), an attenuation coefficient of the water may be set to 0.02. Assuming that a projection value of the radiation rays passing through a water model with a thickness of 5 to 10 mm is from 0.1 to 0.2, G may be set to 0.15.

In some embodiments, when $$P(i,1)>0 \& \overline{Proj_1}>G,$$

the processing device 140 may determine that truncation occurs at a row edge of the detector row i. $\overline{Proj_1}$ refers to the weighted average corresponding the row edge of the detector row i.

In some embodiments, the detector row i may include 1024 detector elements. When $$P(i,1024)>0 \& \overline{Proj_2}>G,$$

the processing device 140 may determine that truncation occurs at the other row edge of the detector row i. $\overline{Proj_2}$ refers to the weighted average corresponding the other row edge of the detector row i.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 18:
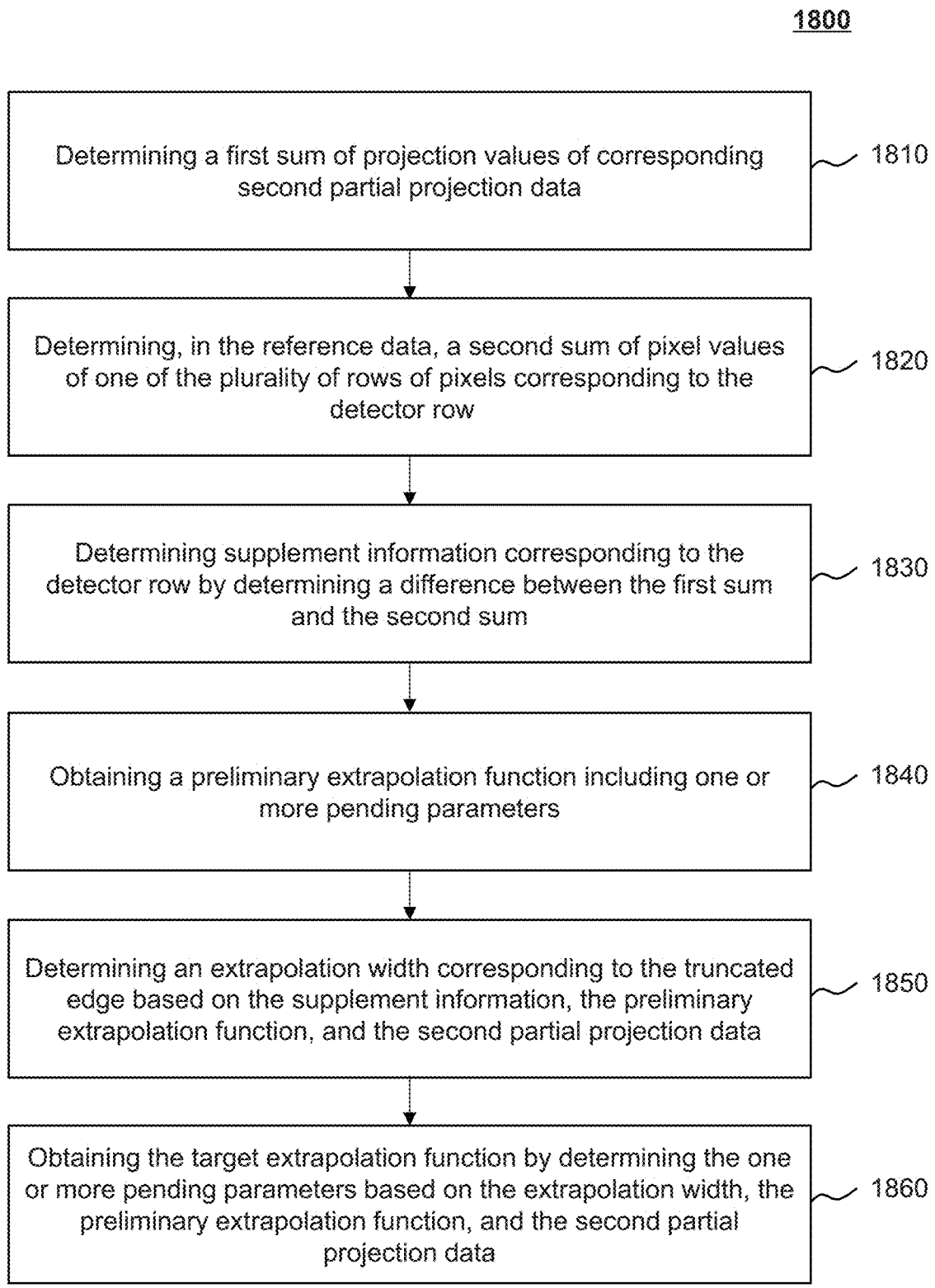
FIG. 18 is a flowchart illustrating an exemplary process for obtaining a target extrapolation function according to some embodiments of the present disclosure.

FIG. 18 is a flowchart illustrating an exemplary process for obtaining a target extrapolation function according to some embodiments of the present disclosure. In some embodiments, one or more operations of the process 1800 illustrated in FIG. 18 may be implemented in the medical radiation system 100 illustrated in FIG. 1A. For example, the process 1800 illustrated in FIG. 18 may be stored in a storage device (e.g., the storage device 150, and/or the storage 220) of the medical radiation system 100 in the form of instructions, and invoked and/or executed by the processing device 140 (e.g., the processor 210 of the computing device 200 as illustrated in FIG. 2, the CPU 340 of the mobile device 300 as illustrated in FIG. 3, or one or more modules of the processing device 140 illustrated in FIG. 7). The operations of the illustrated process presented below are intended to be illustrative. In some embodiments, the process 1800 may be accomplished with one or more additional operations not described, and/or without one or more of the operations discussed. Additionally, the order in which the operations of the process 1800 as illustrated in FIG. 18 and described below is not intended to be limiting. In some embodiments, the operation 820 of the process 800 in FIG. 8 and/or the operation 1230 of the process 1200 may be performed based on the process 1800.

In some embodiments, for a truncated edge corresponding to one of the one or more detector rows of the detector matrix of the detector 113 and one of the one or more imaging projection view, the processing device 140 may obtain a target extrapolation function by performing the process 1800.

In 1810, the processing device 140 (e.g., the extrapolation function obtaining module 730) may determine a first sum of projection values of corresponding second partial projection data.

In 1820, the processing device 140 (e.g., the extrapolation function obtaining module 730) may determine, in the reference data (e.g., the reference image or the combination image), a second sum of pixel values of one of the plurality of rows of pixels corresponding to the detector row.

In 1830, the processing device 140 (e.g., the extrapolation function obtaining module 730) may determine supplement information corresponding to the detector row by determining a difference between the first sum and the second sum.

In 1840, the processing device 140 (e.g., the extrapolation function obtaining module 730) may obtain a preliminary extrapolation function including one or more pending parameters. In some embodiments, the preliminary extrapolation function may include a linear function, a quadratic function, a logarithmic function, a sine function, a cosine function, an S-shaped function, a transformation thereof, or the like. In some embodiments, the preliminary extrapolation function may include an extrapolation function used in an extrapolation algorithm, such as a mirror extrapolation algorithm or a linear extrapolation algorithm, etc.

In 1850, the processing device 140 (e.g., the extrapolation function obtaining module 730) may determine an extrapolation width corresponding to the truncated edge based on the supplement information, the preliminary extrapolation function, and the second partial projection data. In some embodiments, the extrapolation width corresponding to the truncated edge refers to a length that is needed to extend from the truncated edge along the row direction, so that a projection, at the imaging projection view, of a truncation region corresponding to the truncated edge is able to be covered by the extrapolation width. In some embodiments, the extrapolation width corresponding to the truncated edge refers to a count of detector elements that is needed to be added to the truncated edge along the row direction, so that a projection, at the imaging projection view, of a truncation region corresponding to the truncated edge is able to be covered by the at least one added detector element.

In 1860, the processing device 140 (e.g., the extrapolation function obtaining module 730) may obtain the target extrapolation function by determining the one or more pending parameters based on the extrapolation width, the preliminary extrapolation function, and the second partial projection data.

In some embodiments, the reference data may be used as priori information to evaluate the degree of truncation at the truncated edge and determine the extrapolation width based on the degree of truncation, so as to accurately estimate the extended projection data corresponding to the truncated edge, thereby achieving the purpose of accurate truncation artifact correction.

Merely by way of example, the processing device 140 may determine the supplement information corresponding to the detector row i based on Equation (3) below:

$$\Delta P_i = T_i - P_i \quad (3),$$

wherein $\Delta P_i$ refers to the supplement information corresponding to the detector row i, i=1, 2, . . . , M, M denotes a count of the one or more detector rows of the detector matrix of the detector 113; $T_i$ refers to the second sum corresponding to the detector row i; and $P_i$ refers to the first sum corresponding to the detector row i.

The processing device 140 may determine the extrapolation width corresponding to the truncated edge of the detector row i based on Equation (4) below:

$$\int_0^{Next} f(x)dx = \Delta P_i \quad (4),$$

wherein f(x) refers to the preliminary extrapolation function, $N_{ext}$ refers to the extrapolation width, x refers to a variable of the preliminary extrapolation function and relates to the detector elements in the detector row i.

A linear function may be taken as an example to illustrate the process for obtaining a target extrapolation function. The pending parameters of the linear function may include the slope a and the intercept b. The size of the detector matrix of the detector 113 may be 1416×1416, indicating that the detector matrix includes 1416 detector rows and 1416 detector columns. Second partial projection data corresponding to the detector row i (i=1, . . . , 1416) of the 1416 detector rows may be represented as $\{P_i(1), \ldots, P_i(1416)\}$. If the truncated edge of the detector row i corresponds to $P_i(1416)$, the extrapolation width L corresponding to the truncated edge may be determined as $L=2\Delta P_i/P_i(1416)$. The slope a of the preliminary extrapolation function may be equal to $P_i(1416)/L$. The intercept b may be determined based on the slope a and $P_i(1416)$. The target extrapolation function may be obtained based on the determined slope a and intercept b.

The processing device 140 may determine the extended projection data p'(i,j) corresponding to the truncated edge of the detector row i based on Equation (5) below:

$$p'(i,j)=P_i(1416)-P_i(1416)*a(1416-j), j \in [1417,1416+L] \quad (5).$$

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 19 is a flowchart illustrating an exemplary imaging process according to some embodiments of the present disclosure. In some embodiments, one or more operations of the process 1900 illustrated in FIG. 19 may be implemented in the medical radiation system 100 illustrated in FIG. 1A. For example, the process 1900 illustrated in FIG. 19 may be stored in a storage device (e.g., the storage device 150, and/or the storage 220) of the medical radiation system 100 in the form of instructions, and invoked and/or executed by the processing device 140 (e.g., the processor 210 of the computing device 200 as illustrated in FIG. 2, the CPU 340 of the mobile device 300 as illustrated in FIG. 3, or one or more modules of the processing device 140 illustrated in FIG. 7). The operations of the illustrated process presented below are intended to be illustrative. In some embodiments, the process 1900 may be accomplished with one or more additional operations not described, and/or without one or more of the operations discussed. Additionally, the order in which the operations of the process 1900 as illustrated in FIG. 19 and described below is not intended to be limiting. In some embodiments, the process 1900 may be an embodiment of the process 800.

In 1910, the processing device 140 (e.g., the projection data obtaining module 710) may obtain original projection data of an object. The original projection data may be acquired by scanning the object using the radiation device 110 from one or more imaging projection views. Details regarding the original projection data may be found elsewhere in the present disclosure (e.g., the description in connection with the operation 810 of the process in FIG. 8).

In 1920, the processing device 140 (e.g., the truncation data identification module 720) may identify truncation projection data of the original projection data. In some embodiments, for each row edge of each of the one or more detector rows and each of the one or more imaging projection views, the processing device 140 may determine whether the corresponding second partial projection data belongs to truncation projection data. In response to determining that the second partial projection data belongs to truncation projection data, it may indicate that truncation occurs at the row edge of the detector row at the imaging projection view. In this case, the row edge may be referred to as a truncated edge of the detector row at the imaging projection view.

In some embodiments, the processing device 140 may identify a truncated edge of a detector row based on the corresponding second partial projection data (details may be found elsewhere in the present disclosure, e.g., the description in connection with the process 1300-3 in FIG. 13C).

In 1930, the processing device 140 (e.g., the extrapolation function obtaining module 730) may obtain a target S-shaped extrapolation function. In some embodiments, for each truncated edge, the processing device 140 may obtain a corresponding target S-shaped extrapolation function. The one or more target S-shaped extrapolation functions corresponding to the one or more truncated edges may be the same or different.

In some embodiments, the target S-shaped extrapolation function may be a monotonic and bounded function. In some embodiments, a domain of definition of the target S-shaped extrapolation function S(x) is $x \in (-\infty, +\infty)$. When $x \to -\infty$, the target S-shaped extrapolation function S(x) may approach a first value. When $x \to +\infty$, the target S-shaped extrapolation function S(x) may approach a second value. In some embodiments, when $x \to \infty$, a first-order derivative function S'(x) of the target S-shaped extrapolation function S(x) may approach 0. A maximum value of the first-order derivative function S'(x) may exist when $x \in (-\infty, +\infty)$.

In some embodiments, the target S-shaped extrapolation function may include an original S-shaped function or a transformation of the original S-shaped function. In some embodiments, the transformation of the original S-shaped function may be obtained by performing rotation, mirroring, translation, stretching, squeezing, magnification, shrinking, or the like, or any combination thereof, on the original S-shaped function. For example, the transformation of the original S-shaped function may include a negative function of the original S-shaped function, an inverse function of the original S-shaped function, a power function of the original S-shaped function, or the like, or any combination thereof.

Figure 20:
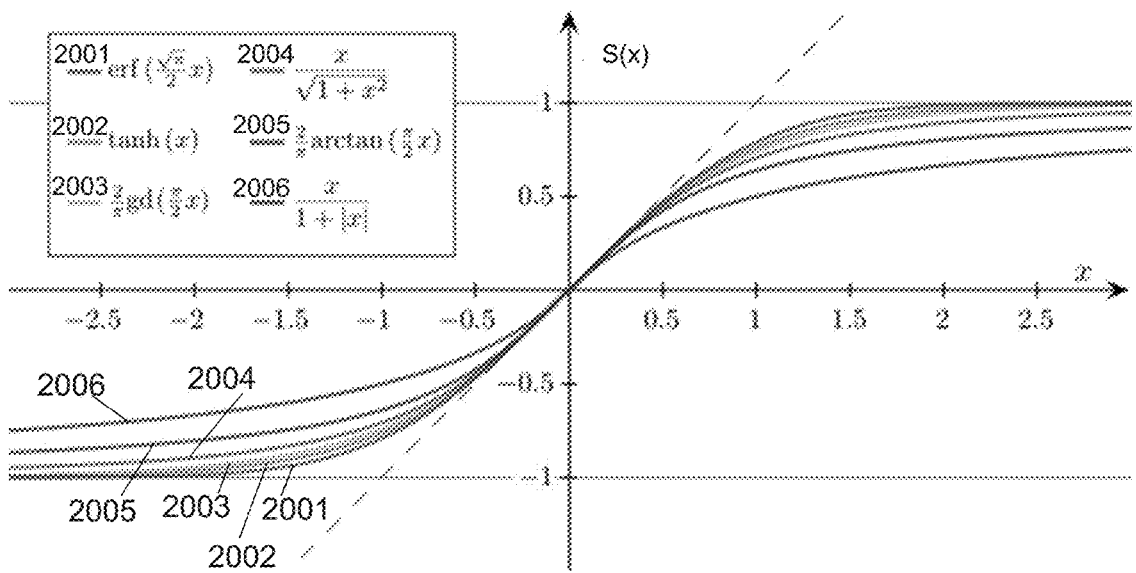
FIG. 20 is a schematic diagram illustrating exemplary target S-shaped extrapolation function according to some embodiments of the present disclosure.

For example, FIG. 20 is a schematic diagram illustrating exemplary target S-shaped extrapolation function according to some embodiments of the present disclosure. FIG. 20 illustrates different S-shaped extrapolation functions, such as $$\mathrm{erf}\left(\frac{\sqrt{\pi}}{2}x\right)$$

(represented as the curve 2001 in FIG. 20), $$\frac{x}{\sqrt{1+x^2}}$$

(represented as the curve 2004 in FIG. 20), tan h(x) (represented as the curve 2002 in FIG. 20), $$\frac{2}{\pi}\arctan\left(\frac{\pi}{2}x\right)$$

(represented as the curve 2005 in FIG. 20)

$$\frac{2}{\pi}gd\left(\frac{\pi}{2}x\right)$$

(represented as the curve 2003 in FIG. 20), $$\frac{x}{1+|x|}$$

(represented as the curve 2006 in FIG. 20). The function $$\frac{x}{1+|x|}$$

(represented as the curve 2006 in FIG. 20) may be taken as an example to illustrated the target S-shaped extrapolation function. As illustrated, the curve 2006 is a monotonic increasing and bounded function $$\left(\frac{x}{1+|x|} \in (-1, 1)\right)$$

A domain of definition of the curve 2006 is $x \in (-\infty, +\infty)$. When $x \to -\infty$, the curve 2006 approaches $-1$. When $x \to +\infty$, the curve 2006 approaches 1. When $x \to \infty$, a first-order derivative function of the curve 2006 approaches 0. The value of the first-order derivative function of the curve 2006 is maximum at $x=0$.

In some embodiments, for a truncated edge corresponding to one of the one or more detector rows and one of the one or more imaging projection data, the processing device 140 may determine an extrapolation width corresponding to the truncated edge based on a count of the one or more detector columns of the detector matrix of the detector 113 and a length of a filter kernel configured to generate the target image of the object. For example, the processing device 140 may determine the extrapolation width corresponding to the truncated edge based on Equation (6) below:

$$2(N_S + 2N_{ext}) = L_{FFT} \qquad (6),$$

wherein $L_{FFT}$ refers to the length of the filter kernel, $L_{FFT}=2^k$, k relates to the generation of the target image of the object; $N_S$ refers to the count of the one or more detector columns; and $N_{ext}$ refers to the extrapolation width corresponding to the truncated edge.

In some embodiments, the processing device 140 may obtain a preliminary S-shaped extrapolation function including one or more pending parameters. The processing device 140 may obtain the target S-shaped extrapolation function by determining, based on the extrapolation width and the corresponding second partial projection data, the one or more pending parameters. For example, the processing device 140 may obtain the target S-shaped extrapolation function based on Equation (7) below:

$$\int_{-N_{ext}/2}^{N_{ext}/2} (Y(x) + |Y_{min}|) dx = \frac{\pi}{2}\left(\frac{p}{2\mu}\right)^2, \qquad (7)$$

wherein $Y(x)$ refers to the preliminary S-shaped extrapolation function; x refers to a variable of $Y(x)$ and relates to the detector elements in the detector row; $Y_{min}$ refers to a minimum value of $Y(x)$ when $$x \in \left(\frac{-N_{ext}}{2}, \frac{N_{ext}}{2}\right),$$

or a smaller value of the first value and the second value when $x \in (-\infty, +\infty)$; p refers to a projection value corresponding to an edge detector element of the detector row at the truncated edge; and µ refers to an attenuation coefficient of water.

In some embodiments, the processing device 140 may obtain a preliminary S-shaped extrapolation function that is a generalized logic function. The generalized logic function may be expressed by Equation (8) below:

$$Y(t) = A + \frac{K - A}{\left(C + Qe^{-Bt}\right)^{1/\nu}}, \qquad (8)$$

wherein A denotes a value of a lower asymptote of the generalized logic function; K denotes a value of an upper asymptote of the generalized logic function; B denotes the growth rate (e.g., the increasing rate of the generalized logic function, affecting the result of the second derivative of the generalized logic function) of the generalized logic function; v affects the growth rate when the generalized logic function approaches the lower or upper asymptote; C is a constant; and Q has an effect on the value of the generalized logic function at t=0.

Figure 21:
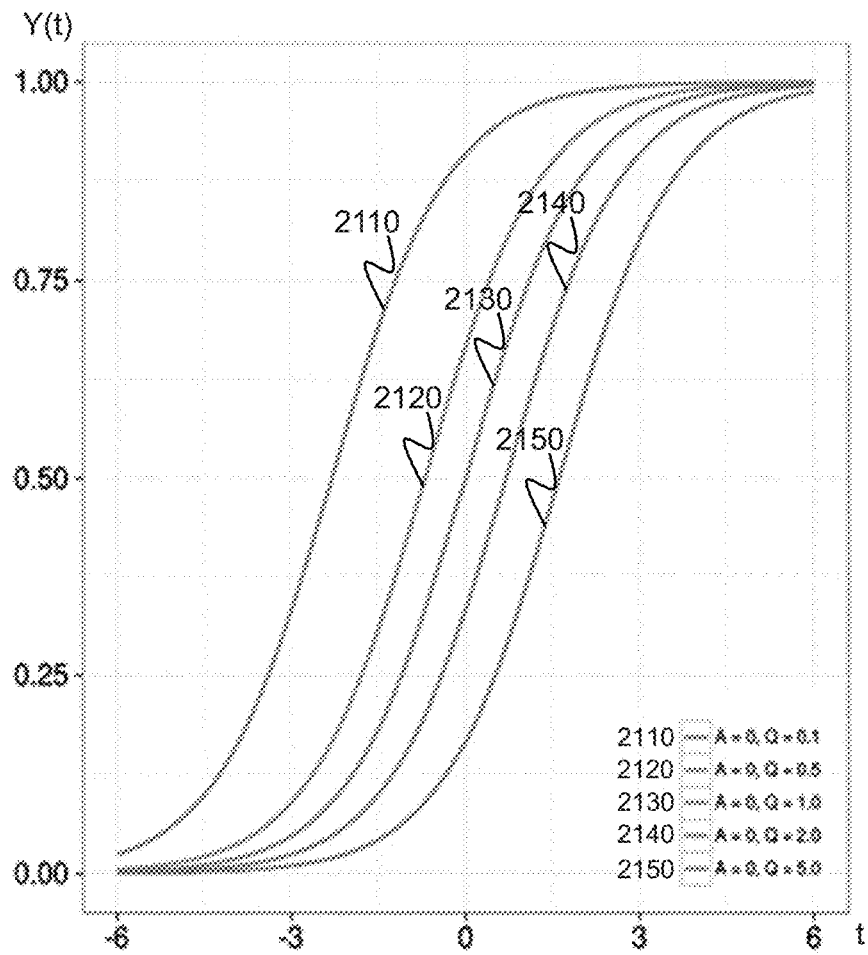
FIG. 21 is a schematic diagram illustrating the change of an exemplary generalized logic function with the change of a parameter Q according to some embodiments of the present disclosure.

For example, FIG. 21 is a schematic diagram illustrating the change of an exemplary generalized logic function with the change of the parameter Q according to some embodiments of the present disclosure. As shown in FIG. 21, curves 2110-2140 correspond to the generalized logic function when Q=0.1, 0.5, 1.0, 2.0, and 5.0, respectively. The smaller the parameter Q is, the greater the value of the generalized logic function may be at =0. The parameter Q may be adjust to change the sum of the determined extended projection data. In 1940, the processing device 140 (e.g., the extended data determination module 740) may determine, based on the target S-shaped extrapolation function and the original projection data, extended projection data corresponding to the truncation projection data. In some embodiments, the extended projection data may correspond to the at least one truncation region of the object at the at least one truncation projection view of the one or more imaging projection views. In some embodiments, the extended projection data may correspond to a projection of a truncation region of the object corresponding to a truncated edge. In some embodiments, the processing device 140 may determine, based on the target extrapolation function, the extrapolation width, and the original projection data, the extended projection data corresponding to the truncation projection data. For example, for an truncated edge of the detector row i, according to Equation (7), when $N_S=1416$, and $L_{FFT}$ is at least equal to 4096, $N_{ext}=316$. A definition domain t of $Y(t)$ corresponding to the truncated edge of the detector row i may belong to [−157,158]. In some embodiments, the processing device 140 may set A=0, K=P (i, 1), B=1, C=1, and v=1. P (i, 1) refers to the projection value corresponding to an edge detector element at the truncated edge. Understandably, the values of these parameters may be adjusted according to actual needs, e.g., the FOV of the radiation device 110. The processing device 140 may determine the parameter Q based on the extrapolation width, the parameters of A, B, C, K, and v, and Equation (7). The processing device 140 may obtain a target S-shaped extrapolation function based on the determined parameters.

In some embodiments, if truncation occurs at both of the row edge of the detector row i at one of the one or more imaging projection view, the processing device 140 may obtain a target S-shaped extrapolation function $Y_O(t)$ corresponding to the other row edge of the detector row i. If the extrapolation width of the other row edge of the detector row i is equal to 316, the extended projection data corresponding to one row edge of the detector row i may be represented as $P_1'(i,j)=Y(j-157)$, $j \in [1,316]$. The extended projection data corresponding to the other row edge of the detector row i may be represented as $P_2'(i,j)=Y_O(j-1889)$, $j \in [1733,2048]$. The second partial projection data corresponding to detector row i may be represented as $P(i,j)=p(i,j-316), j \in [317,1732]$.

Figure 22:
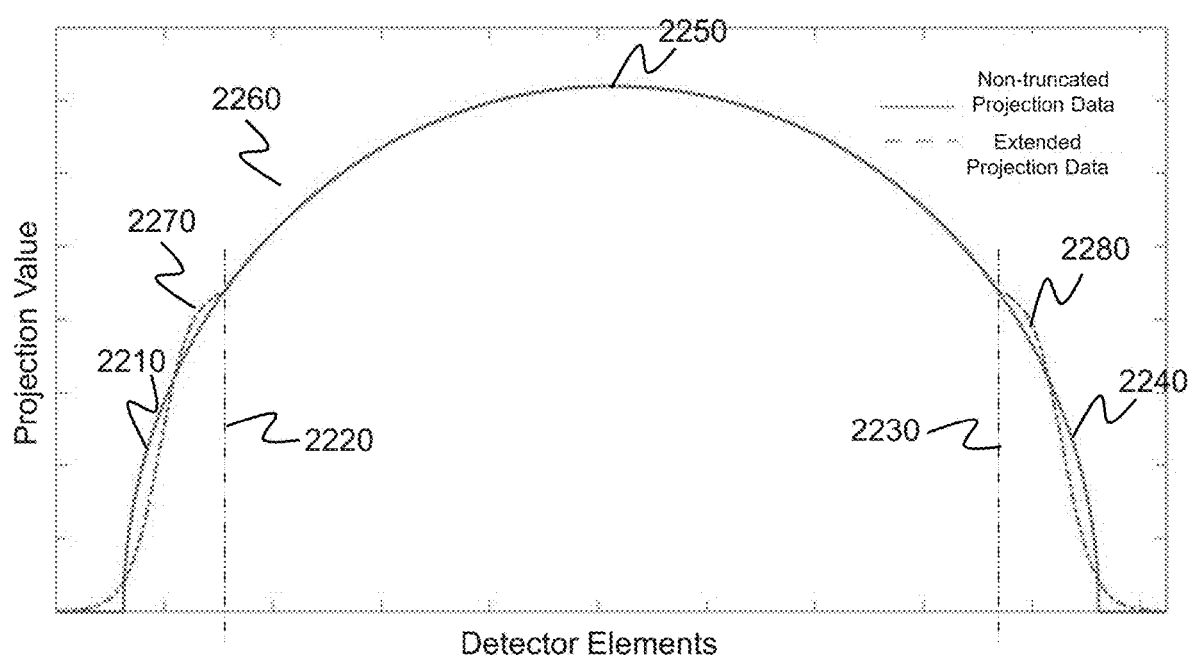
FIG. 22 is a schematic diagram illustrating exemplary projection data corresponding to a detector row at an imaging projection view according to some embodiments of the present disclosure.

FIG. 22 is a schematic diagram illustrating exemplary projection data corresponding to a detector row at an imaging projection view according to some embodiments of the present disclosure. As illustrated, the solid curve 2260 represents non-truncated projection data corresponding to the detector row at the imaging projection view. It was assumed that the projection data corresponding to the portion 2210 and the portion 2240 of the curve 2260 was not acquired. The portion 2250 of the solid curve 2260 between the dashed lines 2220 and 2230 was used to determine, according to the process 1900, extended projection data 2270 and 2280 corresponding to the portion 2210 and the portion 2240, respectively. as illustrated, the overlap degree between the extended projection data 2270 and the portion 2210, and the overlap degree between the extended projection data 2280 and the portion 2240 are relatively high.

In 1950, the processing device 140 (e.g., the reconstruction module 750) may generate a target image of the object based on the original projection data and the extended projection data. In some embodiments, the processing device 140 may generate the target image of the object by performing two-dimensional (2D) or three-dimensional (3D) reconstruction on the original projection data and the extended projection data. In some embodiments, the processing device 140 may generate the target image of the object by reconstructing the original projection data and the extended projection data using, for example, a back-projection algorithm (e.g., a filtered back-projection (FBP) algorithm), an iterative reconstruction algorithm (e.g., an algebraic reconstruction technique (ART) algorithm and a total variation minimization regularization algorithm), a Fourier-transform based algorithm (e.g., a direct Fourier algorithm), a statistical algorithm (e.g., a maximum-likelihood expectation-maximization algorithm), a Feldkamp-Davis-Kress (FDK) algorithm, or the like, or any combination thereof.

In the process 1900, with an S-shaped extrapolation function, a slope at the truncation is not needed to be determined, which simply the process for determining extended projection data and improve the accuracy of determining extended projection data.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

ADDITIONAL STATEMENT OF INVENTION

Statement of Invention 1

An imaging system, comprising:
at least one storage device storing a set of instructions; and
at least one processor in communication with the at least one storage device, when executing the stored set of instructions, the at least one processor causes the system to perform operations including:
  obtaining an image generated based on a radiation device including a detector, the radiation device being configured to operate under a plurality of candidate frame frequencies;
  identifying, among the plurality of candidate frame frequencies, a target frame frequency used to generate the image;
  obtaining integral time information including a plurality of frequency groups and a plurality of candidate integral time values, each of the plurality of frequency groups corresponding to one of the plurality of candidate integral time values and including one or more of the plurality of candidate frame frequencies;
  determining a target integral time value based on the target frame frequency and the integral time information; and
  performing, based on the target integral time value, correction on the image.

Statement of Invention 2

The system of statement of invention 1, wherein the integral time information is provided by a process including:
  dividing the plurality of candidate frame frequencies into the plurality of frequency groups, each frequency group including one or more candidate frame frequencies;
  for each of the plurality of candidate frame frequencies, obtaining, based on the candidate frame frequency, a maximum integral time value; and
  for each of the plurality of frequency groups, determining the candidate integral time value based on the maximum integral time value corresponding to at least one of the one or more candidate frame frequencies of the frequency group.

Statement of Invention 3

The system of statement of invention 2, wherein dividing the plurality of candidate frame frequencies into the plurality of frequency groups includes:
  dividing the plurality of candidate frame frequencies into a first frequency group and a second frequency group, the first frequency group including one of the plurality of candidate frame frequencies with a maximum frame frequency, the second frequency group including the rest of the plurality of candidate frame frequencies.

Statement of Invention 4

The system of statement of invention 2, wherein dividing the plurality of candidate frame frequencies into the plurality of frequency groups includes:
  ranking the plurality of candidate frame frequencies based on an order of values of the plurality of candidate frame frequencies; and
  dividing, based on the ranking and a count threshold greater than one, the plurality of candidate frame frequencies into the plurality of frequency groups, a count of the candidate frame frequencies in each of the plurality of frequency groups being less than or equal to the count threshold.

Statement of Invention 5

The system of statement of invention 4, wherein the plurality of candidate frame frequencies are ranked in an ascending order of the values of the plurality of candidate frame frequencies.

Statement of Invention 6

The system of statement of invention 4 or 5, wherein
  a count of the candidate frame frequencies in a last frequency group of the plurality of frequency groups, according to the ranking, is less than or equal to the count threshold; and
  a count of the candidate frame frequencies in each of the rest of the plurality of frequency groups is equal to the count threshold.

Statement of Invention 7

The system of any one of statement of inventions 2-6, wherein for each of the plurality of frequency groups, determining the candidate integral time value based on the maximum integral time value corresponding to at least one of the one or more candidate frame frequencies of the frequency group includes:
  designating the maximum integral time value corresponding to a maximum candidate frame frequency of the frequency group as the candidate integral time value of the frequency group.

Statement of Invention 8

The system of any one of statement of inventions 1-7, wherein performing, based on the target integral time value, correction on the image includes:
  obtaining a correction image based on the target integral time value; and
  performing the correction on the image by subtracting, from pixel values of pixels of the image, pixel values of corresponding pixels of the correction image.

Statement of Invention 9

The system of any one of statement of inventions 1-8, wherein the correction relates to a dark current of the detector.

Statement of Invention 10

The system of any one of statement of inventions 1-9, wherein at least one of the plurality of frequency groups includes two or more of the plurality of candidate frame frequencies.

Statement of Invention 11

An imaging system, comprising:
  at least one storage device storing a set of instructions; and
  at least one processor in communication with the at least one storage device, when executing the stored set of instructions, the at least one processor causes the system to perform operations including:
    obtaining reference data including a complete projection of an object, the reference data being acquired using a radiation device;
    obtaining original projection data of the object, the original projection data being acquired by scanning the object using the radiation device from one or more imaging projection views, the original projection data including truncation projection data that is acquired from at least one of the one or more imaging projection views, in each of the at least one of the one or more imaging projection views a truncation region of the object being located outside a field of view (FOV) of the radiation device;
    determining, based on the reference data and the original projection data, extended projection data corresponding to the at least one truncation region; and
    generating a first image of the object based on the original projection data and the extended projection data.

Statement of Invention 12

The system of statement of invention 11, wherein
  the reference data includes projection data acquired by scanning, from a non-truncated projection view, the object using the radiation device, and
  in the non-truncated projection view, the object being within the FOV of the radiation device.

Statement of Invention 13

The system of statement of invention 12, wherein the non-truncated projection view is determined by a first process including:
  obtaining at least one second image of the object, the at least one second image being acquired by at least one image acquisition device; and
  determining the non-truncated projection view based on the at least one second image.

Statement of Invention 14

The system of statement of invention 12, wherein the non-truncated projection view is determined based on a machine learning model.

Statement of Invention 15

The system of any one of statement of inventions 11-14, wherein determining, based on the reference data and the original projection data, the extended projection data corresponding to the at least one truncation region includes:
for partial projection data, in the original projection data, corresponding to one of the one or more imaging projection views,
determining, based on the reference data, whether the partial projection data belongs to the truncation projection data; and
in response to determining that the partial projection data belongs to the truncation projection data, determining, based on the reference data and the partial projection data, the extended projection data of the truncation region corresponding to the partial projection data.

Statement of Invention 16

The system of statement of invention 15, wherein determining, based on the reference data, whether the partial projection data belongs to the truncation projection data includes:
comparing a surface integral of the reference data and a surface integral of the partial projection data; and
in response to determining that the surface integral of the reference data is greater than the surface integral of the partial projection data, determining that the partial projection data belongs to the truncation projection data.

Statement of Invention 17

The system of statement of invention 15 or 16, wherein determining, based on the reference data and the original projection data, the extended projection data corresponding to the at least one truncation region includes:
determining, based on an extrapolation algorithm and the partial projection data, the extended projection data of the truncation region corresponding to the partial projection data;
determining an extrapolation weight based on the reference data, the partial projection data, and the extended projection data corresponding to the partial projection data; and
updating, based on the extrapolation weight, the extended projection data corresponding to the partial projection data.

Statement of Invention 18

The system of statement of invention 17, wherein a surface integral of a combination of the updated extended projection data and the partial projection data is equal to a surface integral of the reference data.

Statement of Invention 19

The system of statement of invention 17 or 18, wherein the extrapolation algorithm includes a mirror extrapolation algorithm or a linear extrapolation algorithm.

Statement of Invention 20

The system of statement of invention 11, wherein the reference data is obtained by a second process including:
obtaining at least two third images of the object, the at least two third images being acquired using the radiation device; and
obtaining, based on the at least two third images, a combination image related to the projection of the object, the reference data including the combination image.

Statement of Invention 21

The system of statement of invention 20, wherein the at least two third images are obtained by scanning, using the radiation device located at two or more scanning locations, at least two portions of the object from a same projection view.

Statement of Invention 22

The system of statement of invention 20 or 21, wherein the at least two portions of the object include a same region of the object.

Statement of Invention 23

The system of any one of statement of inventions 20-22, wherein determining, based on the reference data and the original projection data, the extended projection data corresponding to the at least one truncation region includes:
determining supplement information based on the combination image and the original projection data;
obtaining a target extrapolation function; and
determining the extended projection data corresponding to the at least one truncation region by performing, based on the supplement information and the target extrapolation function, extrapolation on the original projection data.

Statement of Invention 24

The system of statement of invention 23, wherein the original projection data of the object represents an intensity of radiation that is transmitted, from the radiation device, through the object and detected by a plurality of detector elements of the radiation device, the plurality of detector elements being arranged in a plurality of detector rows and a plurality of detector columns.

Statement of Invention 25

The system of statement of invention 24, wherein the combination image including a plurality of rows of pixels, each of the plurality of rows of pixels corresponding to one of the plurality of detector rows.

Statement of Invention 26

The system of statement of invention 25, wherein determining the supplement information based on the combination image and the original projection data includes:

for partial projection data, in the original projection data, corresponding to one of the plurality of detector rows of the plurality of detector elements and one of the one or more imaging projection views,
determining whether the partial projection data belongs to the truncation projection data;
in response to determining that the partial projection data belongs to the truncation projection data, determining a first sum of projection values of the partial projection data;
determining, in the combination image, a second sum of pixel values of one of the plurality of rows of pixels corresponding to the detector row; and
determining the supplement information corresponding to the partial projection data by determining a difference between the first sum and the second sum.

Statement of Invention 27

The system of statement of invention 26, wherein determining whether the partial projection data belongs to the truncation projection data includes:
determining whether each of at least one first projection value corresponding to a first count of boundary detector elements of the detector row is equal to 0 and whether an average value of at least one second projection value corresponding to a second count of boundary detector elements of the detector row is greater than a projection threshold, the boundary detector element being located within a distance threshold away from an edge of the detector row; and
in response to determining that one or more of the at least one first projection value is not equal to 0 and the average value is greater than the projection threshold, determining that the partial projection data belongs to the truncation projection data.

Statement of Invention 28

The system of statement of invention 26 or 27, wherein obtaining the target extrapolation function includes:
obtaining a preliminary extrapolation function including one or more pending parameters;
determining an extrapolation width corresponding to the partial projection data based on the supplement information corresponding to the partial projection data, the preliminary extrapolation function, and the partial projection data; and
obtaining the target extrapolation function by determining the one or more pending parameters based on the extrapolation width corresponding to the partial projection data, the preliminary extrapolation function, and the partial projection data.

Statement of Invention 29

The system of statement of invention 28, wherein the extrapolation width is determined based on the following equation:

$$\int_0^{N_{ext}} f(x)dx = \Delta P_i,$$

wherein f(x) refers to the preliminary extrapolation function, $N_{ext}$ refers to the extrapolation width corresponding to the partial projection data, x refers to a variable of the preliminary extrapolation function and relates to the plurality of detector elements, and $\Delta P_i$ refers to the supplement information corresponding to the partial projection data.

Statement of Invention 30

The system of any one of statement of inventions 11-29, wherein the radiation device incudes a computed tomography (CT) device with a fan-beam or a cone beam computed tomography (CBCT) device.

Statement of Invention 31

The system of any one of statement of inventions 11-30, wherein the radiation device incudes a C-arm device or a digital subtraction angiography (DSA) device.

Statement of Invention 32

The system of any one of statement of inventions 11-31, wherein the first image of the object is generated using a filtered back-projection (FBP) algorithm based on the original projection data and the extended projection data.

Statement of Invention 33

The system of any one of statement of inventions 11-32, wherein the first image of the object is generated by performing three-dimensional (3D) reconstruction on the original projection data and the extended projection data.

Statement of Invention 34

An imaging system, comprising:
at least one storage device storing a set of instructions; and
at least one processor in communication with the at least one storage device, when executing the stored set of instructions, the at least one processor causes the system to perform operations including:
obtaining original projection data of an object, the original projection data being acquired by scanning the object using a radiation device from one or more projection views, the original projection data including truncation projection data that is acquired from at least one of the one or more projection views, in each of the at least one of the one or more projection views a truncation region of the object being located outside a field of view (FOV) of the radiation device;
obtaining a target S-shaped extrapolation function based on the original projection data;
determining, based on the target S-shaped extrapolation function and the original projection data, extended projection data corresponding to the at least one truncation region; and
generating an image of the object based on the original projection data and the extended projection data.

Statement of Invention 35

The system of statement of invention 34, wherein the target S-shaped extrapolation function is a monotonic and bounded function f(x).

Statement of Invention 36

The system of statement of invention 35, wherein
a domain of definition of the target S-shaped extrapolation function f(x) is x∈(−∞, +∞);
when x→−∞, the target S-shaped extrapolation function f(x) approaches a first value; and
when x→+∞, the target S-shaped extrapolation function f(x) approaches a second value.

Statement of Invention 37

The system of statement of invention 36, wherein
when x→∞, a first-order derivative function f'(x) of the target S-shaped extrapolation function f(x) approaches 0; and
a maximum value of the first-order derivative function f'(x) exists when x∈(−∞, +∞).

Statement of Invention 38

The system of statement of invention 36 or 37, wherein the original projection data of the object represents an intensity of radiation that is transmitted, from the radiation device, through the object and detected by a plurality of detector elements of the radiation device, the plurality of detector elements being arranged in one or more detector rows and one or more detector columns.

Statement of Invention 39

The system of statement of invention 38, wherein obtaining the target S-shaped extrapolation function based on the original projection data includes:
for partial projection data, in the original projection data, corresponding to one of the one or more detector rows of the plurality of detector elements and one of the one or more projection views,
  determining whether the partial projection data belongs to the truncation projection data;
  in response to determining that the partial projection data belongs to the truncation projection data, determining an extrapolation width corresponding to the partial projection data based on a count of the one or more detector columns and a length of a filter kernel configured to generate the image of the object;
  obtaining a preliminary S-shaped extrapolation function including one or more pending parameters; and
  obtaining the target S-shaped extrapolation function by determining, based on the extrapolation width and the partial projection data, the one or more pending parameters of the preliminary one or more pending parameters.

Statement of Invention 40

The system of statement of invention 39, wherein the extrapolation width corresponding to the partial projection data is determined based on the following equation:

$$2(N_S + 2N_{ext}) = L_{FFT},$$

wherein $L_{FFT}$ refers to the length of the filter kernel, $L_{FFT} = 2^n$, n relates to the generation of the image of the object; $N_S$ refers to the count of the one or more detector columns; and $N_{ext}$ refers to the extrapolation width.

Statement of Invention 41

The system of statement of invention 39 or 40, wherein the target S-shaped extrapolation function is obtained based on the following equation:

$$\int_{-N_{ext}/2}^{N_{ext}/2} (Y(x) + |Y_{min}|) dx = \frac{\pi}{2}\left(\frac{p}{2\mu}\right)^2,$$

wherein $N_{ext}$ refers to the extrapolation width; Y(x) refers to the preliminary S-shaped extrapolation function; t refers to a variable of Y(x) and relates to the detector elements in the detector row; $Y_{min}$ refers to a minimum value of Y(x) when $$x \in \left(\frac{-N_{ext}}{2}, \frac{N_{ext}}{2}\right),$$

or a smaller value of the first value and the second value when x∈(−∞, +∞); p refers to a projection value of the partial projection data corresponding to a boundary detector element of the detector row; and µ refers to an attenuation coefficient of water.

Statement of Invention 42

The system of any one of statement of inventions 34-41, wherein the target S-shaped extrapolation function include an original S-shaped function or a transformation of the original S-shaped function.

Statement of Invention 43

The system of statement of invention 42, wherein the transformation of the original S-shaped function includes at least one of a negative function of the original S-shaped function, an inverse function of the original S-shaped function, or a power function of the original S-shaped function.

Statement of Invention 44

The system of any one of statement of inventions 34-43, wherein the image of the object is generated using a filtered back-projection (FBP) algorithm based on the original projection data and the extended projection data.

Statement of Invention 45

The system of any one of statement of inventions 34-44, wherein the radiation device includes a computed tomography (CT) device with a fan-beam or a cone beam computed tomography (CBCT) device.

Statement of Invention 46

The system of any one of statement of inventions 34-45, wherein the radiation device incudes a C-arm device or a digital subtraction angiography (DSA) device.

Statement of Invention 47

An imaging method implemented on a machine including one or more storage devices and one or more process, comprising:

obtaining an image generated based on a radiation device including a detector, the radiation device being configured to operate under a plurality of candidate frame frequencies;

identifying, among the plurality of candidate frame frequencies, a target frame frequency used to generate the image;

obtaining integral time information including a plurality of frequency groups and a plurality of candidate integral time values, each of the plurality of frequency groups corresponding to one of the plurality of candidate integral time values and including one or more of the plurality of candidate frame frequencies;

determining a target integral time value based on the target frame frequency and the integral time information; and performing, based on the target integral time value, correction on the image.

Statement of Invention 48

The method of statement of invention 47, wherein the integral time information is provided by a process including:
dividing the plurality of candidate frame frequencies into the plurality of frequency groups, each frequency group including one or more candidate frame frequencies;
for each of the plurality of candidate frame frequencies, obtaining, based on the candidate frame frequency, a maximum integral time value; and
for each of the plurality of frequency groups, determining the candidate integral time value based on the maximum integral time value corresponding to at least one of the one or more candidate frame frequencies of the frequency group.

Statement of Invention 49

The method of statement of invention 48, wherein dividing the plurality of candidate frame frequencies into the plurality of frequency groups includes:
dividing the plurality of candidate frame frequencies into a first frequency group and a second frequency group, the first frequency group including one of the plurality of candidate frame frequencies with a maximum frame frequency, the second frequency group including the rest of the plurality of candidate frame frequencies.

Statement of Invention 50

The method of statement of invention 48, wherein dividing the plurality of candidate frame frequencies into the plurality of frequency groups includes:
ranking the plurality of candidate frame frequencies based on an order of values of the plurality of candidate frame frequencies; and
dividing, based on the ranking and a count threshold greater than one, the plurality of candidate frame frequencies into the plurality of frequency groups, a count of the candidate frame frequencies in each of the plurality of frequency groups being less than or equal to the count threshold.

Statement of Invention 51

The method of statement of invention 50, wherein the plurality of candidate frame frequencies are ranked in an ascending order of the values of the plurality of candidate frame frequencies.

Statement of Invention 52

The method of statement of invention 50 or 51, wherein
a count of the candidate frame frequencies in a last frequency group of the plurality of frequency groups, according to the ranking, is less than or equal to the count threshold; and
a count of the candidate frame frequencies in each of the rest of the plurality of frequency groups is equal to the count threshold.

Statement of Invention 53

The method of any one of statement of inventions 48-52, wherein for each of the plurality of frequency groups, determining the candidate integral time value based on the maximum integral time value corresponding to at least one of the one or more candidate frame frequencies of the frequency group includes:
designating the maximum integral time value corresponding to a maximum candidate frame frequency of the frequency group as the candidate integral time value of the frequency group.

Statement of Invention 54

The method of any one of statement of inventions 47-53, wherein performing, based on the target integral time value, correction on the image includes:
obtaining a correction image based on the target integral time value; and
performing the correction on the image by subtracting, from pixel values of pixels of the image, pixel values of corresponding pixels of the correction image.

Statement of Invention 55

The method of any one of statement of inventions 47-54, wherein the correction relates to a dark current of the detector.

Statement of Invention 56

The method of any one of statement of inventions 47-55, wherein at least one of the plurality of frequency groups includes two or more of the plurality of candidate frame frequencies.

Statement of Invention 57

An imaging method implemented on a machine including one or more storage devices and one or more process, comprising:
obtaining reference data including a complete projection of an object, the reference data being acquired using a radiation device;
obtaining original projection data of the object, the original projection data being acquired by scanning the object using the radiation device from one or more imaging projection views, the original projection data including truncation projection data that is acquired from at least one of the one or more imaging projection views, in each of the at least one of the one or more imaging projection views a truncation region of the object being located outside a field of view (FOV) of the radiation device;

determining, based on the reference data and the original projection data, extended projection data corresponding to the at least one truncation region; and generating a first image of the object based on the original projection data and the extended projection data.

Statement of Invention 58

The method of statement of invention 57, wherein the reference data includes projection data acquired by scanning, from a non-truncated projection view, the object using the radiation device, and in the non-truncated projection view, the object being within the FOV of the radiation device.

Statement of Invention 59

The method of statement of invention 58, wherein the non-truncated projection view is determined by a first process including:

obtaining at least one second image of the object, the at least one second image being acquired by at least one image acquisition device; and determining the non-truncated projection view based on the at least one second image.

Statement of Invention 60

The method of statement of invention 58, wherein the non-truncated projection view is determined based on a machine learning model.

Statement of Invention 61

The method of any one of statement of inventions 57-60, wherein determining, based on the reference data and the original projection data, the extended projection data corresponding to the at least one truncation region includes:

for partial projection data, in the original projection data, corresponding to one of the one or more imaging projection views, determining, based on the reference data, whether the partial projection data belongs to the truncation projection data; and in response to determining that the partial projection data belongs to the truncation projection data, determining, based on the reference data and the partial projection data, the extended projection data of the truncation region corresponding to the partial projection data.

Statement of Invention 62

The method of statement of invention 61, wherein determining, based on the reference data, whether the partial projection data belongs to the truncation projection data includes:

comparing a surface integral of the reference data and a surface integral of the partial projection data; and in response to determining that the surface integral of the reference data is greater than the surface integral of the partial projection data, determining that the partial projection data belongs to the truncation projection data.

Statement of Invention 63

The method of statement of invention 61 or 62, wherein determining, based on the reference data and the original projection data, the extended projection data corresponding to the at least one truncation region includes:

determining, based on an extrapolation algorithm and the partial projection data, the extended projection data of the truncation region corresponding to the partial projection data;

determining an extrapolation weight based on the reference data, the partial projection data, and the extended projection data corresponding to the partial projection data; and updating, based on the extrapolation weight, the extended projection data corresponding to the partial projection data.

Statement of Invention 64

The method of statement of invention 63, wherein a surface integral of a combination of the updated extended projection data and the partial projection data is equal to a surface integral of the reference data.

Statement of Invention 65

The method of statement of invention 63 or 64, wherein the extrapolation algorithm includes a mirror extrapolation algorithm or a linear extrapolation algorithm.

Statement of Invention 66

The method of statement of invention 57, wherein the reference data is obtained by a second process including:

obtaining at least two third images of the object, the at least two third images being acquired using the radiation device; and obtaining, based on the at least two third images, a combination image related to the projection of the object, the reference data including the combination image.

Statement of Invention 67

The method of statement of invention 66, wherein the at least two third images are obtained by scanning, using the radiation device located at two or more scanning locations, at least two portions of the object from a same projection view.

Statement of Invention 68

The method of statement of invention 66 or 67, wherein the at least two portions of the object include a same region of the object.

Statement of Invention 69

The method of any one of statement of inventions 66-68, wherein determining, based on the reference data and the original projection data, the extended projection data corresponding to the at least one truncation region includes:

determining supplement information based on the combination image and the original projection data;

obtaining a target extrapolation function; and determining the extended projection data corresponding to the at least one truncation region by performing, based on the supplement information and the target extrapolation function, extrapolation on the original projection data.

Statement of Invention 70

The method of statement of invention 69, wherein the original projection data of the object represents an intensity of radiation that is transmitted, from the radiation device, through the object and detected by a plurality of detector elements of the radiation device, the plurality of detector elements being arranged in a plurality of detector rows and a plurality of detector columns.

Statement of Invention 71

The method of statement of invention 70, wherein the combination image including a plurality of rows of pixels, each of the plurality of rows of pixels corresponding to one of the plurality of detector rows.

Statement of Invention 72

The method of statement of invention 71, wherein determining the supplement information based on the combination image and the original projection data includes:
for partial projection data, in the original projection data, corresponding to one of the plurality of detector rows of the plurality of detector elements and one of the one or more imaging projection views,
  determining whether the partial projection data belongs to the truncation projection data;
  in response to determining that the partial projection data belongs to the truncation projection data, determining a first sum of projection values of the partial projection data;
  determining, in the combination image, a second sum of pixel values of one of the plurality of rows of pixels corresponding to the detector row; and
  determining the supplement information corresponding to the partial projection data by determining a difference between the first sum and the second sum.

Statement of Invention 73

The method of statement of invention 72, wherein determining whether the partial projection data belongs to the truncation projection data includes:
  determining whether each of at least one first projection value corresponding to a first count of boundary detector elements of the detector row is equal to 0 and whether an average value of at least one second projection value corresponding to a second count of boundary detector elements of the detector row is greater than a projection threshold, the boundary detector element being located within a distance threshold away from an edge of the detector row; and
  in response to determining that one or more of the at least one first projection value is not equal to 0 and the average value is greater than the projection threshold, determining that the partial projection data belongs to the truncation projection data.

Statement of Invention 74

The method of statement of invention 72 or 73, wherein obtaining the target extrapolation function includes:
  obtaining a preliminary extrapolation function including one or more pending parameters;
  determining an extrapolation width corresponding to the partial projection data based on the supplement information corresponding to the partial projection data, the preliminary extrapolation function, and the partial projection data; and
  obtaining the target extrapolation function by determining the one or more pending parameters based on the extrapolation width corresponding to the partial projection data, the preliminary extrapolation function, and the partial projection data.

Statement of Invention 75

The method of statement of invention 74, wherein the extrapolation width is determined based on the following equation:

$$\int_0^{N_{ext}} f(x)dx = \Delta P_i,$$

wherein $f(x)$ refers to the preliminary extrapolation function, $N_{ext}$ refers to the extrapolation width corresponding to the partial projection data, $x$ refers to a variable of the preliminary extrapolation function and relates to the plurality of detector elements, and $\Delta P_i$ refers to the supplement information corresponding to the partial projection data.

Statement of Invention 76

The method of any one of statement of inventions 57-75, wherein the radiation device incudes a computed tomography (CT) device with a fan-beam or a cone beam computed tomography (CBCT) device.

Statement of Invention 77

The method of any one of statement of inventions 57-76, wherein the radiation device incudes a C-arm device or a digital subtraction angiography (DSA) device.

Statement of Invention 78

The method of any one of statement of inventions 57-77, wherein the first image of the object is generated using a filtered back-projection (FBP) algorithm based on the original projection data and the extended projection data.

Statement of Invention 79

The method of any one of statement of inventions 57-78, wherein the first image of the object is generated by performing three-dimensional (3D) reconstruction on the original projection data and the extended projection data.

Statement of Invention 80

An imaging method implemented on a machine including one or more storage devices and one or more process, comprising:
  obtaining original projection data of an object, the original projection data being acquired by scanning the object using a radiation device from one or more projection views, the original projection data including truncation projection data that is acquired from at least one of the one or more projection views, in each of the at least one of the one or more projection views a truncation region of the object being located outside a field of view (FOV) of the radiation device;
  obtaining a target S-shaped extrapolation function based on the original projection data;

determining, based on the target S-shaped extrapolation function and the original projection data, extended projection data corresponding to the at least one truncation region; and generating an image of the object based on the original projection data and the extended projection data.

Statement of Invention 81

The method of statement of invention 80, wherein the target S-shaped extrapolation function is a monotonic and bounded function f(x).

Statement of Invention 82

The method of statement of invention 81, wherein a domain of definition of the target S-shaped extrapolation function f(x) is $x \in (-\infty, +\infty)$;

when $x \to -\infty$, the target S-shaped extrapolation function f(x) approaches a first value; and when $x \to +\infty$, the target S-shaped extrapolation function f(x) approaches a second value.

Statement of Invention 83

The method of statement of invention 82, wherein when $x \to \infty$, a first-order derivative function f'(x) of the target S-shaped extrapolation function f(x) approaches 0; and a maximum value of the first-order derivative function f'(x) exists when $x \in (-\infty, +\infty)$.

Statement of Invention 84

The method of statement of invention 82 or 83, wherein the original projection data of the object represents an intensity of radiation that is transmitted, from the radiation device, through the object and detected by a plurality of detector elements of the radiation device, the plurality of detector elements being arranged in one or more detector rows and one or more detector columns.

Statement of Invention 85

The method of statement of invention 84, wherein obtaining the target S-shaped extrapolation function based on the original projection data includes:

for partial projection data, in the original projection data, corresponding to one of the one or more detector rows of the plurality of detector elements and one of the one or more projection views, determining whether the partial projection data belongs to the truncation projection data;

in response to determining that the partial projection data belongs to the truncation projection data, determining an extrapolation width corresponding to the partial projection data based on a count of the one or more detector columns and a length of a filter kernel configured to generate the image of the object;

obtaining a preliminary S-shaped extrapolation function including one or more pending parameters; and obtaining the target S-shaped extrapolation function by determining, based on the extrapolation width and the partial projection data, the one or more pending parameters of the preliminary one or more pending parameters.

Statement of Invention 86

The method of statement of invention 85, wherein the extrapolation width corresponding to the partial projection data is determined based on the following equation:

$$2(N_S + 2N_{ext}) = L_{FFT},$$

wherein $L_{FFT}$ refers to the length of the filter kernel, $L_{FFT} = 2^n$, n relates to the generation of the image of the object; $N_S$ refers to the count of the one or more detector columns; and $N_{ext}$ refers to the extrapolation width.

Statement of Invention 87

The method of statement of invention 85 or 86, wherein the target S-shaped extrapolation function is obtained based on the following equation:

$$\int_{-N_{ext}/2}^{N_{ext}/2} (Y(x) + |Y_{min}|) dx = \frac{\pi}{2} \left( \frac{p}{2\mu} \right)^2,$$

wherein $N_{ext}$ refers to the extrapolation width; Y(x) refers to the preliminary S-shaped extrapolation function; t refers to a variable of Y(x) and relates to the detector elements in the detector row; $Y_{min}$ refers to a minimum value of Y(x) when $$x \in \left( \frac{-N_{ext}}{2}, \frac{N_{ext}}{2} \right),$$

or a smaller value of the first value and the second value when $x \in (-\infty, +\infty)$; p refers to a projection value of the partial projection data corresponding to a boundary detector element of the detector row; and μ refers to an attenuation coefficient of water.

Statement of Invention 88

The method of any one of statement of inventions 80-87, wherein the target S-shaped extrapolation function include an original S-shaped function or a transformation of the original S-shaped function.

Statement of Invention 89

The method of statement of invention 88, wherein the transformation of the original S-shaped function includes at least one of a negative function of the original S-shaped function, an inverse function of the original S-shaped function, or a power function of the original S-shaped function.

Statement of Invention 90

The method of any one of statement of inventions 80-89, wherein the image of the object is generated using a filtered back-projection (FBP) algorithm based on the original projection data and the extended projection data.

Statement of Invention 91

The method of any one of statement of inventions 80-90, wherein the radiation device includes a computed tomography (CT) device with a fan-beam or a cone beam computed tomography (CBCT) device.

Statement of Invention 92

The method of any one of statement of inventions 80-91, wherein the radiation device incudes a C-arm device or a digital subtraction angiography (DSA) device.

Statement of Invention 93

An imaging system, comprising:
an obtaining module configured to
  obtain an image generated based on a radiation device including a detector, the radiation device being configured to operate under a plurality of candidate frame frequencies; and
  identify, among the plurality of candidate frame frequencies, a target frame frequency used to generate the image;
an integral time information obtaining module configured to obtain integral time information including a plurality of frequency groups and a plurality of candidate integral time values, each of the plurality of frequency groups corresponding to one of the plurality of candidate integral time values and including one or more of the plurality of candidate frame frequencies; and
a correction module configured to
  determine a target integral time value based on the target frame frequency and the integral time information; and
  performing, based on the target integral time value, correction on the image.

Statement of Invention 94

The system of statement of invention 93, wherein the integral time information is provided by a process including:
  dividing the plurality of candidate frame frequencies into the plurality of frequency groups, each frequency group including one or more candidate frame frequencies;
  for each of the plurality of candidate frame frequencies, obtaining, based on the candidate frame frequency, a maximum integral time value; and
  for each of the plurality of frequency groups, determining the candidate integral time value based on the maximum integral time value corresponding to at least one of the one or more candidate frame frequencies of the frequency group.

Statement of Invention 95

The system of statement of invention 94, wherein dividing the plurality of candidate frame frequencies into the plurality of frequency groups includes:
  dividing the plurality of candidate frame frequencies into a first frequency group and a second frequency group, the first frequency group including one of the plurality of candidate frame frequencies with a maximum frame frequency, the second frequency group including the rest of the plurality of candidate frame frequencies.

Statement of Invention 96

The system of statement of invention 94, wherein dividing the plurality of candidate frame frequencies into the plurality of frequency groups includes:
  ranking the plurality of candidate frame frequencies based on an order of values of the plurality of candidate frame frequencies; and
  dividing, based on the ranking and a count threshold greater than one, the plurality of candidate frame frequencies into the plurality of frequency groups, a count of the candidate frame frequencies in each of the plurality of frequency groups being less than or equal to the count threshold.

Statement of Invention 97

The system of statement of invention 96, wherein the plurality of candidate frame frequencies are ranked in an ascending order of the values of the plurality of candidate frame frequencies.

Statement of Invention 98

The system of statement of invention 96 or 97, wherein
  a count of the candidate frame frequencies in a last frequency group of the plurality of frequency groups, according to the ranking, is less than or equal to the count threshold; and
  a count of the candidate frame frequencies in each of the rest of the plurality of frequency groups is equal to the count threshold.

Statement of Invention 99

The system of any one of statement of inventions 94-98, wherein for each of the plurality of frequency groups, determining the candidate integral time value based on the maximum integral time value corresponding to at least one of the one or more candidate frame frequencies of the frequency group includes:
  designating the maximum integral time value corresponding to a maximum candidate frame frequency of the frequency group as the candidate integral time value of the frequency group.

Statement of Invention 100

The system of any one of statement of inventions 93-99, wherein performing, based on the target integral time value, correction on the image includes:
  obtaining a correction image based on the target integral time value; and
  performing the correction on the image by subtracting, from pixel values of pixels of the image, pixel values of corresponding pixels of the correction image.

Statement of Invention 101

The system of any one of statement of inventions 93-100, wherein the correction relates to a dark current of the detector.

Statement of Invention 102

The system of any one of statement of inventions 93-101, wherein at least one of the plurality of frequency groups includes two or more of the plurality of candidate frame frequencies.

Statement of Invention 103

An imaging system, comprising:
a projection data obtaining module configured to
obtain reference data including a complete projection of an object, the reference data being acquired using a radiation device; and
obtain original projection data of the object, the original projection data being acquired by scanning the object using the radiation device from one or more imaging projection views, the original projection data including truncation projection data that is acquired from at least one of the one or more imaging projection views, in each of the at least one of the one or more imaging projection views a truncation region of the object being located outside a field of view (FOV) of the radiation device;
an extended data determination module configured to determine, based on the reference data and the original projection data, extended projection data corresponding to the at least one truncation region; and
a reconstruction module configured to generate a first image of the object based on the original projection data and the extended projection data.

Statement of Invention 104

The system of statement of invention 103, wherein
the reference data includes projection data acquired by scanning, from a non-truncated projection view, the object using the radiation device, and
in the non-truncated projection view, the object being within the FOV of the radiation device.

Statement of Invention 105

The system of statement of invention 104, wherein the non-truncated projection view is determined by a first process including:
obtaining at least one second image of the object, the at least one second image being acquired by at least one image acquisition device; and
determining the non-truncated projection view based on the at least one second image.

Statement of Invention 106

The system of statement of invention 104, wherein the non-truncated projection view is determined based on a machine learning model.

Statement of Invention 107

The system of any one of statement of inventions 103-106, wherein determining, based on the reference data and the original projection data, the extended projection data corresponding to the at least one truncation region includes:
for partial projection data, in the original projection data, corresponding to one of the one or more imaging projection views,
determining, based on the reference data, whether the partial projection data belongs to the truncation projection data; and
in response to determining that the partial projection data belongs to the truncation projection data, determining, based on the reference data and the partial projection data, the extended projection data of the truncation region corresponding to the partial projection data.

Statement of Invention 108

The system of statement of invention 107, wherein determining, based on the reference data, whether the partial projection data belongs to the truncation projection data includes:
comparing a surface integral of the reference data and a surface integral of the partial projection data; and
in response to determining that the surface integral of the reference data is greater than the surface integral of the partial projection data, determining that the partial projection data belongs to the truncation projection data.

Statement of Invention 109

The system of statement of invention 107 or 108, wherein determining, based on the reference data and the original projection data, the extended projection data corresponding to the at least one truncation region includes:
determining, based on an extrapolation algorithm and the partial projection data, the extended projection data of the truncation region corresponding to the partial projection data;
determining an extrapolation weight based on the reference data, the partial projection data, and the extended projection data corresponding to the partial projection data; and
updating, based on the extrapolation weight, the extended projection data corresponding to the partial projection data.

Statement of Invention 110

The system of statement of invention 109, wherein a surface integral of a combination of the updated extended projection data and the partial projection data is equal to a surface integral of the reference data.

Statement of Invention 111

The system of statement of invention 109 or 110, wherein the extrapolation algorithm includes a mirror extrapolation algorithm or a linear extrapolation algorithm.

Statement of Invention 112

The system of statement of invention 103, wherein the reference data is obtained by a second process including:
obtaining at least two third images of the object, the at least two third images being acquired using the radiation device; and
obtaining, based on the at least two third images, a combination image related to the projection of the object, the reference data including the combination image.

Statement of Invention 113

The system of statement of invention 112, wherein the at least two third images are obtained by scanning, using the radiation device located at two or more scanning locations, at least two portions of the object from a same projection view.

Statement of Invention 114

The system of statement of invention 112 or 113, wherein the at least two portions of the object include a same region of the object.

Statement of Invention 115

The system of any one of statement of inventions 112-114, wherein determining, based on the reference data and the original projection data, the extended projection data corresponding to the at least one truncation region includes:
   determining supplement information based on the combination image and the original projection data;
   obtaining a target extrapolation function; and
   determining the extended projection data corresponding to the at least one truncation region by performing, based on the supplement information and the target extrapolation function, extrapolation on the original projection data.

Statement of Invention 116

The system of statement of invention 115, wherein the original projection data of the object represents an intensity of radiation that is transmitted, from the radiation device, through the object and detected by a plurality of detector elements of the radiation device, the plurality of detector elements being arranged in a plurality of detector rows and a plurality of detector columns.

Statement of Invention 117

The system of statement of invention 116, wherein the combination image including a plurality of rows of pixels, each of the plurality of rows of pixels corresponding to one of the plurality of detector rows.

Statement of Invention 118

The system of statement of invention 117, wherein determining the supplement information based on the combination image and the original projection data includes:
   for partial projection data, in the original projection data, corresponding to one of the plurality of detector rows of the plurality of detector elements and one of the one or more imaging projection views,
      determining whether the partial projection data belongs to the truncation projection data;
      in response to determining that the partial projection data belongs to the truncation projection data, determining a first sum of projection values of the partial projection data;
      determining, in the combination image, a second sum of pixel values of one of the plurality of rows of pixels corresponding to the detector row; and
      determining the supplement information corresponding to the partial projection data by determining a difference between the first sum and the second sum.

Statement of Invention 119

The system of statement of invention 118, wherein determining whether the partial projection data belongs to the truncation projection data includes:
   determining whether each of at least one first projection value corresponding to a first count of boundary detector elements of the detector row is equal to 0 and whether an average value of at least one second projection value corresponding to a second count of boundary detector elements of the detector row is greater than a projection threshold, the boundary detector element being located within a distance threshold away from an edge of the detector row; and
   in response to determining that one or more of the at least one first projection value is not equal to 0 and the average value is greater than the projection threshold, determining that the partial projection data belongs to the truncation projection data.

Statement of Invention 120

The system of statement of invention 118 or 119, wherein obtaining the target extrapolation function includes:
   obtaining a preliminary extrapolation function including one or more pending parameters;
   determining an extrapolation width corresponding to the partial projection data based on the supplement information corresponding to the partial projection data, the preliminary extrapolation function, and the partial projection data; and
   obtaining the target extrapolation function by determining the one or more pending parameters based on the extrapolation width corresponding to the partial projection data, the preliminary extrapolation function, and the partial projection data.

Statement of Invention 121

The system of statement of invention 120, wherein the extrapolation width is determined based on the following equation:

$\int_0^{N_{ext}} f(x) dx = \Delta P_i,$ wherein f(x) refers to the preliminary extrapolation function, $N_{ext}$ refers to the extrapolation width corresponding to the partial projection data, x refers to a variable of the preliminary extrapolation function and relates to the plurality of detector elements, and $\Delta P_i$ refers to the supplement information corresponding to the partial projection data.

Statement of Invention 122

The system of any one of statement of inventions 103-121, wherein the radiation device incudes a computed tomography (CT) device with a fan-beam or a cone beam computed tomography (CBCT) device.

Statement of Invention 123

The system of any one of statement of inventions 103-122, wherein the radiation device incudes a C-arm device or a digital subtraction angiography (DSA) device.

Statement of Invention 124

The system of any one of statement of inventions 103-123, wherein the first image of the object is generated using a filtered back-projection (FBP) algorithm based on the original projection data and the extended projection data.

Statement of Invention 125

The system of any one of statement of inventions 103-124, wherein the first image of the object is generated by performing three-dimensional (3D) reconstruction on the original projection data and the extended projection data.

Statement of Invention 126

An imaging system, comprising:
an projection data obtaining module configured to obtain original projection data of an object, the original projection data being acquired by scanning the object using a radiation device from one or more projection views, the original projection data including truncation projection data that is acquired from at least one of the one or more projection views, in each of the at least one of the one or more projection views a truncation region of the object being located outside a field of view (FOV) of the radiation device;
an extrapolation function obtaining module configured to obtain a target S-shaped extrapolation function based on the original projection data;
an extended data determination module configured to determine, based on the target S-shaped extrapolation function and the original projection data, extended projection data corresponding to the at least one truncation region; and
a reconstruction module configured to generate an image of the object based on the original projection data and the extended projection data.

Statement of Invention 127

The system of statement of invention 126, wherein the target S-shaped extrapolation function is a monotonic and bounded function f(x).

Statement of Invention 128

The system of statement of invention 127, wherein
a domain of definition of the target S-shaped extrapolation function f(x) is $x \in (-\infty, +\infty)$;
when $x \to -\infty$, the target S-shaped extrapolation function f(x) approaches a first value; and
when $x \to +\infty$, the target S-shaped extrapolation function f(x) approaches a second value.

Statement of Invention 129

The system of statement of invention 128, wherein
when $x \to \infty$, a first-order derivative function f'(x) of the target S-shaped extrapolation function f(x) approaches 0; and
a maximum value of the first-order derivative function f'(x) exists when $x \in (-\infty, +\infty)$.

Statement of Invention 130

The system of statement of invention 128 or 129, wherein the original projection data of the object represents an intensity of radiation that is transmitted, from the radiation device, through the object and detected by a plurality of detector elements of the radiation device, the plurality of detector elements being arranged in one or more detector rows and one or more detector columns.

Statement of Invention 131

The system of statement of invention 130, wherein obtaining the target S-shaped extrapolation function based on the original projection data includes:

for partial projection data, in the original projection data, corresponding to one of the one or more detector rows of the plurality of detector elements and one of the one or more projection views,
determining whether the partial projection data belongs to the truncation projection data;
in response to determining that the partial projection data belongs to the truncation projection data, determining an extrapolation width corresponding to the partial projection data based on a count of the one or more detector columns and a length of a filter kernel configured to generate the image of the object;
obtaining a preliminary S-shaped extrapolation function including one or more pending parameters; and
obtaining the target S-shaped extrapolation function by determining, based on the extrapolation width and the partial projection data, the one or more pending parameters of the preliminary one or more pending parameters.

Statement of Invention 132

The system of statement of invention 131, wherein the extrapolation width corresponding to the partial projection data is determined based on the following equation:

$$2(N_S+2N_{ext})=L_{FFT},$$

wherein $L_{FFT}$ refers to the length of the filter kernel, $L_{FFT}=2^n$, n relates to the generation of the image of the object; $N_S$ refers to the count of the one or more detector columns; and $N_{ext}$ refers to the extrapolation width.

Statement of Invention 133

The system of statement of invention 131 or 132, wherein the target S-shaped extrapolation function is obtained based on the following equation:

$$\int_{-N_{ext}/2}^{N_{ext}/2} (Y(x) + |Y_{min}|) dx = \frac{\pi}{2}\left(\frac{p}{2\mu}\right)^2,$$

wherein $N_{ext}$ refers to the extrapolation width; Y(x) refers to the preliminary S-shaped extrapolation function; t refers to a variable of Y(x) and relates to the detector elements in the detector row; $Y_{min}$ refers to a minimum value of Y(x) when $$x \in \left(\frac{-N_{ext}}{2}, \frac{N_{ext}}{2}\right),$$

or a smaller value of the first value and the second value when $x \in (-\infty, +\infty)$; p refers to a projection value of the partial projection data corresponding to a boundary detector element of the detector row; and y refers to an attenuation coefficient of water.

Statement of Invention 134

The system of any one of statement of inventions 126-133, wherein the target S-shaped extrapolation function include an original S-shaped function or a transformation of the original S-shaped function.

Statement of Invention 135

The system of statement of invention 134, wherein the transformation of the original S-shaped function includes at least one of a negative function of the original S-shaped function, an inverse function of the original S-shaped function, or a power function of the original S-shaped function.

Statement of Invention 136

The system of any one of statement of inventions 126-135, wherein the image of the object is generated using a filtered back-projection (FBP) algorithm based on the original projection data and the extended projection data.

Statement of Invention 137

The system of any one of statement of inventions 126-136, wherein the radiation device includes a computed tomography (CT) device with a fan-beam or a cone beam computed tomography (CBCT) device.

Statement of Invention 138

The system of any one of statement of inventions 126-137, wherein the radiation device incudes a C-arm device or a digital subtraction angiography (DSA) device.

Statement of Invention 139

A non-transitory computer readable medium, comprising at least one set of instructions, wherein when executed by one or more processors of a computing device, the at least one set of instructions causes the computing device to perform a method, the method comprising:
  obtaining an image generated based on a radiation device including a detector, the radiation device being configured to operate under a plurality of candidate frame frequencies;
  identifying, among the plurality of candidate frame frequencies, a target frame frequency used to generate the image;
  obtaining integral time information including a plurality of frequency groups and a plurality of candidate integral time values, each of the plurality of frequency groups corresponding to one of the plurality of candidate integral time values and including one or more of the plurality of candidate frame frequencies;
  determining a target integral time value based on the target frame frequency and the integral time information; and
  performing, based on the target integral time value, correction on the image.

Statement of Invention 140

A non-transitory computer readable medium, comprising at least one set of instructions, wherein when executed by one or more processors of a computing device, the at least one set of instructions causes the computing device to perform a method, the method comprising:
  obtaining reference data including a complete projection of an object, the reference data being acquired using a radiation device;
  obtaining original projection data of the object, the original projection data being acquired by scanning the object using the radiation device from one or more imaging projection views, the original projection data including truncation projection data that is acquired from at least one of the one or more imaging projection views, in each of the at least one of the one or more imaging projection views a truncation region of the object being located outside a field of view (FOV) of the radiation device;
  determining, based on the reference data and the original projection data, extended projection data corresponding to the at least one truncation region; and
  generating a first image of the object based on the original projection data and the extended projection data.

Statement of Invention 141

A non-transitory computer readable medium, comprising at least one set of instructions, wherein when executed by one or more processors of a computing device, the at least one set of instructions causes the computing device to perform a method, the method comprising:
  obtaining original projection data of an object, the original projection data being acquired by scanning the object using a radiation device from one or more projection views, the original projection data including truncation projection data that is acquired from at least one of the one or more projection views, in each of the at least one of the one or more projection views a truncation region of the object being located outside a field of view (FOV) of the radiation device;
  obtaining a target S-shaped extrapolation function based on the original projection data;
  determining, based on the target S-shaped extrapolation function and the original projection data, extended projection data corresponding to the at least one truncation region; and
  generating an image of the object based on the original projection data and the extended projection data.

What is claimed is:

1. An imaging system, comprising:
   at least one storage device storing a set of instructions; and
   at least one processor in communication with the at least one storage device, when executing the stored set of instructions, the at least one processor causes the system to perform operations including:
     obtaining reference data including a complete projection of an object; wherein the reference data includes projection data acquired by scanning, from a non-truncated projection view, the object using a radiation device, in the non-truncated projection view, the object is within a field of view (FOV) of the radiation device, and the non-truncated projection view is determined by a first process including:
       obtaining at least one second image of the object, the at least one second image being acquired by at least one camera at a plurality of candidate projection views, the at least one camera being positioned on a gantry of the radiation device, an FOV of the at least one camera being consistent with the FOV of the radiation device;
       identifying, based on the at least one second image, one or more of the plurality of candidate projection views in which the object is completely within the FOV of the at least one camera; and
       selecting, as the non-truncated projection view, one of the one or more of the plurality of candidate projection views;

obtaining original projection data of the object, the original projection data being acquired by scanning the object using the radiation device from one or more imaging projection views, the original projection data including truncation projection data that is acquired from at least one of the one or more imaging projection views, in each of the at least one of the one or more imaging projection views a truncation region of the object being located outside the FOV of the radiation device;

determining extended projection data corresponding to the at least one truncation region by performing, based on the original projection data and the reference data, a mirror extrapolation algorithm; and generating a first image of the object based on the original projection data and the extended projection data.

2. The system of claim 1, wherein the determining extended projection data corresponding to the at least one truncation region by performing, based on the original projection data and the reference data, a mirror extrapolation algorithm includes:

for partial projection data, in the original projection data, corresponding to one of the one or more imaging projection views,
comparing a surface integral of the reference data and a surface integral of the partial projection data; and
in response to determining that the surface integral of the reference data is greater than the surface integral of the partial projection data, determining that the partial projection data belongs to the truncation projection data; and
determining, based on the reference data and the partial projection data, the extended projection data of the truncation region corresponding to the partial projection data.

3. The system of claim 1, wherein the at least one processor causes the system to perform the operations including:

updating the extended projection data based on the reference data to make a surface integral of a combination of the extended projection data and the original projection data closer to a surface integral of the reference data.

4. The system of claim 1, wherein the at least one processor causes the system to perform the operations includes:

identifying, among a plurality of candidate frame frequencies, a target frame frequency used to generate the first image, the radiation device being configured to operate under the plurality of candidate frame frequencies;
obtaining integral time information including a plurality of frequency groups and a plurality of candidate integral time values, each of the plurality of frequency groups corresponding to one of the plurality of candidate integral time values and including one or more of the plurality of candidate frame frequencies;
determining the candidate integral time value of the frequency group including the target frame frequency as a target integral time value;
obtaining a correction image based on the target integral time value; and
performing correction on the first image by subtracting, from pixel values of pixels of the first image, pixel values of corresponding pixels of the correction image.

5. The system of claim 1, wherein the determining extended projection data corresponding to the at least one truncation region by performing, based on the original projection data and the reference data, a mirror extrapolation algorithm includes:

determining supplement information by determining a difference between the reference data and the truncation projection data;
obtaining a preliminary extrapolation function including one or more pending parameters;
determining an extrapolation width corresponding to the original projection data based on the supplement information, the preliminary extrapolation function, and the original projection data, wherein the extrapolation width refers to a length needed to extend, along a row direction of a detector of the radiation device, from a truncated edge of the detector so that a projection of the at least one truncation region is able to be covered by the extrapolation width;
determining a target extrapolation function by determining the one or more pending parameters based on the extrapolation width, the preliminary extrapolation function, and the original projection data; and
determining the extended projection data corresponding to the at least one truncation region by performing, based on the extrapolation width, the supplement information, and the target extrapolation function, the mirror extrapolation algorithm on the original projection data.

6. The system of claim 5, wherein the target extrapolation function is a monotonic and bounded function.

7. The system of claim 6, wherein
a domain of definition of the target extrapolation function $f(x)$ is $x \in (-\infty, +\infty)$;
when $x \to -\infty$, the target extrapolation function $f(x)$ approaches a first value; and
when $x \to +\infty$, the target extrapolation function $f(x)$ approaches a second value.

8. The system of claim 7, wherein
when $x \to \infty$, a first-order derivative function $f(x)$ of the target extrapolation function $f(x)$ approaches 0; and
a maximum value of the first-order derivative function $f(x)$ exists when $x \in (-\infty, +\infty)$.

9. The system of claim 5, wherein the determining an extrapolation width corresponding to the original projection data includes:

determining the extrapolation width corresponding to the original projection data based on a count of one or more detector columns of a detector matrix of the detector and a length of a filter kernel configured to generate the first image of the object.

10. The system of claim 5, wherein the determining an extrapolation width corresponding to the original projection data includes:

determining the extrapolation width using a relation that an integral of the preliminary extrapolation function in a range from 0 to the extrapolation width is equal to the supplement information.

11. The system of claim 5, wherein the determining a target extrapolation function by determining the one or more pending parameters includes:

determining the target extrapolation function using a relation that an area under the target extrapolation function in a range of the extrapolation width is equal to attenuation of radiation rays in water that is indicated by a ratio between an attenuation coefficient of water and a projection value, in the truncation projection data, at the truncated edge of the detector.

12. An imaging method, comprising:
obtaining reference data including a complete projection of an object; wherein the reference data includes projection data acquired by scanning, from a non-truncated projection view, the object using a radiation device, in the non-truncated projection view, the object is within a field of view (FOV) of the radiation device, and the non-truncated projection view is determined by a first process including:
- obtaining at least one second image of the object, the at least one second image being acquired by at least one camera at a plurality of candidate projection views, the at least one camera being positioned on a gantry of the radiation device, an FOV of the at least one camera being consistent with the FOV of the radiation device;
- identifying, based on the at least one second image, one or more of the plurality of candidate projection views in which the object is completely within the FOV of the at least one camera; and
- selecting, as the non-truncated projection view, one of the one or more of the plurality of candidate projection views;

obtaining original projection data of the object, the original projection data being acquired by scanning the object using the radiation device from one or more imaging projection views, the original projection data including truncation projection data that is acquired from at least one of the one or more imaging projection views, in each of the at least one of the one or more imaging projection views a truncation region of the object being located outside the FOV of the radiation device;

determining extended projection data corresponding to the at least one truncation region by performing, based on the original projection data and the reference data, a mirror extrapolation algorithm; and generating a first image of the object based on the original projection data and the extended projection data.

13. A non-transitory computer readable medium, comprising executable instructions that, when executed by at least one processor, direct the at least one processor to perform a method, the method comprising:
obtaining reference data including a complete projection of an object; wherein the reference data includes projection data acquired by scanning, from a non-truncated projection view, the object using a radiation device, in the non-truncated projection view, the object is within a field of view (FOV) of the radiation device, and the non-truncated projection view is determined by a first process including:
- obtaining at least one second image of the object, the at least one second image being acquired by at least one camera at a plurality of candidate projection views, the at least one camera being positioned on a gantry of the radiation device, an FOV of the at least one camera being consistent with the FOV of the radiation device;
- identifying, based on the at least one second image, one or more of the plurality of candidate projection views in which the object is completely within the FOV of the at least one camera; and
- selecting, as the non-truncated projection view, one of the one or more of the plurality of candidate projection views;

obtaining original projection data of the object, the original projection data being acquired by scanning the object using the radiation device from one or more imaging projection views, the original projection data including truncation projection data that is acquired from at least one of the one or more imaging projection views, in each of the at least one of the one or more imaging projection views a truncation region of the object being located outside the FOV of the radiation device;

determining extended projection data corresponding to the at least one truncation region by performing, based on the original projection data and the reference data, a mirror extrapolation algorithm; and generating a first image of the object based on the original projection data and the extended projection data.

* * * * *